US012494317B2

(12) United States Patent
Arai et al.

(10) Patent No.: US 12,494,317 B2
(45) Date of Patent: Dec. 9, 2025

(54) INDUCTOR ARRAY, CIRCUIT BOARD, AND ELECTRONIC DEVICE

(71) Applicant: TAIYO YUDEN CO., LTD., Tokyo (JP)

(72) Inventors: Takayuki Arai, Tokyo (JP); Naoya Terauchi, Tokyo (JP); Tomoo Kashiwa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 804 days.

(21) Appl. No.: 17/837,765

(22) Filed: Jun. 10, 2022

(65) Prior Publication Data

US 2022/0415565 A1 Dec. 29, 2022

(30) Foreign Application Priority Data

Jun. 26, 2021 (JP) ................................ 2021-106195
Jun. 26, 2021 (JP) ................................ 2021-106199
Jun. 30, 2021 (JP) ................................ 2021-109641

(51) Int. Cl.
*H01F 27/29* (2006.01)
*H01F 27/06* (2006.01)
*H01F 27/24* (2006.01)

(52) U.S. Cl.
CPC ........... *H01F 27/292* (2013.01); *H01F 27/06* (2013.01); *H01F 27/24* (2013.01); *H01F 2027/065* (2013.01)

(58) Field of Classification Search
CPC ........ H01F 27/292; H01F 27/06; H01F 27/24; H01F 2027/065
See application file for complete search history.

(56) References Cited

U.S. PATENT DOCUMENTS

2006/0145804 A1* 7/2006 Matsutani ............. H01F 27/292 336/200
2017/0006706 A1* 1/2017 Yoon .................. H01F 17/0033
2017/0148561 A1* 5/2017 Yoon ...................... H05K 1/181
2017/0196091 A1* 7/2017 Lee ...................... H01F 27/292
(Continued)

FOREIGN PATENT DOCUMENTS

JP 2016-006830 A 1/2016
KR 2019015735 A * 2/2019 ......... H01F 17/0013

*Primary Examiner* — Malcolm Barnes
(74) *Attorney, Agent, or Firm* — Pillsbury Winthrop Shaw Pittman, LLP

(57) ABSTRACT

An inductor array includes a magnetic base body having first and second surfaces opposed to each other and a third surface connecting between the first and second surfaces, and also includes first and second end internal conductors having the same shape. The first end internal conductor includes first-end first conductor portions and fewer first-end second conductor portions, alternating with and being connected to each other. The second end internal conductor includes second-end first conductor portions and fewer second-end second conductor portions, alternating with and being connected to each other. The first-end first conductor portions are positioned away from the first surface by a first end distance in a reference axis direction and face the first surface. The second-end second conductor portions are positioned away from the second surface by a second end distance less than the first end distance in the reference axis direction and face the second surface.

14 Claims, 31 Drawing Sheets

(56) References Cited

U.S. PATENT DOCUMENTS

| | | | | |
|---|---|---|---|---|
| 2019/0115135 | A1* | 4/2019 | Yoon | H01F 27/292 |
| 2019/0362888 | A1* | 11/2019 | Lee | H01F 27/292 |
| 2020/0381170 | A1* | 12/2020 | Park | H01F 27/255 |

* cited by examiner

INDUCTOR ARRAY, CIRCUIT BOARD, AND ELECTRONIC DEVICE

CROSS-REFERENCE TO RELATED APPLICATIONS

This application is based on and claims the benefit of priority from Japanese Patent Application Serial Nos. 2021-106195 and 2021-106199 (filed on Jun. 26, 2021) and 2021-109641 (filed on Jun. 30, 2021), the contents of which are hereby incorporated by reference in their entirety.

TECHNICAL FIELD

The present disclosure relates to an inductor array, a circuit board including the inductor array, and an electronic device including the circuit board.

BACKGROUND

An inductor array including a plurality of inductors has been known. A plurality of inductors are packaged in a single chip to form such an inductor array.

Conventional inductor arrays are disclosed in, for example, Japanese Patent Application Publication No. 2016-006830 ("the '830 Publication"). The inductor array disclosed in the '830 Publication includes a base body made of a magnetic material, a plurality of internal conductors provided in the magnetic base body such that they are insulated from each other, and a plurality of external electrodes connected to ends of each internal conductor. Each internal conductor extends a circumferential direction centered on its own coil axis.

In inductor arrays including a plurality of inductors, internal conductors of the inductors are shaped in the same manner, positioned in the same orientation and arranged at regular intervals in an arrangement direction perpendicular to the coil axes, in order that the inductors can achieve uniform characteristics, With such arrangement, the margin between one of outermost inductors in the arrangement direction and one of the surfaces of the base body is equal to the margin between the other outermost inductor in the arrangement direction and another one of the surfaces of the base body.

The internal conductors are each connected at the ends thereof to different external electrodes, which are differently positioned from each other in the circumferential direction centered on the coil axis. Therefore, the number of turns in the winding portion of the internal conductor is not an integer. This means that the magnetic fluxes generated by the internal conductor are not distributed in a uniform manner around the coil axis. More specifically, the internal conductor generates more magnetic fluxes in part of the circumferential region surrounding its coil axis than in the remaining part. Accordingly, the magnetic fluxes are distributed spatially unevenly. Stated differently, in the conventional inductor arrays, one of the outermost inductors in the arrangement direction, which faces one of the surfaces of the base body, generates more magnetic fluxes in the region between its internal conductor and the surface. Due to the uneven distribution of the magnetic fluxes generated by this internal conductor, one of the outermost inductors in the arrangement direction in the conventional inductor arrays disadvantageously exhibits low inductance. In addition, an inductor array may include three or more internal conductors having the same shape, and the three or more internal conductors may be arranged next to each other in a given direction. In this case, the outermost inductors exhibit lower inductance than the remaining inner inductors.

As described above, conventional inductor arrays have a plurality of inductors, which have the same shape, the same orientation and are arranged in the base body at even intervals. These intend to allow the inductors to achieve uniform characteristics, but, on the contrary, prevent the inductors to reliably achieve uniform inductances.

SUMMARY

One object of the invention disclosed herein is to solve or mitigate the drawback in the conventional inductor arrays. In particular, one object of the present invention is to improve uniformity in inductance among inductors included in an array of coil components.

The other objects of the invention disclosed in this specification will be apparent with reference to the entire description in this specification. The invention herein may solve any other drawbacks grasped from the following description, instead of or in addition to the above drawback.

One or more embodiments of the present invention provides an inductor array including a magnetic base body having a first surface, a second surface opposed to the first surface, and a third surface connecting between the first and second surfaces, a first end internal conductor, a second end internal conductor, a first external electrode provided on the magnetic base body such that the first external electrode is in contact at least with the third surface, where the first external electrode is connected to one end of the first end internal conductor, a second external electrode provided on the magnetic base body such that the second external electrode is in contact at least with the third surface, where the second external electrode is connected to the other end of the first end internal conductor, a third external electrode provided on the magnetic base body such that the third external electrode is in contact at least with the third surface, where the third external electrode is connected to one end of the second end internal conductor, and a fourth external electrode provided on the magnetic base body such that the fourth external electrode is in contact at least with the third surface, where the fourth external electrode is connected to the other end of the second end internal conductor. The first end internal conductor may include a first winding portion extending around a first coil axis extending perpendicularly to a reference axis extending through the first and second surfaces, where the first winding portion includes (i) a plurality of first-end first conductor portions and (ii) one or more first-end second conductor portions smaller in number than the first-end first conductor portions. The first-end first conductor portion and the first-end second conductor portion may alternate with and be connected to each other. The first end internal conductor may be arranged such that the first-end first conductor portions are positioned away from the first surface by a first end distance in a first direction extending from the first surface toward the second surface along the reference axis and face the first surface. The second end internal conductor may include a second winding portion extending around a second coil axis extending parallel to the first coil axis, where the second winding portion includes (i) a plurality of second-end first conductor portions and (ii) one or more second-end second conductor portions smaller in number than the second-end first conductor portions. The second-end first conductor portion and the second-end second conductor portion may alternate with and be connected to each other. The second end internal conductor may be shaped in a same manner as the first end internal conductor. The second end internal conductor may be arranged such that the second-end second conductor portions are positioned away from the second surface by a second end distance less than the first end distance in a second direction extending from the second surface toward the first surface along the reference axis and face the second surface.

In one or more embodiments of the present invention, the first end internal conductor is adjacent to the second end internal conductor. A distance between the first end internal conductor and the second end internal conductor in a direction along the reference axis may be less than twice the first end distance. In one or more embodiments of the present invention, a distance between the first end internal conductor and the second end internal conductor in a direction along the reference axis may be less than the first end distance.

The inductor array according to one or more embodiments of the present invention includes an intermediate internal conductor unit including one or more intermediate internal conductors, where each intermediate internal conductor is shaped in a same manner as the first end internal conductor, a fifth external electrode provided on the magnetic base body such that the fifth external electrode is in contact at least with the third surface, where the fifth external electrode is connected to one end of a given one of the one or more intermediate internal conductors, and a sixth external electrode provided on the magnetic base body such that the sixth external electrode is in contact at least with the third surface, where the sixth external electrode is connected to the other end of the given one of the one or more intermediate internal conductors that is connected to the fifth external electrode.

In one or more embodiments of the present invention, the intermediate internal conductor unit includes a single intermediate internal conductor, and the single intermediate internal conductor is provided in the magnetic base body such that the single intermediate internal conductor is positioned away from the first end internal conductor by a first inter-conductor distance in the first direction and positioned away from the second end internal conductor by a second inter-conductor distance in the second direction.

In one or more embodiments of the present invention, a first one of the intermediate internal conductors is provided in the magnetic base body such that the first intermediate internal conductor is positioned away from the first end internal conductor by a first inter-conductor distance in the first direction, and a second one of the intermediate internal conductors is positioned away from the second end internal conductor by a second inter-conductor distance in the second direction.

In one or more embodiments of the present invention, the first and second inter-conductor distances are both greater than the first end distance. The first and second inter-conductor distances may be both less than twice the first end distance. The first and second inter-conductor distances may be both less than the first end distance.

In one or more embodiments of the present invention, the first and second inter-conductor distances are equal.

In one or more embodiments of the present invention, the number of turns in the first end internal conductor is from 1.5 to 3.5.

In one or more embodiments of the present invention, the magnetic base body has (i) a first margin region between the first end internal conductor and the first surface, (ii) a second margin region between the second end internal conductor and the second surface, (iii) a first inter-conductor region between the first end internal conductor and the intermediate internal conductor unit, and (iv) a second inter-conductor region between the second end internal conductor and the intermediate internal conductor unit, and the first margin region, the second margin region, the first inter-conductor region and the second inter-conductor region have same magnetic permeability.

One or more embodiments of the present invention relate to a circuit board including any one of the above-described inductor arrays.

One or more embodiments of the present invention relate to an electronic device including the above circuit board.

DESCRIPTION OF THE PREFERRED EMBODIMENTS

Figure 1:
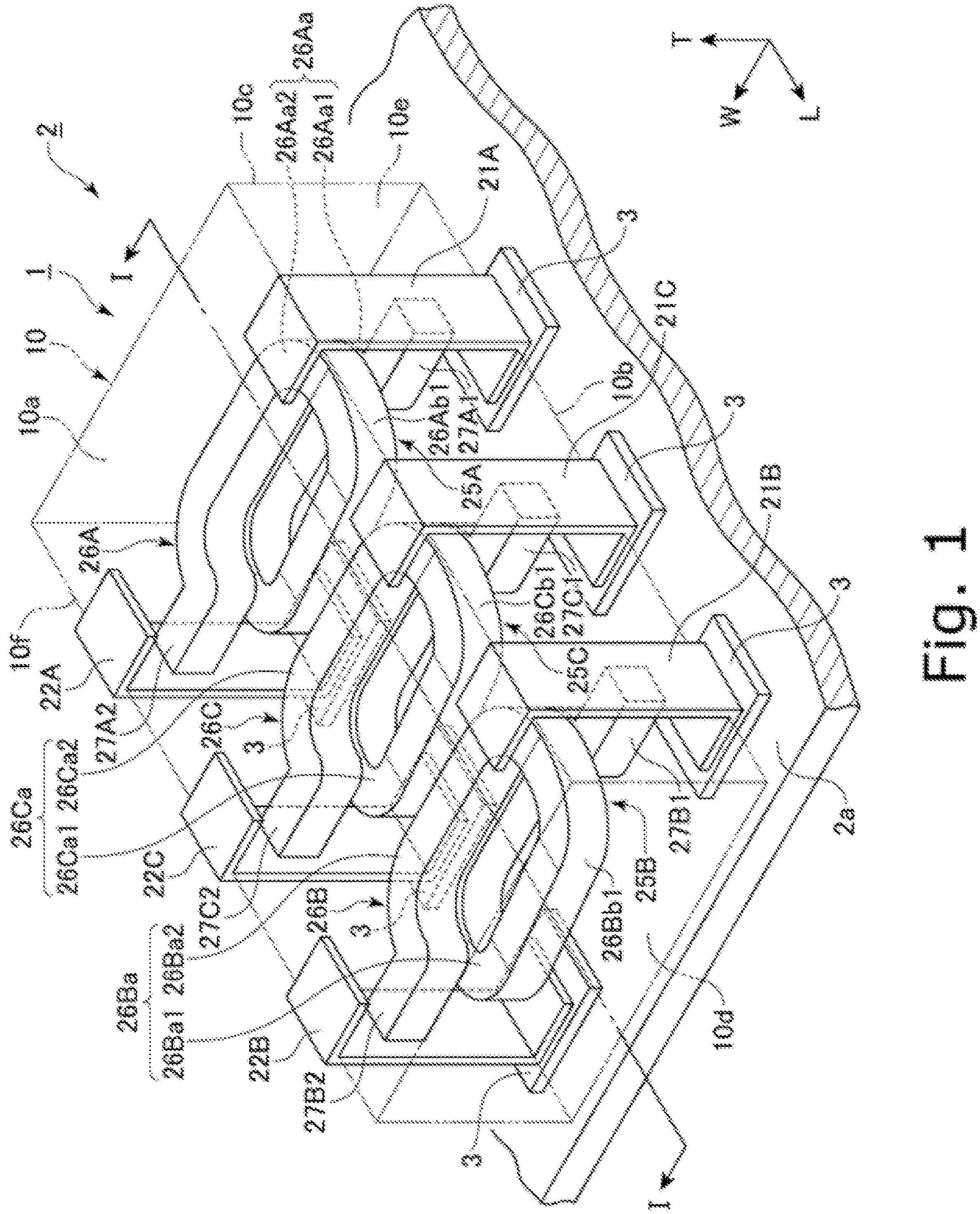
FIG. 1 is a perspective view of an inductor array according to one embodiment of the invention mounted on a mounting substrate.

Various embodiments of the present invention will be described hereinafter with reference to the appended drawings. Throughout the drawings, the same components are denoted by the same reference numerals. It should be noted that the drawings do not necessarily appear in accurate scales for convenience of description. The following embodiments of the present invention do not limit the scope of the claims. The elements described in the following embodiments are not necessarily essential to solve the problem to be solved by the invention.

Figure 2:
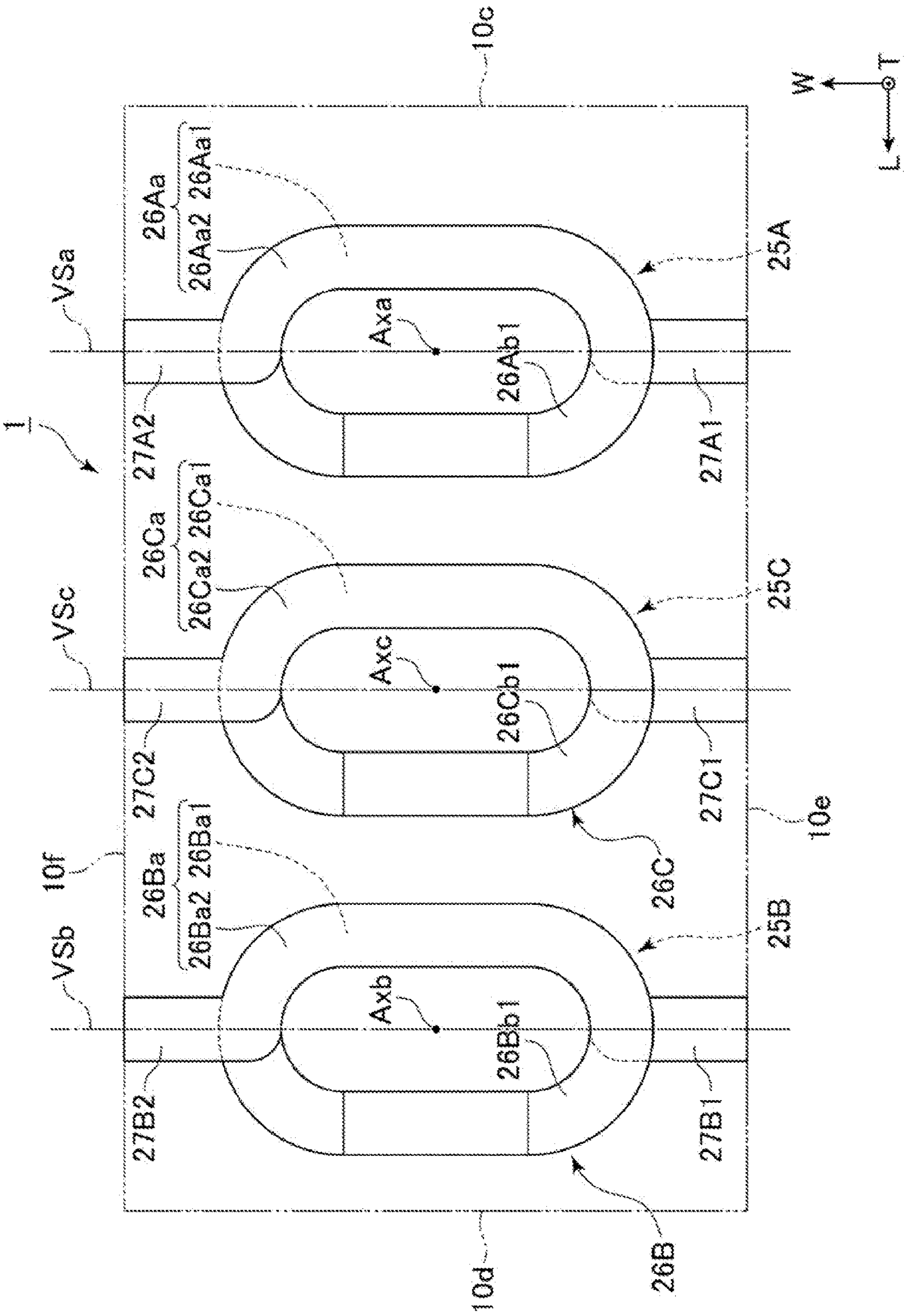
FIG. 2 is a plan view of the inductor array of FIG. 1.
Figure 3:
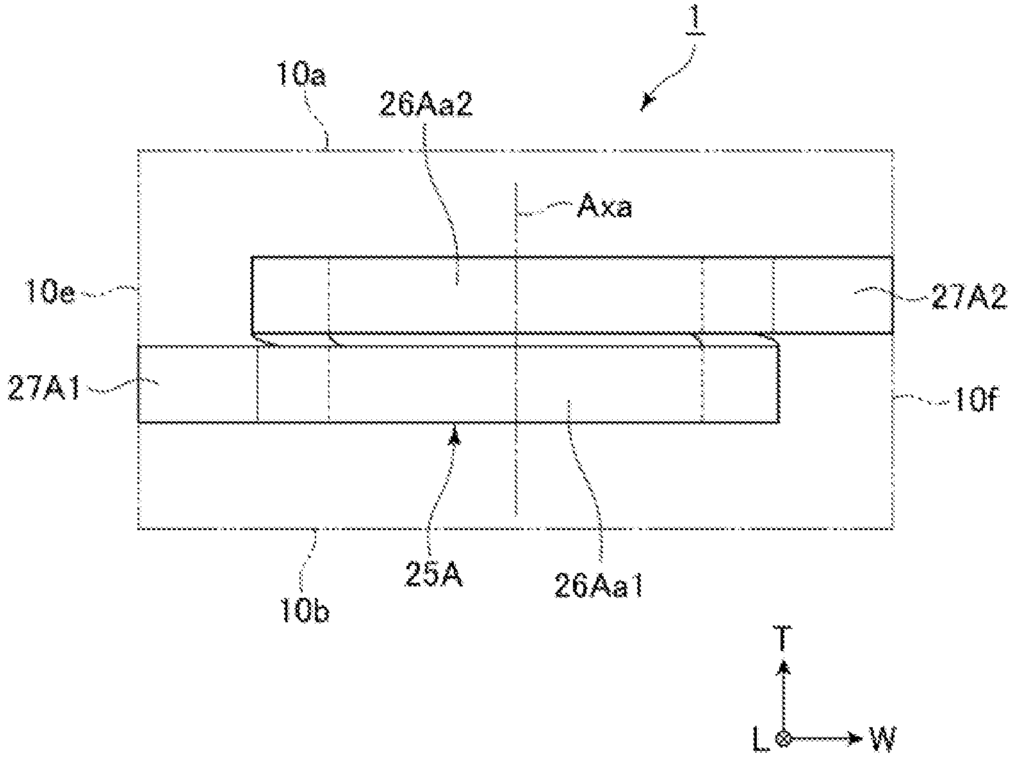
FIG. 3 is a right side view of the inductor array of FIG. 1.
Figure 4:
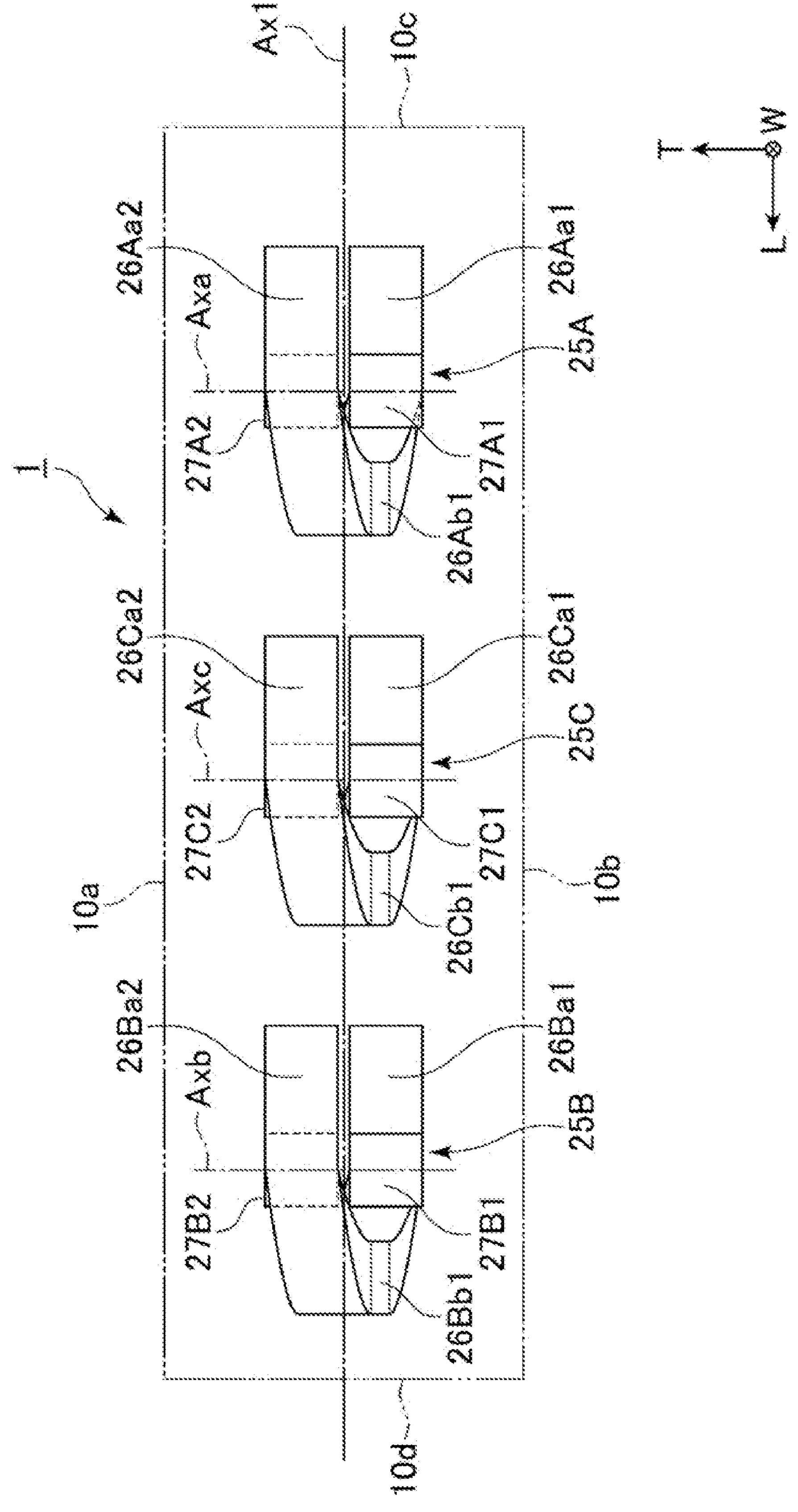
FIG. 4 is a front view of the inductor array of FIG. 1.
Figure 5:
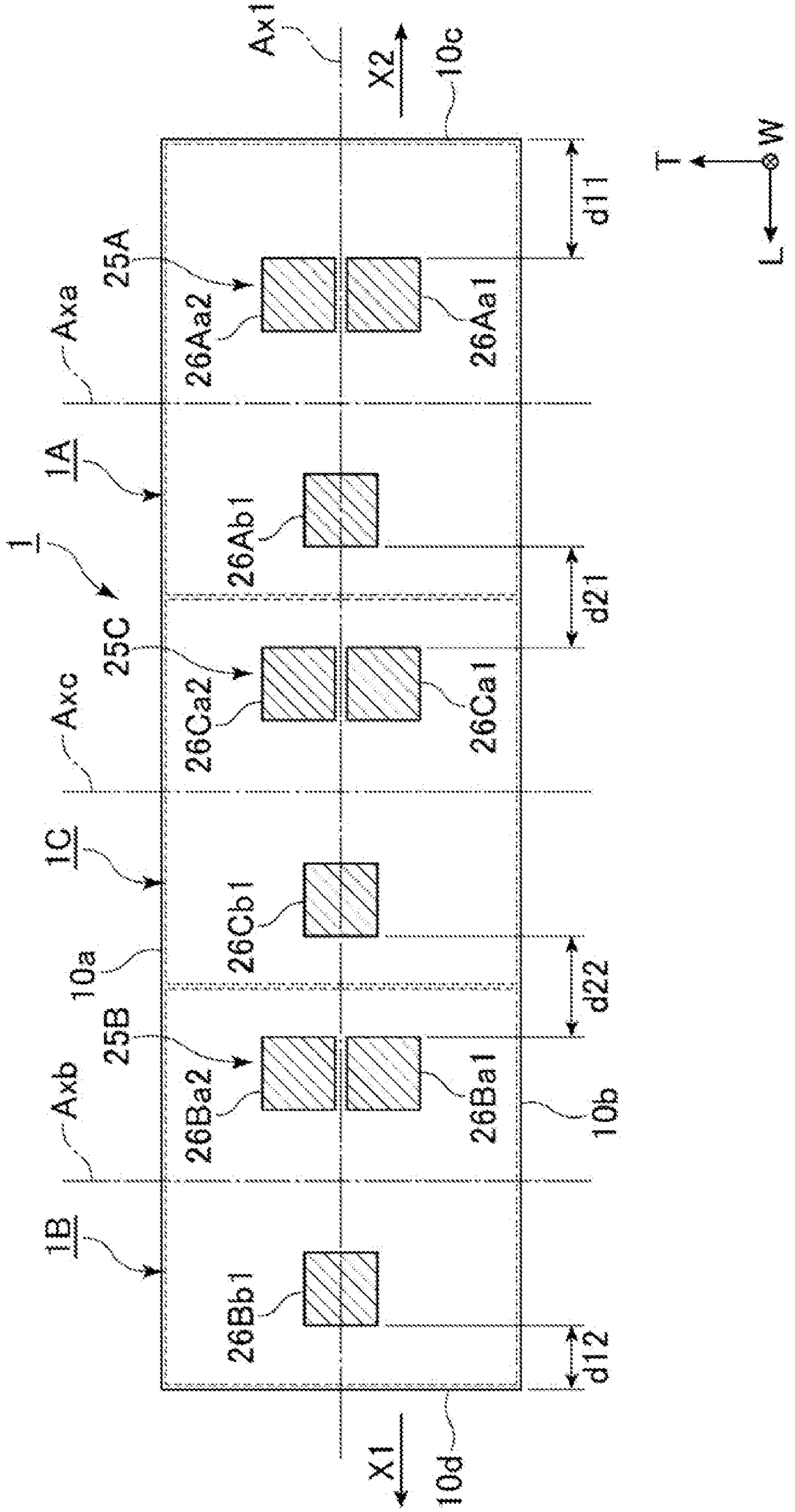
FIG. 5 is a schematic sectional view of the inductor array of FIG. 1 along the I-I line.

An inductor array 1 according to one or more embodiments of the present invention will now be described with reference to FIGS. 1 to 5. FIG. 1 is a perspective view of the inductor array 1 according to one embodiment of the invention. FIGS. 2 to 4 are respectively plan, right side and front views of the inductor array 1. In FIGS. 2 to 4, the base body is transparent to show the shape of the internal conductors. FIG. 5 is a sectional view schematically showing the section of the inductor array 1 along the I-I line in FIG. 1. In FIGS. 2 to 5, the external electrodes are not shown for convenience of description.

Each of the drawings shows the L axis, the W axis, and the T axis orthogonal to one another. In this specification, the "length" direction, the "width" direction, and the "thickness" direction of the inductor array 1 are referred to as the L-axis direction, W-axis direction, and T-axis direction in FIG. 1, respectively, unless otherwise construed from the context.

As shown, the inductor array 1 includes a base body 10, a plurality of internal conductors provided in the base body 10, and a plurality of external electrodes connected to the plurality of internal conductors at respective ends thereof. The internal conductors are spaced away from each other in the L-axis direction. In the illustrated embodiment, the base body 10 has therein an internal conductor 25A, an internal conductor 25B, and an internal conductor 25C interposed between the internal conductors 25A and 25B. The internal conductor 25A is the negative-side outermost internal conductor in the L-axis direction, and the internal conductor 25B is the positive-side outermost internal conductor in the L-axis direction. Between the internal conductors 25A and 25B, one or more internal conductors may be provided in addition to the internal conductor 25C. In other words, the inductor array 1 may include one or more internal conductors between the internal conductors 25A and 25B. As used herein, an intermediate internal conductor unit may refer to one or more internal conductors interposed between the internal conductors 25A and 25B. The inductor array 1 shown in FIG. 1 is an embodiment having a single internal conductor (i.e., the internal conductor 25C) as the intermediate internal conductor unit. The present invention may be applicable to inductor arrays having no intermediate internal conductor unit. The number of internal conductors constituting the intermediate internal conductor unit may not be limited to one, and may be two or more.

The inductor array 1 includes external electrodes, the number of which is determined by the number of internal conductors provided in the base body 10. Having the three internal conductors 25A, 25B, and 25C, the inductor array 1 relating to the illustrated embodiment includes six external electrodes 21A, 21B, 21C, 22A, 22B and 22C connected to the respective ends of the three internal conductors 25A, 25B, and 25C. More specifically, the internal conductor 25A is coupled to the first external electrode 21A at one end thereof and to the second external electrode 22A at the other end thereof. Similarly, the internal conductors 25B and 25C are respectively coupled to the external electrodes 21B and 21C at one end thereof and to the external electrodes 22B and 22C at the other end thereof.

As configured above, the inductor array 1 includes an inductor 1A including the internal conductor 25A and the external electrodes 21A and 22A, an inductor 1B including the internal conductor 25B and the external electrodes 21B and 22B, and an inductor 1C including the internal conductor 25C and the external electrodes 21C and 22C.

The inductor array 1 is used in, for example, a large-current circuit through which a large electric current flows. More specifically, the inductor array 1 may be an inductor used in a DC-to-DC converter.

The inductor array 1 may be mounted on a mounting substrate 2*a*. The mounting substrate 2*a* has six lands 3 provided thereon. When the inductor array 1 is mounted on the mounting substrate 2*a*, the six external electrodes 21A, 21B, 21C, 22A, 22B and 22C of the inductor array 1 are respectively positioned to face the corresponding lands 3. The inductor array 1 may be mounted on the mounting substrate 2*a* by soldering the external electrodes 21A, 21B, 21C, 22A, 22B and 22C and the corresponding lands 3, respectively. Thus, a circuit board 2 includes the inductor array 1 and the mounting substrate 2*a* on which the inductor array 1 is mounted. Various electronic components in addition to the inductor array 1 may be mounted on the mounting substrate 2*a*.

The circuit board 2 can be installed in various electronic devices. Electronic devices in which the circuit board 2 may be installed include smartphones, tablets, game consoles, servers, electrical components of automobiles, and various other electronic devices. The inductor array 1 may be a built-in component embedded in the mounting substrate 2*a*.

As formed as a single chip including three inductors, or the inductors 1A, 1B and 1C, the inductor array 1 is particularly suitable for small electronic devices that require high-density mounting of electronic components.

In the illustrated embodiment, the base body 10 has a rectangular parallelepiped shape. In one embodiment of the invention, the base body 10 has a length (the dimension in the L-axis direction) of 0.6 mm to 10 mm, a width (the dimension in the W-axis direction) of 0.2 mm to 10 mm, and a height (the dimension in the T-axis direction) of 0.2 mm to 10 mm. The dimension of such a region of the base body 10 in the L-axis direction containing a single inductor is 0.15 mm to 5.0 mm. The dimensions of the base body 10 are not limited to those specified herein. The term "rectangular parallelepiped" or "rectangular parallelepiped shape" used herein is not intended to mean solely "rectangular parallelepiped" in a mathematically strict sense.

The base body 10 has a first principal surface 10*a*, a second principal surface 10*b*, a first end surface 10*c*, a second end surface 10*d*, a first side surface 10*e*, and a second side surface 10*f*. These six surfaces define the outer periphery of the base body 10. The first principal surface 10*a* and the second principal surface 10*b* are opposed to each other, the first end surface 10*c* and the second end surface 10*d* are opposed to each other, and the first side surface 10*e* and the second side surface 10*f* are opposed to each other. Based on the position of the mounting substrate 2*a*, the first principal surface 10*a* lies on the top side of the base body 10, and therefore, the first principal surface 10*a* may be herein referred to as the "top surface," and the second principal surface 10*b* may be herein referred to as the "bottom surface." The first and second principal surfaces 10*a* and 10*b* and the first and second side surfaces 10*e* and 10*f* connect together the first and second end surfaces 10*c* and 10*d*.

The inductor array 1 is disposed such that the first principal surface 10*a* or the second principal surface 10*b* faces the mounting substrate 2*a*. One of the first principal surface 10*a* and the second principal surface 10*b* that faces the mounting substrate 2*a* is herein referred to as a "mounting surface." In the illustrated embodiment, the second principal surface 10*b* faces the mounting substrate 2*a*, so the second principal surface 10*b* is the "mounting surface." Thus, the second principal surface 10*b* may be referred to as the "mounting surface 10*b*." Since the "mounting surface" of the base body 10 is the surface facing the mounting substrate 2*a*, any surface other than the second principal surface 10*b* may be the mounting surface. The external electrodes 21A, 21B, 21C, 22A, 22B and 22C provided in the inductor array 1 at least partially contact the mounting surface of the base body 10. In the embodiment shown in FIG. 1, the external electrodes 21A, 21B, 21C, 22A, 22B and 22C are each partially in contact with the first and second principal surfaces 10*a* and 10*b* so either the first principal surface 10*a* or the second principal surface 10*b* can be used as the mounting surface.

In the illustrated embodiment, the first and second principal surfaces 10*a* and 10*b* are parallel to the LW plane, the first and second end surfaces 10*c* and 10*d* are parallel to the WT plane, and the first and second side surfaces 10*e* and 10*f* are parallel to the TL plane.

The top-bottom direction of the inductor array 1 refers to the top-bottom direction in FIG. 1. The thickness direction of the inductor array 1 or the base body 10 may be the direction perpendicular to at least one of the top surface 10*a* and the mounting surface 10*b*. The length direction of the inductor array 1 or the base body 10 may be the direction perpendicular to at least one of the first end surface 10*c* and the second end surface 10*d*. The width direction of the inductor array 1 or the base body 10 may be the direction perpendicular to at least one of the first side surface 10*e* and the second side surface 10*f*. The width direction of the inductor array 1 or the base body 10 may be the direction perpendicular to the thickness direction and the length direction of the inductor array 1 or the base body 10.

The following describes how the surfaces defining the base body 10 are related to the external electrodes. The external electrodes 21A, 21B, 21C, 22A, 22B, and 22C are in contact at least with the mounting surface 10*b*, from among the surfaces of the base body 10, as they need to be connected to the mounting substrate 2*a*. The external electrodes 21A, 21B, 21C, 22A, 22B, and 22C may be also in contact with other surface of the base body 10 than the mounting surface 10*b*. In the illustrated embodiment, the external electrodes 21A, 21B and 21C are in contact with the mounting surface 10*b*, the first side surface 10*e*, and the top surface 10*a* of the base body 10, and the external electrodes 22A, 22B and 22C are in contact with the mounting surface 10*b*, the second side surface 10*f*, and the top surface 10*a* of the base body 10. The external electrodes 21A, 21B and 21C may be provided on the base body 10 such that they are in contact with the mounting surface 10*b* and the first side surface 10*e* but not with the top surface 10*a*. The external electrodes 22A, 22B and 22C may be provided on the base body 10 such that they are in contact with the mounting surface 10*b* and the second side surface 10*f* but not with the top surface 10*a*. The shape and positioning of the external electrodes 21A, 21B, 21C, 22A, 22B and 22C are not limited to those explicitly described herein. The external electrodes 21A, 21B, 21C, 22A, 22B and 22C may have the same shape as each other or may have different shapes from each other. A pair of external electrodes may be selected from the external electrodes 21A, 21B, 21C, 22A, 22B and 22C, and the selected external electrodes may have the same shape.

The base body 10 is made of a magnetic material. The magnetic material for the base body 10 may contain a plurality of metal magnetic particles. The metal magnetic particles contained in the magnetic material for the base body 10 are, for example, particles of (1) a metal such as Fe or Ni, (2) a crystalline alloy such as an Fe—Si—Cr alloy, an Fe—Si—Al alloy, or an Fe—Ni alloy, (3) an amorphous alloy such as an Fe—Si—Cr—B—C alloy or an Fe—Si—Cr—B alloy, or (4) a mixture thereof. The composition of the metal magnetic particles contained in the base body 10 is not limited to those described above. For example, the metal magnetic particles contained in the base body 10 may be particles of a Co—Nb—Zr alloy, an Fe—Zr—Cu—B alloy, an Fe—Si—B alloy, an Fe—Co—Zr—Cu—B alloy, an Ni—Si—B alloy, or an Fe—Al—Cr alloy. The Fe-based metal magnetic particles contained in the base body 10 may contain 80 wt % or more Fe. An insulating film may be formed on the surface of each of the metal magnetic particles. The insulating film may be an oxide film made of an oxide of the above metals or alloys. The insulating film provided on the surface of each of the metal magnetic particles may be, for example, a silicon oxide film provided by the sol-gel coating process.

In one or more embodiments, the average particle size of the metal magnetic particles in the base body 10 is from 1.0 μm to 20 μm. The average particle size of the metal magnetic particles contained in the base body 10 may be smaller than 1.5 μm or larger than 20 μm. The base body 10 may contain two or more types of metal magnetic particles having different average particle sizes.

In the base body 10, the metal magnetic particles may be bonded to each other with an oxide film formed by oxidation of an element included in the metal magnetic particles during a manufacturing process. The base body 10 may contain a binder in addition to the metal magnetic particles. When the base body 10 contains a binder, the metal magnetic particles are bonded to each other by the binder. The binder in the base body 10 may be formed, for example, by curing a thermosetting resin that has an excellent insulation property. Examples of a material for such a binder include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin.

In one or more embodiments of the invention, the relative magnetic permeability of the base body 10 is 100 or less. In one or more embodiments of the invention, the relative magnetic permeability of the base body 10 is 30 or greater. When the inductor array 1 is used in a high frequency circuit, the relative magnetic permeability of the base body 10 may be reduced. For example, when the inductor array 1 operates at a frequency of about 100 MHz, the lower limit of the relative magnetic permeability of the base body 10 may be 20 or greater. When the inductor array 1 operates at a higher frequency band, the lower limit of the relative magnetic permeability of the base body 10 may be 10 or greater. In one or more embodiments of the invention, the relative magnetic permeability of the base body 10 is in the range of 30 to 100 (both inclusive). The base body 10 may be configured to have a relative magnetic permeability in the range of 30 to 100 in its entire region. As described above, the inductor array 1 may be used in DC to DC converters where a low inductance is required. When the base body 10 has a relative magnetic permeability of 100 or less, it is easy to achieve a required low inductance. When the base body 10 has a relative magnetic permeability of 100 or less, it is also easy to achieve high current characteristics. When the base body 10 has a relative magnetic permeability of 100 or less, it is also easy to achieve high insulation properties. When the base body 10 has a relative magnetic permeability of 100 or less, it is possible to reduce the chance of magnetic saturation. Therefore there is no need to provide a magnetic gap in the base body 10 to improve the DC superposition characteristics.

As mentioned above, the relative magnetic permeability of the base body 10 of the inductor array 1 can take a small value, such as 100 or smaller, so that the inductance L of each line of inductor included in the inductor array 1 also takes a small value. As each line of inductor exhibits low inductance, the inductor array 1 is unlikely to experience magnetic saturation. As a result, it is possible to let a large current flow through each line of inductor included in the inductor array 1. Accordingly, in one or more embodiments of the present invention, each line of inductor in the inductor array 1 can achieve increased energy density Ed, which is expressed as the result of dividing the product of the inductance L of the inductor and the square of the current I flowing through the inductor by the volume V of the inductor ($Ed=L\times I^2/V$). For example, when the inductance L of each line of inductor in the inductor array 1 is less than 100 nH, the inductor can have Ed of 1500 $nH\cdot A/mm^3$. Alternatively, when the inductance L of each line of inductor in the inductor array 1 is less than 50 nH, the inductor can have Ed of 2000 $nH\cdot A/mm^3$.

The base body 10 may have uniform magnetic permeability. The base body 10 has a first margin region, a second margin region, a top cover region, a bottom cover region, and an inter-conductor region. The first margin region is positioned between the internal conductor 25A and the first end surface 10*c*, the second margin region is positioned between the internal conductor 25B and the second end surface 10*d*, the top cover region is positioned between the top end of the internal conductors 25A to 25C and the top surface 10*a* of the base body 10, the bottom cover region is positioned between the bottom end of the internal conductors 25A to 25C and the bottom surface 10*b* of the base body 10, and the inter-conductor region is positioned between the internal conductors. In the base body 10, the first margin region, the second margin region, and the inter-conductor region may have the same magnetic permeability. In the base body 10, the first margin region, the second margin region, the top cover region, the bottom cover region and the inter-conductor region may have the same magnetic permeability. The uniform magnetic permeability of the base body 10 can be realized by, for example, making a plurality of magnetic sheets from the same magnetic material and stacking the magnetic sheets into the base body 10. In this case, since the magnetic sheets constituting the base body 10 are made of the same magnetic material, the magnetic permeability of the base body 10 is the same among the regions constituting the base body 10. From among the first margin region, the second margin region, the top cover region, the bottom cover region and the inter-conductor region of the base body 10, the first margin region, the second margin region and the inter-conductor region may have the same magnetic permeability.

The internal conductors 25A, 25B and 25C are all provided within the base body 10. The internal conductors 25A, 25B and 25C may all have the same shape. The following more specifically describes the shape and positioning of the internal conductors 25A, 25B and 25C. Since the internal conductors 25A, 25B and 25C have the same shape, the following describes the shape of the internal conductor 25A and does not specifically describe the shape of the internal conductors 25B and 25C for the sake of brevity of description.

The internal conductor 25A includes a winding portion 26A, a lead-out conductor portion 27A1, and a lead-out conductor portion 27A2. The winding portion 26A is spirally wound around a coil axis Axa extending along the T-axis direction, the lead-out conductor portion 27A1 extends outwardly from one end of the winding portion 26A in a direction along the W-axis direction to connect the winding portion 26A to the external electrode 21A, and the lead-out conductor portion 27A2 extends outwardly from the other end of the winding portion 26A in the direction along the W-axis direction to connect the winding portion 26A to the external electrode 22A. In the embodiment shown, the coil axis Axa intersects the top and bottom surfaces 10*a* and 10*b*, but does not intersect the first and second end surfaces 10*c*, 10*d* and the first and second side surfaces 10*e*, 10*f*. In other words, the first end surface 10*c*, the second end surface 10*d*, the first side surface 10*e*, the second side surface 10*f* extend along the coil axis Axa.

In the winding portion 26A, a plurality of first conductor portions and one or more second conductor portions smaller in number than the first conductor portions alternate with and are connected to each other. In the illustrated embodiment, the winding portion 26A includes two first conductor portions 26Aa1 and 26Aa2 and one second conductor portion 26Ab1. The first conductor portions 26Aa1 and 26Aa2 are an example of the first conductor portions included in the winding portion 26A, and the second conductor portion 26Ab1 is an example of the second conductor portions included in the winding portion 26A. The number of first conductor portions included in the winding portion 26A is not limited to two. In one embodiment, the number of first conductor portions included in the winding portion 26A ranges from two to four. In one embodiment, the number of second conductor portions included in the winding portion 26A is smaller by one than the number of first conductor portions. The number of second conductor portions included in the winding portion 26A ranges from one to three, for example. When the number of first conductor portions included in the winding portion 26A is two, three and four, the number of turns in the winding portion 26A is respectively approximately 1.5, 2.5 and 3.5.

More specifically, the winding portion 26A includes a first conductor portion 26Aa1, a second conductor portion 26Ab1, and a first conductor portion 26Aa2. The first conductor portion 26Aa1 is connected to the lead-out conductor portion 27A1 and extends counterclockwise around the coil axis Axa from the connected portion to the lead-out conductor portion 27A1. The second conductor portion 26Ab1 extends counterclockwise around the coil axis Axa from the end of the first conductor portion 26Aa1 opposite to its end connected to the lead-out conductor portion 27A1. The first conductor portion 26Aa2 extends counterclockwise around the coil axis Axa from the end of the second conductor portion 26Ab1 opposite to its end connected to the first conductor portion 26Aa1. As described above, in the winding portion 26A, the first conductor portions 26Aa1 and 26Aa2 and the second conductor portion 26Ab1 alternate with and are connected to each other. Even if the numbers of first and second conductor portions increase, the first and second conductor portions alternate with each other. The first conductor portions 26Aa1 to 26Aa2 extend, as a whole, along the first end surface 10*c*, and the second conductor portion 26Ab1 extends, as a whole, along the second end surface 10*d*. If it is required to draw a boundary between the first conductor portions 26Aa1 to 26Aa2 and the second conductor portion 26Ab1, an imaginary plane VSa passing through the coil axis Axa and parallel to the WT plane can be used as the boundary plane lying between the first conductor portions 26Aa1 to 26Aa2 and the second conductor portion 26Ab1. The first conductor portions 26Aa1 and 26Aa2 can be collectively referred to as the first conductor portions 26Aa.

As mentioned above, the number of first conductor portions constituting the winding portion 26A is greater than the number of second conductor portions constituting the winding portion 26A. Accordingly, as the current flowing through the internal conductor 25A changes, the first conductor portions generate more magnetic fluxes than the second conductor portion. In the illustrated embodiment, if the current flowing through the internal conductor 25A changes, the first conductor portions 26Aa generate more magnetic fluxes than the second conductor portion 26Ab1. This means that the magnetic fluxes generated by the internal conductor 25A are not distributed in a uniform manner in the circumferential direction centered on the coil axis Axa.

The internal conductor 25B includes a winding portion 26B, a lead-out conductor portion 27B1, and a lead-out conductor portion 27B2. The winding portion 26B is spirally wound around a coil axis Axb extending along the T-axis direction, the lead-out conductor portion 27B1 extends outwardly from one end of the winding portion 26B in a direction along the W-axis direction to connect the winding portion 26B to the external electrode 21B, and the lead-out conductor portion 27B2 extends outwardly from the other end of the winding portion 26B in the direction along the W-axis direction to connect the winding portion 26B to the external electrode 22B. More specifically, the winding portion 26B includes a first conductor portion 26Ba1, a second conductor portion 26Bb1, and a first conductor portion 26Ba2. The first conductor portion 26Ba1 is connected to the lead-out conductor portion 27B1 and extends counterclockwise around the coil axis Axb from the connected portion to the lead-out conductor portion 27B1. The second conductor portion 26Bb1 extends counterclockwise around the coil axis Axb from the end of the first conductor portion 26Ba1 opposite to its end connected to the lead-out conductor portion 27B1. The first conductor portion 26Ba2 extends counterclockwise around the coil axis Axb from the end of the second conductor portion 26Bb1 opposite to its end connected to the first conductor portion 26Ba1. If it is required to draw a boundary between the first conductor portions 26Ba1 to 26Ba2 and the second conductor portion 26Bb1, an imaginary plane VSb passing through the coil axis Axb and parallel to the WT plane can be used as the boundary plane lying between the first conductor portions 26Ba1 to 26Ba2 and the second conductor portion 26Bb1. The first conductor portions 26Ba1 and 26Ba2 can be collectively referred to as the first conductor portions 26Ba. The number of first conductor portions constituting the winding portion 26B is greater than the number of second conductor portions constituting the winding portion 26B. Accordingly, as the current flowing through the internal conductor 25B changes, the first conductor portions generate more magnetic fluxes than the second conductor portion.

The internal conductor 25C includes a winding portion 26C, a lead-out conductor portion 27C1, and a lead-out conductor portion 27C2. The winding portion 26C is spirally wound around a coil axis Axc extending along the T-axis direction, the lead-out conductor portion 27C1 extends outwardly from one end of the winding portion 26C in a direction along the W-axis direction to connect the winding portion 26C to the external electrode 21C, and the lead-out conductor portion 27C2 extends outwardly from the other end of the winding portion 26C in the direction along the W-axis direction to connect the winding portion 26C to the external electrode 22C. More specifically, the winding portion 26C includes a first conductor portion 26Ca1, a second conductor portion 26Cb1, and a first conductor portion 26Ca2. The first conductor portion 26Ca1 is connected to the lead-out conductor portion 27C1 and extends counterclockwise around the coil axis Axc from the connected portion to the lead-out conductor portion 27C1. The second conductor portion 26Cb1 extends counterclockwise around the coil axis Axc from the end of the first conductor portion 26Ca1 opposite to its end connected to the lead-out conductor portion 27C1. The first conductor portion 26Ca2 extends counterclockwise around the coil axis Axc from the end of the second conductor portion 26Cb1 opposite to its end connected to the first conductor portion 26Ca1. If it is required to draw a boundary between the first conductor portions 26Ca1 to 26Ca2 and the second conductor portion 26Cb1, an imaginary plane VSc passing through the coil axis Axc and parallel to the WT plane can be used as the boundary plane lying between the first conductor portions 26Ca1 to 26Ca2 and the second conductor portion 26Cb1. The first conductor portions 26Ca1 and 26Ca2 can be collectively referred to as the first conductor portions 26Ca. The number of first conductor portions constituting the winding portion 26C is greater than the number of second conductor portions constituting the winding portion 26C. Accordingly, as the current flowing through the internal conductor 25C changes, the first conductor portions generate more magnetic fluxes than the second conductor portion.

Since the internal conductors 25A, 25B and 25C have the same shape, the inductor array 1 can easily achieve uniform electrical characteristics among the lines (i.e., the inductors 1A, 1B and 1C) formed therein. The internal conductors 25A, 25B and 25C can be provided within the base body 10 and placed at the same level in the T-axis direction. Specifically, as shown in FIG. 5, the internal conductors 25A, 25B and 25C are at the same level in the T-axis direction such that their respective top surfaces are at the same level in the T-axis direction and their respective bottom surfaces are at the same level in the T-axis direction.

The internal conductors 25A, 25B and 25C may differ from each other in terms of shape due to the manufacturing- and/or measurement-induced errors, but this does not deny that the internal conductors 25A, 25B and 25C have the same shape as far as the present specification is concerned. In order to determine whether two internal conductors have the same shape, one or more of the following criteria can be used, for example. The following describes, for the sake of description, the criteria based on which whether the internal conductors 25A and 25B have the same shape is determined, but the same criteria can be used to determine whether other internal conductors have the same shape.

Criterion 1 (the Determination is Made Based on the Sectional Area of the Internal Conductor Obtained when the Internal Conductor is Cut Along a Plane Parallel to the WL Plane.)

The inductor array 1 is cut along a plane parallel to the WL plane and passing through the internal conductors 25A and 25B, and the absolute value of the difference (Sa1−Sb1) between the area (Sa1) of the section of the internal conductor 25A and the area (Sb1) of the section of the internal conductor 25B is calculated. If the absolute value of the difference is equal to or less than a predetermined value, it can be determined that the internal conductors 25A and 25B have the same shape. For example, if the ratio of the absolute value of the difference between the area Sa1 of the section of the internal conductor 25A and the area Sb1 of the section of the internal conductor 25B to the area of one of the sections compared against each other (for example, the area Sa1 of the section of the internal conductor 25A) (for example, (Sa1−Sb1)/Sa1) is equal to or less than a predetermined value, it can be determined that the internal conductors 25A and 25B have the same shape. The predetermined value can be, for example, 0.1, 0.05, 0.03, 0.02, or 0.01. For the areas of the sections of the internal conductors 25A and 25B used in the above-described determining process, the inductor array 1 can be alternatively cut along three planes parallel to the WL plane and passing through the internal conductors 25A and 25B, and the average value of the areas of the resulting three sections of the internal conductor 25A and the average value of the areas of the resulting three sections of the internal conductor 25B can be used.

Criterion 2 (the Determination is Made Based on the Sectional Area of the Internal Conductor Obtained when the Internal Conductor is Cut Along a Plane Parallel to the LT Plane.)

The inductor array 1 is cut along a plane parallel to the LT plane and passing through the internal conductors 25A and 25B, and the absolute value of the difference (Sa2−Sb2) between the area (Sa2) of the section of the internal conductor 25A and the area (Sb2) of the section of the internal conductor 25B is calculated. If the absolute value of the difference is equal to or less than a predetermined value, it can be determined that the internal conductors 25A and 25B have the same shape. For example, if the ratio of the absolute value of the difference between the area Sa2 of the section of the internal conductor 25A and the area Sb2 of the section of the internal conductor 25B to the area of one of the sections compared against each other (for example, the area Sa2 of the section of the internal conductor 25A) (for example, (Sa2−Sb2)/Sa2) is equal to or less than a predetermined value, it can be determined that the internal conductors 25A and 25B have the same shape. The predetermined value can be, for example, 0.1, 0.05, 0.03, 0.02, or 0.01. For the areas of the sections of the internal conductors 25A and 25B used in the above-described determining process, the inductor array 1 can be alternatively cut along three planes parallel to the LT plane and passing through the internal conductors 25A and 25B, and the average value of the areas of the resulting three sections of the internal conductor 25A and the average value of the areas of the resulting three sections of the internal conductor 25B can be used.

Criterion 3 (the Determination is Made Based on Electrical Resistance.)

The external electrodes are removed from the inductor array 1, so that the internal conductors 25A and 25B are exposed at one end thereof through the first side surface 10*e* and at the other end thereof through the second side surface 10*f*. Then, electrical resistance Ra between the ends of the internal conductor 25A and electrical resistance Rb between the ends of the internal conductor 25B are measured. If the difference between the electrical resistances Ra and Rb falls within a predetermined range, the internal conductors 25A and 25B can be determined to have the same shape. For example, the difference between the electrical resistances Ra and Rb (Ra−Rb) is calculated. If the ratio of the absolute value of the difference to one of the electrical resistances compared against each other (for example, the electrical resistance of the internal conductor 25A) (for example, (Ra−Rb)/Ra is equal to or less than a predetermined value, the internal conductors 25A and 25B can be determined to have the same shape. The predetermined value can be, for example, 0.1, 0.05, 0.03, 0.02, or 0.01.

The internal conductors 25A and 25B can be determined to have the same shape or not based on any one of or combination of the foregoing criteria. For example, the criterion 1 can be selected, and used to determine whether the internal conductors 25A and 25B have the same shape. The criteria 1 and 3 can be combined. In this case, the internal conductors 25A and 25B can be determined to have the same shape if the ratio of the absolute value of the difference between the sectional area of the internal conductor 25A and the sectional area of the internal conductor 25B, which are obtained by cutting the inductor array 1 along a plane parallel to the WL plane, to the sectional area of the internal conductor 25A is equal to or less than a predetermined value and the difference between (i) the electrical resistance Ra between the ends of the internal conductor 25A and (ii) the electrical resistance Rb between the ends of the internal conductor 25B falls within a predetermined range.

The internal conductors 25A, 25B and 25C can be made by winding a ribbon-like member made of a conductive material around a core. The internal conductors 25A, 25B and 25C are placed in a molding die, and a magnetic material is poured into the molding die and molded under a predetermined molding pressure, so that the inductor array 1 can be obtained. The inductor array 1 may have a multilayer structure of multiple magnetic sheets. The inductor array 1 may be made by providing a plurality of magnetic sheets having the internal conductors 25A, 25B and 25C formed on the surface thereof and stacking the magnetic sheets on each other. The internal conductors 25A, 25B and 25C may be formed by printing a conductive paste made of a highly conductive metal or alloy on each magnetic sheet by screen printing. The conductive material contained in the conductive paste may be Ag, Cu, or alloys thereof. Among the internal conductors 25A, 25B and 25C, one of adjacent internal conductors may be formed on the front surface of a magnetic sheet, and the other may be formed on the rear surface of the magnetic sheet. For example, the internal conductor 25A may be formed on the front surface of a magnetic sheet, and the internal conductor 25C1 adjacent to the internal conductor 25A may be formed on the rear surface of the magnetic sheet. The internal conductors 25A and 25B can be made of other materials and using other techniques. For example, the internal conductors 25A, 25B and 25C may be formed by sputtering, ink-jetting, or other known methods.

The following describes how the internal conductors 25A to 25C are arranged relative to the base body 10 mainly with reference to FIG. 5. As shown in FIG. 5, the internal conductors 25A, 25B and 25C are aligned with a reference axis Ax1. The reference axis Ax1 extends along the L-axis and is an imaginary axis extending through the first and second end surfaces 10*c* and 10*d*. As used herein, a first direction X1 denotes the direction extending along the reference axis Ax1 from the first end surface 10*c* toward the second end surface 10*d*, and a second direction X2 denotes the reversed direction (i.e., the direction extending along the reference axis Ax1 from the second end surface 10*d* toward the first end surface 10*c*). The first and second directions X1 and X2 are referred to describe how the components of the inductor array 1 are arranged.

The base body 10 is oriented along the reference axis Ax1 and defined between the first and second end surfaces 10*c* and 10*d*. This means that, in a reference axis direction extending along the reference axis Ax1, the base body 10 terminates at the first end surface 10*c* on one side and at the second end surface 10*d* at the other side.

The internal conductor 25A is in the base body 10 and adjacent to the first end surface 10*c*. More specifically, the internal conductor 25A is positioned away from the first end surface 10*c* by a distance d11 in the first direction X1. The internal conductor 25A is arranged such that the first conductor portions 26Aa face the first end surface 10*c*.

The internal conductor 25B is in the base body 10 and adjacent to the second end surface 10*d*. More specifically, the internal conductor 25B is positioned away from the second end surface 10*d* by a distance d12 in the second direction X2. The internal conductor 25B is arranged such that the second conductor portion 26Bb1 faces the second end surface 10*d*.

As adjacent to the first end surface 10*c*, where the base body 10 terminates on one side in the reference axis direction (a first end of the base body 10), the internal conductor 25A may be herein referred to as a first end internal conductor 25A. Similarly, as adjacent to the second end surface 10*d*, where the base body 10 terminates on the other side in the reference axis direction (a second end of the base body 10), the internal conductor 25B may be herein referred to as a second end internal conductor 25B. Since the distance d11 indicates the distance between the first end internal conductor 25A and the first end surface 10*c*, the distance d11 may be herein referred to as a first end distance d11. Similarly, since the distance d12 indicates the distance between the second end internal conductor 25B and the second end surface 10*d*, the distance d12 may be herein referred to as the second end distance d12.

As described above, between the internal conductors 25A and 25B, one or more internal conductors may be provided and constitute an intermediate internal conductor unit. The intermediate internal conductor unit is positioned away from the first end internal conductor 25A by a distance d21 in the first direction X1 and positioned away from the second end internal conductor 25B by a distance d22 in the second direction X2. In the illustrated embodiment, the intermediate internal conductor unit includes the single internal conductor 25C. Accordingly, the internal conductor 25C is positioned away from the first end internal conductor 25A by the distance d21 in the first direction X1 and positioned away from the second end internal conductor 25B by the distance d22 in the second direction X2. When the intermediate internal conductor unit includes more than one internal conductor, the distance d21 between the first end internal conductor 25A and the intermediate internal conductor unit indicates the distance between the first end internal conductor 25A and one of the internal conductors included in the intermediate internal conductor unit that is adjacent to the first end internal conductor 25A. Likewise, when the intermediate internal conductor unit includes more than one internal conductor, the distance d22 between the second end internal conductor 25B and the intermediate internal conductor unit indicates the distance between the second end internal conductor 25B and one of the internal conductors included in the intermediate internal conductor unit that is adjacent to the second end internal conductor 25B. While the distances d11 and d12 represent the distance between the internal conductor and the end surface of the base body, the distances d21 and d22 represent the distance between the internal conductors. For this reason, the distances d21 and d22 may be both referred to as inter-conductor distances and are respectively referred to as a first inter-conductor distance d21 and a second inter-conductor distance d22 if they need to be distinguished from each other. When the intermediate internal conductor unit has more than one internal conductor, a third inter-conductor distance may refer to the distance between adjacent ones of the internal conductors constituting the intermediate internal conductor unit (the distance in the direction extending along the reference axis Ax1).

In one or more embodiments of the present invention, the first and second end internal conductors 25A and 25B are arranged such that the first end distance d11 is greater than the second end distance d12. This is represented as d11>d12. As already described, if the current flowing through the first end internal conductor 25A changes, the first conductor portions 26Aa generate more magnetic fluxes than the second conductor portion 26Ab1. The first end internal conductor 25A is thus arranged such that the first conductor portions 26Aa, which generate more magnetic fluxes, face the first end surface 10*c*. On the other hand, the second end internal conductor 25B is arranged such that the second conductor portion 26Bb1, which generates fewer magnetic fluxes, faces the second end surface 10*d*. In one or more embodiments of the present invention, the first end distance d11 is greater than the second end distance d12. Accordingly, a sufficient region can be left between the first end internal conductor 25A and the first end surface 10*c* of the base body 10 to allow the relatively more magnetic fluxes generated by the first conductor portions 26Aa of the first end internal conductor 25A to pass therethrough. This can reduce degradation of the inductance of the inductor 1A including the first end internal conductor 25A.

In conventional inductor arrays, the internal conductors are arranged at regular intervals next to each other in the reference axis direction within the base body. This means that the gap between one of the outermost internal conductors in the reference axis direction and the surface of the base body that faces this outermost internal conductor is equal to the gap between the other of the outermost internal conductors in the reference axis direction and the surface of the base body that faces this outermost internal conductor. In other words, when the conventional inductor arrays are examined in a section corresponding to the section shown in FIG. 5, the gap corresponding to the first end distance d11 is equal to the gap corresponding to the second end distance d12. This results in degrading the inductance of one of the outermost inductors in the reference axis direction (the inductor corresponding to the inductor 1A). In contrast, in one or more embodiments of the present invention, the first and second end internal conductors 25A and 25B are arranged such that the first end distance d11 between the first end internal conductor 25A and the first end surface 10*c* of the base body 10 is greater than the second end distance d12 between the second end internal conductor 25B and the second end surface 10*d* of the base body 10. With such arrangement, the inductors of the inductor array 1 can achieve more uniform inductances than the inductors constituting the conventional inductor arrays where the internal conductors are arranged at even intervals in the base body 10.

In one or more embodiments of the present invention, the inter-conductor distances d21 and d22 may be both less than twice the first end distance d11. If the internal conductors 25A to 25C are arranged in the base body 10 evenly next to each other along the reference axis Ax1, the internal conductors 25A to 25C are located at the center of the corresponding inductors 1A to 1C in the direction extending along the reference axis Ax1. This means that the inter-conductor distances d21 and d22 are twice the first end distance d11. Since the inter-conductor distances d21 and d22 are both less than twice the first end distance d11, the degradation of the inductance of the inductor 1A is reduced so that the inductors 1A, 1B and 1C can achieve more uniform inductances, when compared with conventional inductor arrays where the internal conductors 25A to 25C are arranged within the base body 10 at even intervals in the direction extending along the reference axis Ax1.

In one or more embodiments of the present invention, the inter-conductor distances d21 and d22 are both less than the first end distance d11. In other words, the first end distance d11 may be greater than both of the inter-conductor distances d21 and d22. Since the first end distance d11 is greater than the inter-conductor distances d21 and d22, the degradation of the inductance of the inductor 1A is sufficiently reduced so that the inductors 1A, 1B and 1C can achieve more uniform inductances.

In one or more embodiments of the present invention, the first end distance d11 may be less than the inter-conductor distances d21 and d22 and greater than half the inter-conductor distances d21 and d22. This may be represented as (d21, d22)/2<d11<d21, d22. With such arrangement, the first end distance d11 is less than the inter-conductor distances d21 and d22. As a result, the degradation of the inductance of the inductor 1A can be reduced, and the inductor array 1 can be saved from having a large size in the direction extending along the reference axis Ax1.

In one or more embodiments of the present invention, the first inter-conductor distance d21 may be equal to the second inter-conductor distance d22. Since the first inter-conductor distance d21 is equal to the second inter-conductor distance d22, the magnetic fluxes can be uniformly distributed within the base body 10. This can contribute to improve the DC superimposition characteristics of the inductor array 1. The first and second inter-conductor distances d21 and d22 may differ from each other due to manufacturing- and/or measurement-induced errors, but this does not deny that the first and second inter-conductor distances d21 and d22 are equal to each other.

In one or more embodiments of the present invention, the average of the distances between the internal conductors within the base body 10 (i.e., the average of the inter-conductor distances) is less than the first and second end distances d11 and d12. For example, in the embodiment shown in FIG. 5, the average of the first and second inter-conductor distances d21 and d22 (i.e., (d21+d22)/2) may be less than the first end distance d11. In this case, the internal conductors can be more densely arranged in the reference axis direction in a region closer to the center of the base body 10 in the direction extending along the reference axis Ax1.

As described above, the internal conductors 25A and 25B may be arranged at the center of the base body 10 in the T-axis direction, which is perpendicular to the reference axis direction. In other words, the distance between the internal conductor 25A and the top surface 10*a* may be equal to the distance between the internal conductor 25A and the bottom surface 10*b*. In addition, the distance between the internal conductor 25B and the top surface 10*a* may be equal to the distance between the internal conductor 25B and the bottom surface 10*b*.

The internal conductors 25A, 25B and 25C may be at the same distance from the top surface 10*a*. Likewise, the internal conductors 25A, 25B and 25C may be at the same distance from the bottom surface 10*b*.

The following now describes inductor arrays according to other embodiments, to which the present invention is applicable, with reference to FIGS. 6 to 11.

Figure 6:
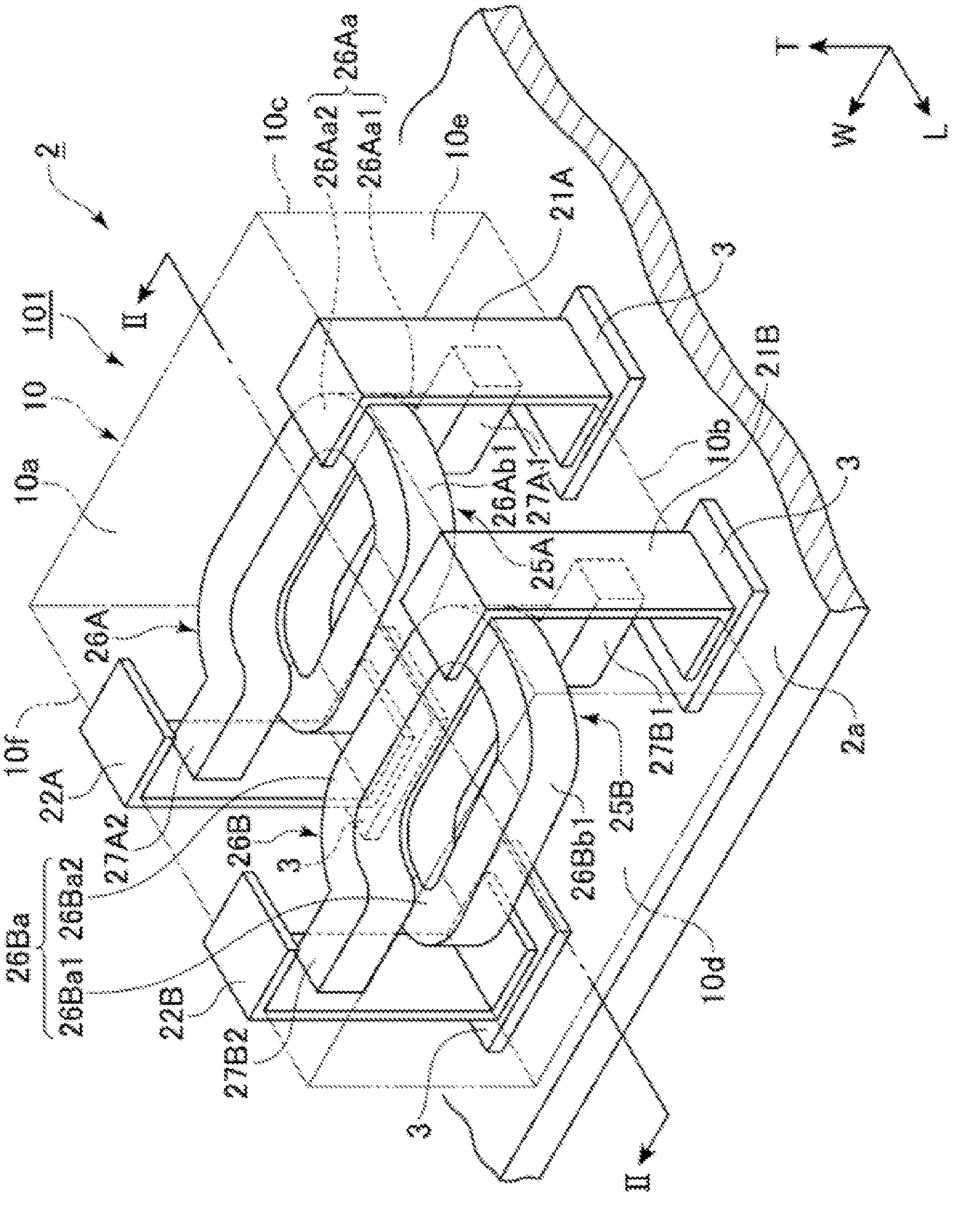
FIG. 6 is a sectional view schematically showing a section of an inductor array according to another embodiment of the present invention.
Figure 7:
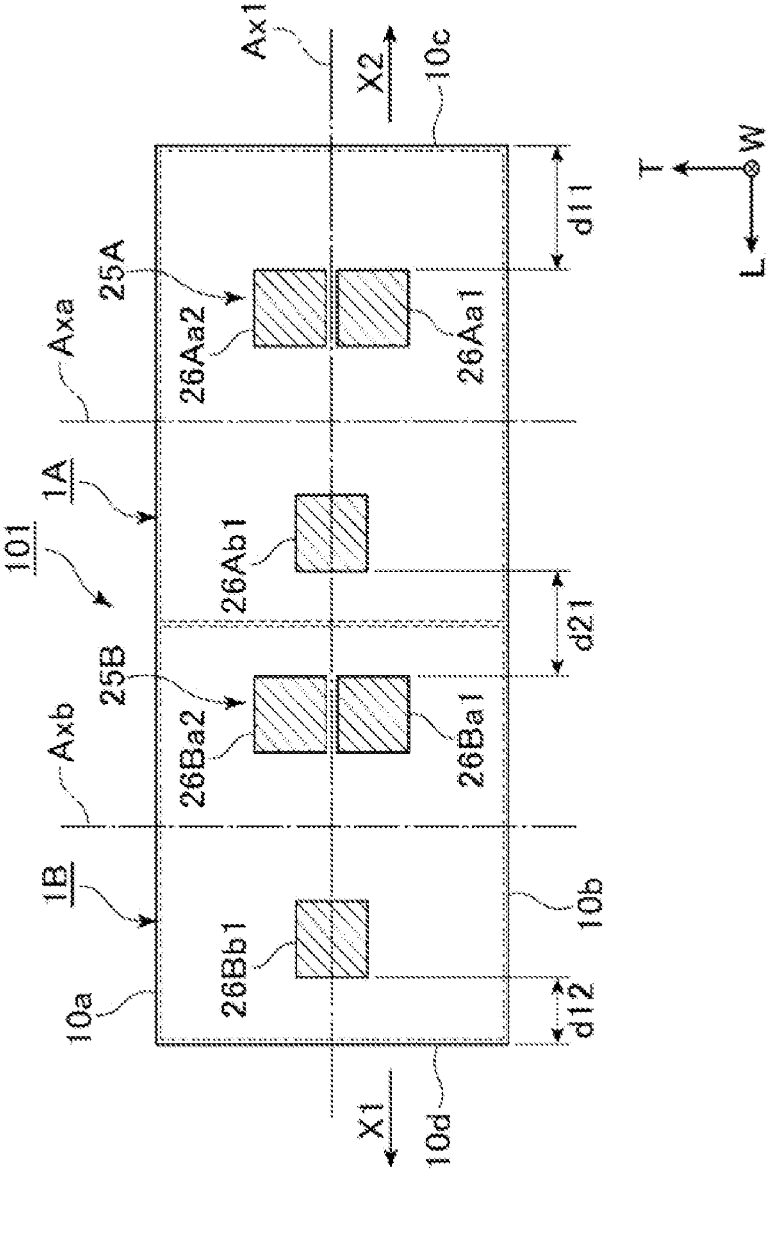
FIG. 7 is a schematic sectional view of the inductor array of FIG. 6 along the line II-II.

To begin with, an inductor array 101 according to another embodiment, to which the present invention is applicable, will be described with reference to FIGS. 6 and 7. FIG. 6 is a perspective view showing the inductor array 101, and FIG. 7 shows a section of the inductor array 101 along the II-II line of FIG. 6. While the inductor array 1 includes the internal conductors 25A, 25B and 25C constituting the three lines, the inductor array 101 includes internal conductors 25A and 25B constituting two lines. The following description does not mention the common features shared between the inductor arrays 1 and 101.

As shown in FIGS. 6 and 7, the internal conductor 25A is adjacent to the internal conductor 25B. The internal conductors 25A and 25B are spaced away from each other by a distance d21 in the reference axis Ax1 direction. In one or more embodiments of the present invention, the first end distance d11 is greater than the inter-conductor distance d21. Since the first end distance d11 is greater than the inter-conductor distance d21, the degradation of the inductance of the inductor 1A is sufficiently reduced so that the inductors 1A and 1B can achieve more uniform inductances. In one or more embodiments of the present invention, the first end distance d11 may be less than the inter-conductor distance d21. If the first end distance d11 is less than the inter-conductor distance d21, the inductor array 101 can achieve a smaller size in the direction extending along the reference axis Ax1.

In the inductor array 101, the first and second end internal conductors 25A and 25B are also arranged in the base body 10 such that the first end distance d11 is greater than the second end distance d12, as in the inductor array 1. Since the first end distance d11 is greater than the second end distance d12, the degradation of the inductance of the inductor 1A can be reduced.

Figure 8:
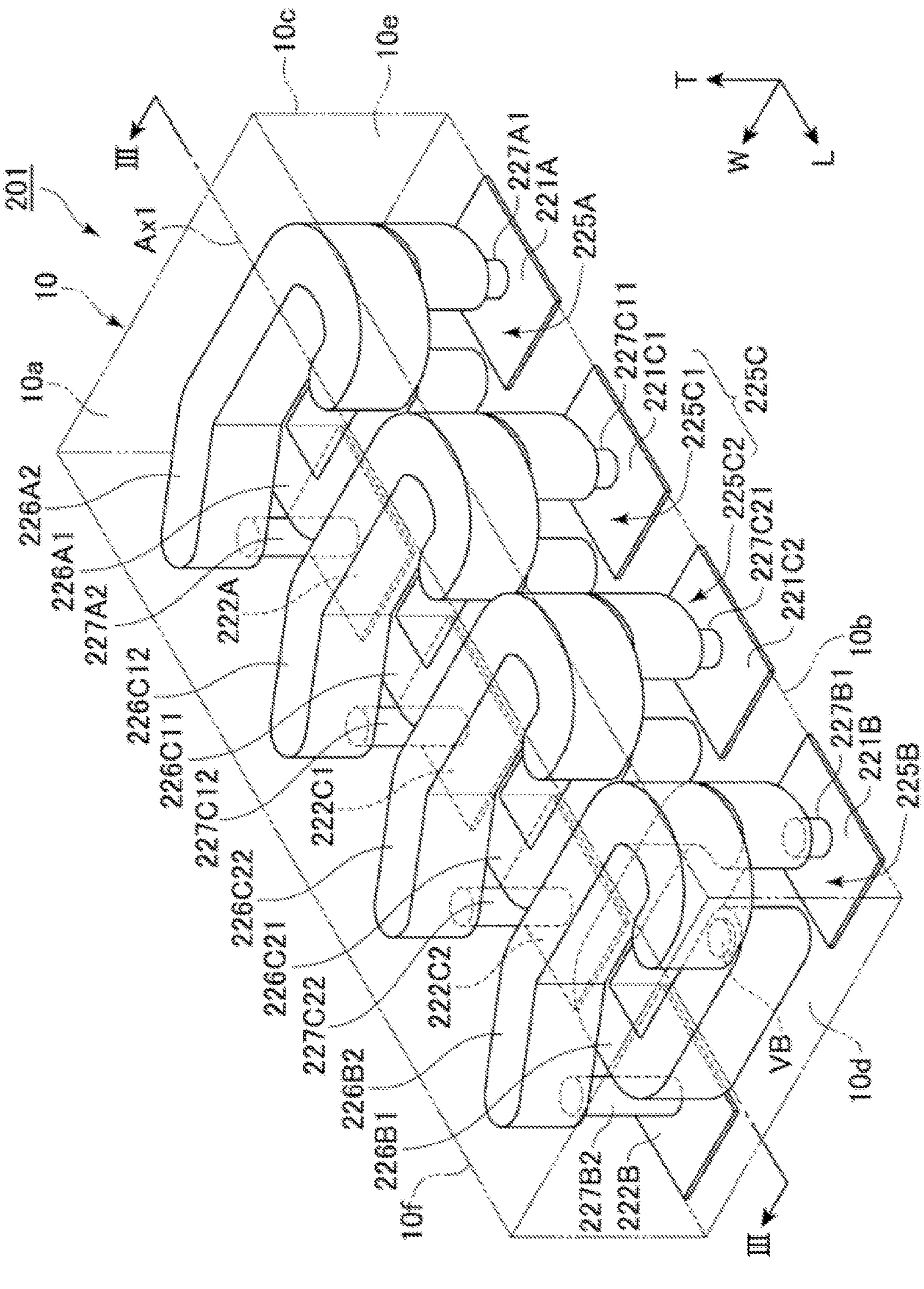
FIG. 8 is a perspective view of the inductor array according to another embodiment of the invention.
Figure 9:
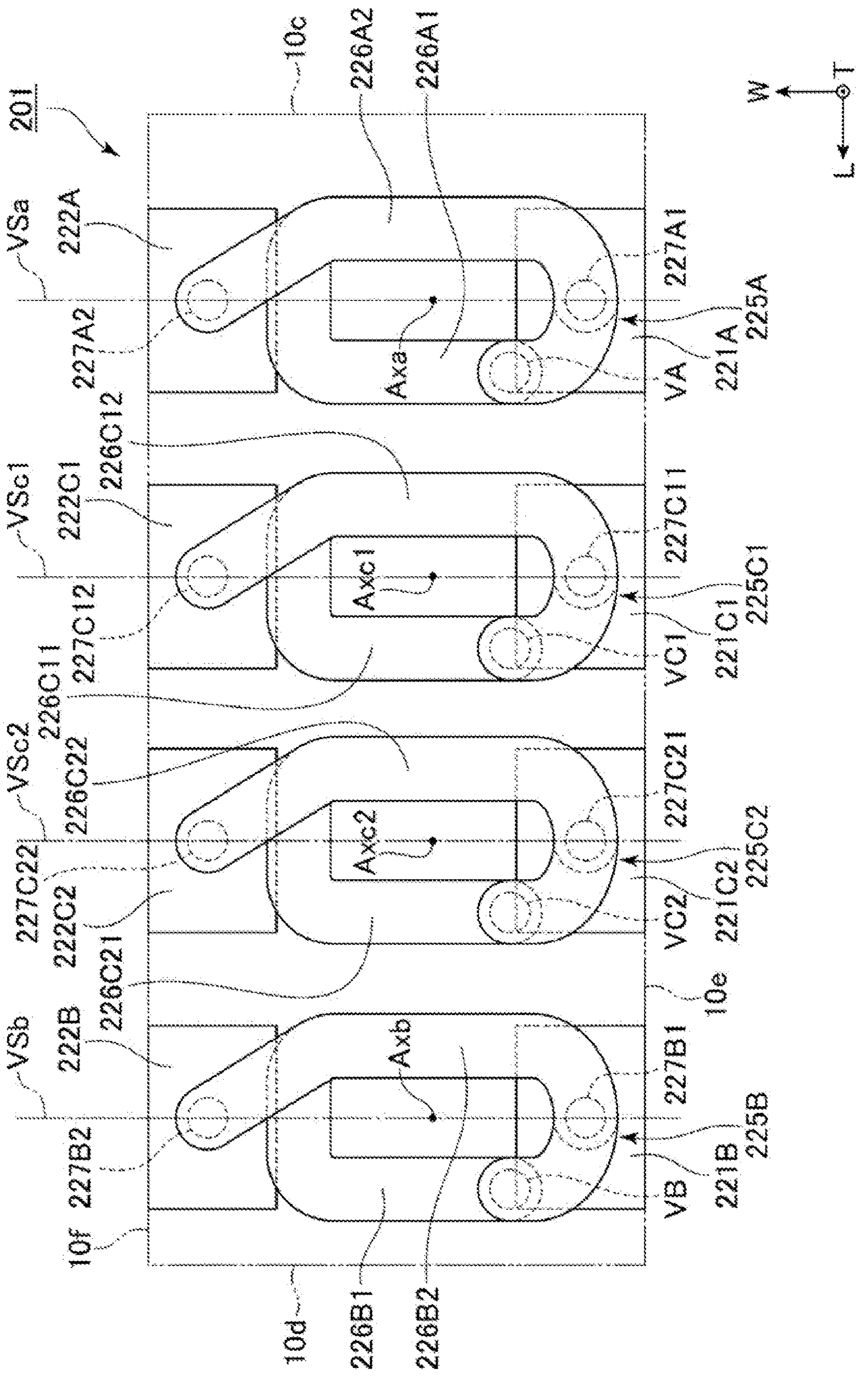
FIG. 9 is a plan view of the inductor array of FIG. 8.
Figure 10:
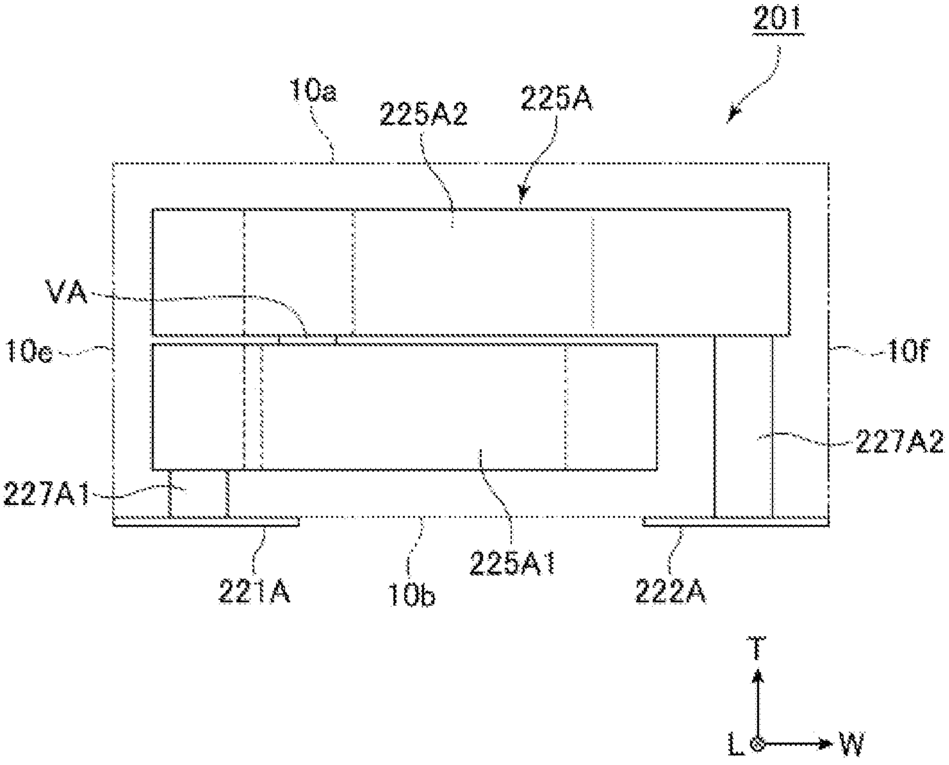
FIG. 10 is a right side view of the inductor array of FIG. 8.
Figure 11:
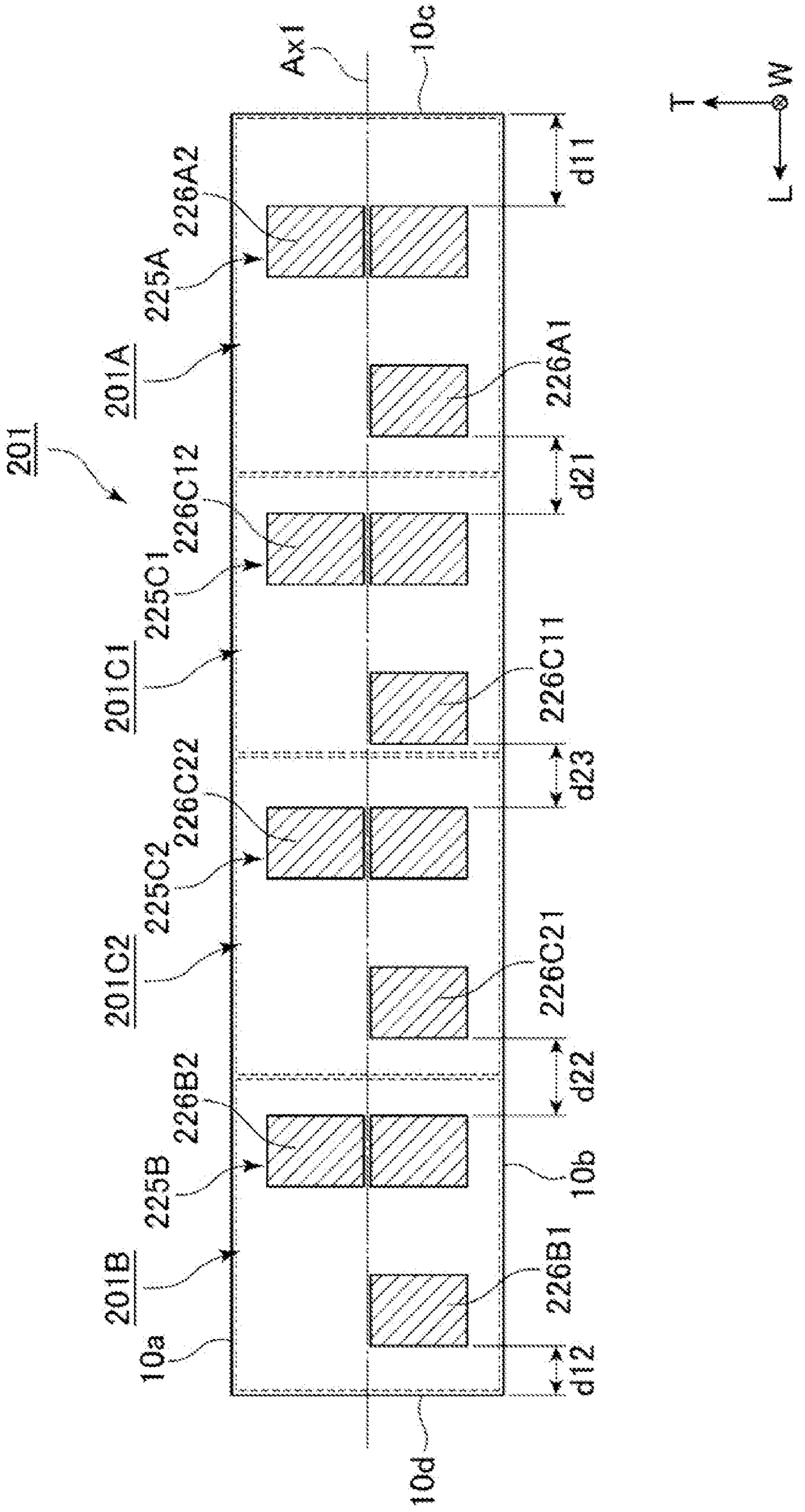
FIG. 11 is a schematic sectional view of the inductor array of FIG. 8 along the line III-III.

Subsequently, an inductor array 201 according to another embodiment, to which the present invention is applicable, will be described with reference to FIGS. 8 to 11. FIG. 8 is a perspective view of the inductor array 201, FIG. 9 is a plan view showing the inductor array 201, FIG. 10 is a right side view showing the inductor array 201, and FIG. 11 is a schematic sectional view of the inductor array 201 along the III-III line in FIG. 8. The inductor array 201 is a modification example of the inductor array 1. While the inductor array 1 includes the internal conductors 25A, 25B and 25C constituting the three lines, the inductor array 201 includes internal conductors 225A, 225B, 225C1 and 225C2 constituting four lines. In addition, the internal conductors 225A, 225B, 225C1 and 225C2 are shaped differently from the internal conductors 25A, 25B and 25C. The inductor array 201 includes external electrodes 221A to 221C2 and external electrodes 222A to 222C2. The following description does not mention the common features shared between the inductor arrays 1 and 201.

The external electrodes 221A to 221C2 and external electrodes 222A to 222C2 are each shaped like a plate and provided on the bottom surface 10*b* of the base body 10. The shape and positioning of the external electrodes 221A to 221C2 and external electrodes 222A to 222C2 are not limited to those specified in the drawings.

In the illustrated embodiment, the internal conductors 225A, 225B, 225C1 and 225C2 are each wound around a coil axis extending perpendicularly to the reference axis Ax1. More specifically, the internal conductor 225A includes a first winding portion 226A1, a first lead-out conductor 227A1, a second winding portion 226A2, and a second lead-out conductor 227A2. The first winding portion 226A1 is wound approximately 0.8 turns around a coil axis Axa extending perpendicularly to the reference axis Ax1, the first lead-out conductor 227A1 is connected to one end of the first winding portion 226A1, the second winding portion 226A2 is connected to the other end of the first winding portion 226A1 via a via conductor VA and wound approximately 0.7 turns around a coil axis, and the second lead-out conductor 227A2 is connected to an end of the second winding portion 226A2 that is opposite to its end connected to the via conductor VA. As noted, the internal conductor 225A is wound around the coil axis approximately 1.5 turns. The internal conductor 225A is connected to the external electrode 221A at the first lead-out conductor 227A1 and connected to the external electrode 222A at the second lead-out conductor 227A2.

The internal conductor 225A is an example of the first end internal conductor, and the internal conductor 225B is an example of the second end internal conductor. The inductor array 201 includes two internal conductors constituting an intermediate internal conductor unit, i.e., the internal conductors 22501 and 225C2.

The following further describes the shape of the first and second winding portions 226A1 and 226A2 of the internal conductor 225A. As seen in the T-axis direction, the first winding portion 226A1 is wound approximately 0.8 turns counterclockwise in the circumferential direction centered on the coil axis Axa and extends from the first lead-out conductor 227A1. The first winding portion 226A1 has a curved portion in the vicinity of the first lead-out conductor 227A1 and the remaining portion extends linearly in the direction extending along the W- or L-axis. As seen in the T-axis direction, the second winding portion 226A2 is wound approximately 0.7 turns counterclockwise in the circumferential direction centered on the coil axis Axa and extends from the via conductor VA. The second winding portion 226A2 has a curved portion in the vicinity of the via conductor VA, and the remaining portion extends linearly. When the internal conductor 225A is viewed in the T-axis direction, the negative end in the W-axis direction has a curved shape and the remaining portion is generally linearly shaped. This means that the internal conductor 225A is asymmetrically shaped in the W-axis direction when seen from above. The internal conductor 225A is asymmetrically shaped in the L-axis direction when seen from above. The via conductor VA is offset in the W-axis direction from the center of the internal conductor 225A toward the negative side. When seen from above, while the first lead-out conductor 227A1 overlaps both of the first and second winding portions 226A1 and 226A2, the second lead-out conductor 227A2 overlaps the second winding portion 226A2, but does not overlap the first winding portion 226A1. In other words, the second lead-out conductor 227A2 is offset radially outwardly from the projection of the first winding portion 226A1. When seen from above, a core region, which is enclosed by the first and second winding portions 226A1 and 226A2, is offset in the W-axis direction from the center of the base body 10 toward the negative side. The shape of the internal conductor 225A is not limited to the illustrated one and can be modified in various manners. For example, the curved portion in the illustrated embodiment can be modified into a linearly shaped portion. On the contrary, the linearly shaped portion in the illustrated embodiment can be modified into a curved portion.

The internal conductors 225B, 225C1 and 225C2 are made in the same manner as the internal conductor 225A. More specifically, the internal conductor 225B includes a first winding portion 226B1, a second winding portion 226B2, a first lead-out conductor 227B1, a second lead-out conductor 227B2 and a via conductor VB. The first winding portion 226B1, the second winding portion 226B2, the first lead-out conductor 227B1, the second lead-out conductor 227B2, and the via conductor VB are respectively configured in the same manner as the first winding portion 226A1, the second winding portion 226A2, the first lead-out conductor 227A1, the second lead-out conductor 227A2, and the via conductor VA. In addition, the internal conductor 225C1 has a first winding portion 226C11, a second winding portion 226C12, a first lead-out conductor 227C11, a second lead-out conductor 227C12, and a via conductor VC1, and the internal conductor 225C2 includes a first winding portion 226C21, a second winding portion 226C22, a first lead-out conductor 227C21, a second lead-out conductor 227C22, and a via conductor VC2. The first winding portions 226C11 and 226C21, the second winding portions 226C12 and 226C22, the first lead-out conductors 227C11 and 227C21, the second lead-out conductors 227C12 and 227C22 and the via conductors VC1 and VC2 are respectively configured in the same manner as the first winding portion 226A1, the second winding portion 226A2, the first lead-out conductor 227A1, the second lead-out conductor 227A2, and the via conductor VA. The internal conductor 225B is connected to the external electrode 221B at the first lead-out conductor 227B1 and connected to the external electrode 222B at the second lead-out conductor 227B2. The internal conductor 225C1 is connected to the external electrode 221C1 at the first lead-out conductor 227C11 and connected to the external electrode 222C1 at the second lead-out conductor 227C12. The internal conductor 225C2 is connected to the external electrode 221C2 at the first lead-out conductor 227C21 and connected to the external electrode 222C2 at the second lead-out conductor 227C22. The description on the internal conductor 225A also applies to the internal conductors 225B, 225C1 and 225C2.

The internal conductors 225A, 225B, 225C1 and 225C2 all have the same shape. The internal conductors 225A, 225B, 225C1 and 225C2 can be provided within the base body 10 and placed at the same level in the T-axis direction. Specifically, as shown in FIG. 11, the internal conductors 225A, 225B, 225C1 and 225C2 are at the same level in the T-axis direction such that their respective top surfaces are at the same level in the T-axis direction and their respective bottom surfaces are at the same level in the T-axis direction.

In the foregoing embodiment, the first and second winding portions 226A1 and 226A2 constitute the winding portion of the internal conductor 225A. The winding portion of the internal conductor 225A is divided into first and second conductor portions by an imaginary plane VSa passing through the coil axis Axa and extending parallel to the Wt-plane. Specifically, the first conductor portions indicate the portions of the first and second winding portions 226A1 and 226A2 that are closer to the first end surface 10*c* with respect to the imaginary plane VSa, and the second conductor portions indicate the portions that are closer to the second end surface 10*d* with respect to the imaginary surface VSa. This means that the winding portion of the internal conductor 225A is constituted by the first and second conductor portions alternating with each other. Likewise, the winding portion of the internal conductor 225B is constituted by first and second winding portions 226B1 and 226B2, the winding portion of the internal conductor 225C1 is constituted by the first and second winding portions 226C11 and 226C12, and the winding portion of the internal conductor 225C2 is constituted by the first and second winding portions 226C21 and 226C22. The winding portions of the internal conductors 225B, 225C1 and 225C2 are respectively divided into first and second conductor portions by imaginary planes VSb, VSc1 and VSc2 passing through coil axes Axb, Axc1 and Axc2 and extending parallel to the WT-plane. This means that the winding portions of the internal conductors 225B, 225C1 and 225C2 are also each constituted by the first and second conductor portions alternating with each other.

In the inductor array 201, the first and second end internal conductors 225A and 225B are arranged in the base body 10 such that the first end distance d11 is greater than the second end distance d12, as in the inductor array 1. Since the first end distance d11 is greater than the second end distance d12, the degradation of the inductance of the inductor 201A can be reduced.

The inventors of the present invention have performed simulations to compare (i) the inductances of inductors included in a inductor array (comparative example) in which internal conductors (the number of turns is 1.5) shaped in the same manner as the internal conductors 225A to 225C2 are arranged at even intervals within a base body and (ii) the inductances of the inductors of the inductor array 201 in which the internal conductors 225A to 225C2 are arranged such that the first end distance d11 is greater than the second end distance d12 as shown in FIGS. 8 to 11. Here, the distance d23 indicates the distance between the internal conductor 225C1 and the internal conductor 225C2. The simulations include preparing, as a comparative example, an inductor array including four inductors where four internal conductors shaped in the same manner as the internal conductors 225A to 225C2 are arranged within a base body at even intervals (d21=d22=d23=2d11=2d12) and calculating the inductances of the inductors. In the inductor array prepared as the comparative example, the inductance of the inductor including the internal conductor corresponding to the outermost internal conductor 225A in the reference axis direction was 15.2% lower than the average of the inductances of the four inductors. The simulations also include preparing, as an implementation example of the present invention, an inductor array where the internal conductors 225A to 225C2 are arranged such that the first end distance d11 is doubled and the relation d21=d22=d23=2d11=d12 is satisfied, and calculating the inductances of the inductors. The inductance of the inductor including the internal conductor 225A was 4.6% lower than the average of the inductances of the four inductors respectively including the internal conductors 225A to 225C2. These results have confirmed that the implementation example of the present invention can significantly reduce the difference (degradation) between the inductance of one of the outermost inductors in the arrangement direction in the inductor array (the inductor including the internal conductor 225A) and the average of the inductances of the inductors included in the inductor array, in particular, reducing the difference to 5% or less. Although varying depending on the applications, the tolerances of inductors are typically 5% or more (for example, 10%). Accordingly, the implementation example of the present invention can reduce the difference between the inductance of the outermost inductor of the inductor array in the arrangement direction and the inductances of the inductors of the inductor array such that the difference can fall within the commonly required tolerances. The simulations have confirmed that the inductances of the inductors may vary depending on the specific values of the distances d21, d22, d23, d11 and d12, but the degradation of the inductance of the outermost inductor in the arrangement direction (the inductor including the internal conductor 225A) can be reduced if the relation d11>d12 is satisfied.

The simulations include changing the number of turns in the internal conductors of the inductors of the inductor array (comparative example) where the internal conductors shaped in the same manner as the internal conductors 225A to 225C2 are arranged at even intervals within the base body and calculating the inductances of the inductors. The simulations also include changing the number of turns in the internal conductors of the inductors of the inductor array (implementation example of the present invention) where the four inductors are arranged within the base body such that the relation d21=d22=d23=2d11=2d12 is satisfied and calculating the inductances of the inductors. As described above, when the number of turns in the inductors is 1.5 in the comparative example, the inductance of the inductor including the outermost internal conductor in the reference axis direction corresponding to the internal conductor 225A was 15.2% lower than the average of the inductances of the four inductors. In the implementation example of the present invention, on the other hand, the inductance of the inductor including the internal conductor 225A was 4.6% lower than the average of the inductances of the four inductors including the internal conductors 225A to 225C2. When the number of turns in each inductor in the comparative example is 2.5 and 3.5, the inductance of the inductor including the outermost internal conductor in the reference axis direction corresponding to the internal conductor 225A was 11.2% and 8.2%, respectively, lower than the average of the inductances of the four inductors. In the implementation example of the present invention, on the other hand, the inductance of the inductor including the internal conductor 225A was 3% and 2.3%, respectively, lower than the average of the inductances of the four inductors including the internal conductors 225A to 225C2. These results have confirmed that, when the number of turns in the internal conductors is equal to or less than 3.5, the implementation example of the present invention can remarkably reduce the degradation of the inductance of the outermost inductor in the arrangement direction (the inductor including the internal conductor 225A). When the number of turns is greater or 4.5 or more, on the other hand, the magnetic fluxes are less unevenly distributed in the circumferential direction centered on the coil axis. Accordingly, even if the internal conductors are arranged at even intervals within the base body, the inductance of one of the outermost inductors in the arrangement direction drops less significantly. Even in the comparative example, the inductance drops 5% or less. As a result, arranging the internal conductors such that the relation d11>d12 is satisfied is not as effective in reducing the degradation of the inductance as when the number of turns is equal to or less than 3.5. The simulations thus confirmed that the present invention is applicable to any inductor arrays including internal conductors irrespective of the number of turns, but can significantly reduce the degradation of the inductance of one of the outermost inductors in the arrangement direction (the inductor including the internal conductor 225A) when applied to inductor arrays including internal conductors wound 3.5 turns or less.

In one or more embodiments of the present invention, the average of the distances between the internal conductors within the base body 10 (i.e., the average of the inter-conductor distances) is less than the first and second end distances d11 and d12. If there is more than one intermediate internal conductor, the average of the distances between the internal conductors is the average of the first, second and third inter-conductor distances. For example, in the embodiment shown in FIG. 11, the average of the first, second and third inter-conductor distances d21, d22 and d23 (i.e., (d21+d22+d23)/3) represents the average of the distances between the internal conductors, and the distance between the internal conductors calculated by this expression may be less than the first end distance d11. In this case, the internal conductors can be more densely arranged in the reference axis direction in a region closer to the center of the base body 10 in the direction extending along the reference axis Ax1. The average if the distances between the internal conductors can be calculated in the same manner when the intermediate internal conductor unit includes three or more internal conductors.

Figure 12:
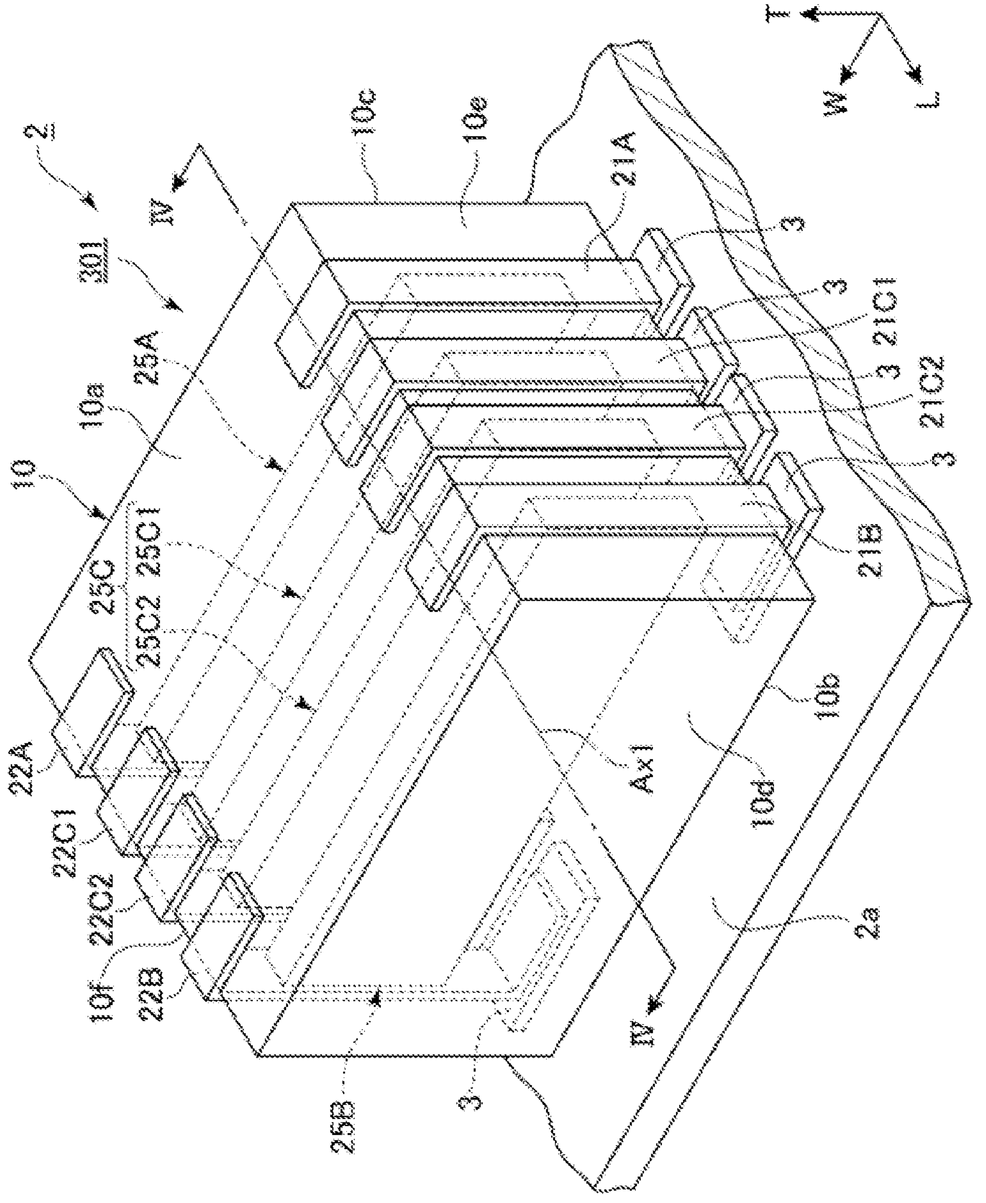
FIG. 12 is a perspective view of an inductor array according to another embodiment of the invention mounted on a mounting substrate.
Figure 13:
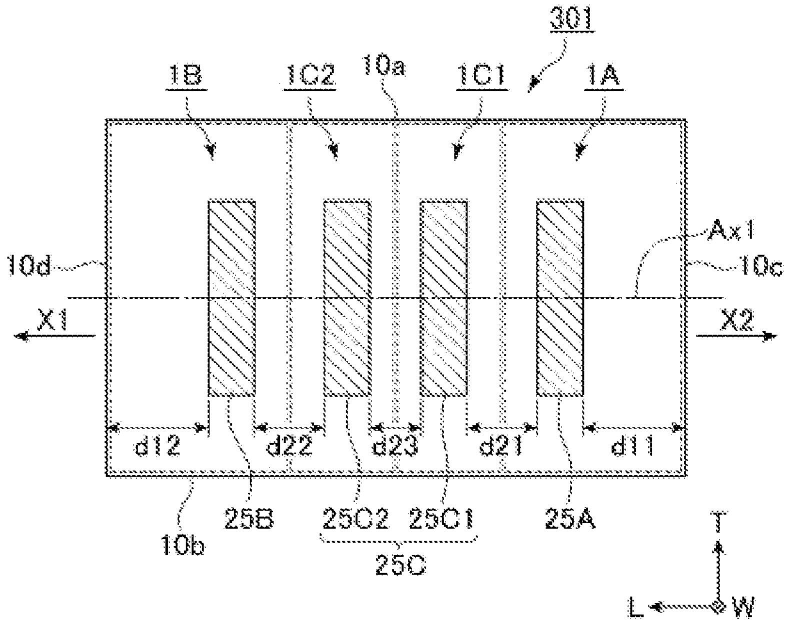
FIG. 13 is a schematic sectional view of the inductor array of FIG. 12 along the IV-IV line.
Figure 14:
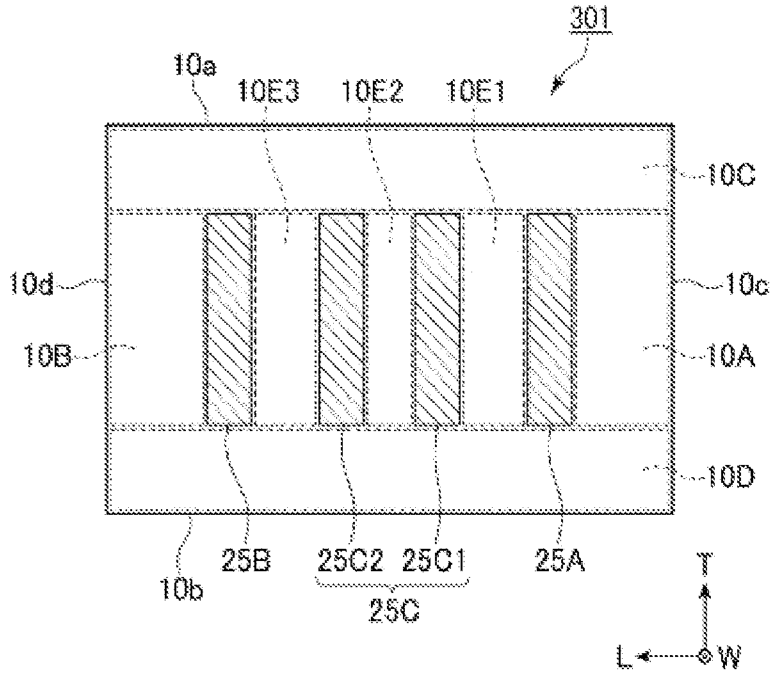
FIG. 14 is a schematic sectional view of the inductor array of FIG. 12 along the IV-IV line, showing a plurality of separate regions of the magnetic base body.

The following describes an inductor array 301 according to one or more other embodiments of the present invention with reference to FIGS. 12 to 14. FIG. 12 is a perspective view of the inductor array 301 according to one embodiment of the present invention, and FIGS. 13 and 14 are both schematic sectional views of the inductor array 301 along the Iv-Iv line in FIG. 12. FIG. 13 illustrates how the internal conductors are arranged, and FIG. 14 illustrates the regions of the base body. The following description does not mention the common features shared between the inductor arrays 1 and 301.

The internal conductors 25A, 25B 2501, and 25C2 are all provided within the base body 10. The internal conductors 25A, 25B, 2501 and 25C2 all have the same shape. In the illustrated embodiment, the internal conductors 25A, 25B, 2501 and 25C2 all have the same rectangular parallelepiped shape. Since the internal conductors 25A, 25B, 2501 and 25C2 have the same shape, the inductor array 301 can easily achieve uniform electrical characteristics among the lines (i.e., the inductors 1A, 1B, 1C1 and 1C2) formed therein. The internal conductors 25A, 25B, 25C1 and 25C2 can be provided within the base body 10 and placed at the same level in the T-axis direction. Specifically, as shown in FIG. 13, the internal conductors 25A, 25B, 25C1 and 25C2 are at the same level in the T-axis direction such that their respective top surfaces are at the same level in the T-axis direction and their respective bottom surfaces are at the same level in the T-axis direction.

As shown, the internal conductors 25A, 25B, 25C1 and 25C2 may extend linearly from the first side surface 10*e* to the second side surface 10*f* in plan view (as viewed in the T-axis direction). The internal conductors 25A, 25B, 25C1 and 25C2 can be shaped in any other manners than the illustrated such that they have winding portions, as will be described below. The other possible shapes of the internal conductors 25A, 25B, 25C1 and 25C2 will be described below. In the illustrated embodiment, the internal conductors 25A, 25B, 25C1 and 25C2 have a rectangular parallelepiped shape. Therefore, when a voltage is applied between the external electrodes 21A and 22A, between the external electrodes 21B and 22B, between the external electrodes 21C1 and 22C1, and between the external electrodes 21C2 and 22C2, the current flows in the direction along the W axis in the internal conductors 25A, 25B, 25C1 and 25C2.

In the illustrated embodiment, the internal conductors 25A, 25B, 25C1 and 25C2 are exposed at one end thereof to the outside of the base body 10 through the first side surface 10*e* and is connected to the external electrode 21A, 21B, 21C1 and 21C2 at the one end. The internal conductors 25A, 25B, 25C1 and 25C2 are also exposed at the other end thereof to the outside of the base body 10 through the second side surface 10*f* and connected to the external electrode 22A, 22B, 22C1 and 22C2 at the other end. In this way, to connect the internal conductors 25A, 25B, 25C1 and 25C2 to the external electrodes, the internal conductors 25A, 25B, 25C1 and 25C2 are not exposed through the mounting surface, but are connected, outside the base body 10, to the mounting surface via the external electrodes 21A, 22A, 21B, 22B, 21C1, 22C1, 21C1 and 21C2 formed on the first and second side surfaces 10*e* and 10*f*. In this manner, the volume of the base body 10 can account for an increased part in the overall volume of the inductor array 301. Consequently, the base body 10, which is made of a magnetic material, can account for an increased ratio in volume in the inductor array 301. This can result in increasing the saturation magnetic flux density of the base body 10.

As described above, the internal conductor 25A extends linearly from the external electrode 21A to the external electrode 22A in plan view (as viewed in the T-axis direction) in the illustrated embodiment. Stated differently, the internal conductor 25A has no parts facing each other in the base body 10 in plan view. Herein, when the internal conductor 25A has no parts facing each other in the base body 10 in plan view, it can be said that the internal conductor 25A extends linearly from the external electrode 21A to the external electrode 22A. Since the internal conductor 25A extends linearly from the external electrode 21A to the external electrode 22A as described above, the inductor 1A can achieve higher insulation reliability (withstand voltage) without changing the volume resistivity of the base body 10, than conventional inductors that have internal conductors with parts facing each other in plan view. The internal conductor 25A may be disposed on a straight line drawn from the external electrode 21A to the external electrode 22A. The internal conductor 25A may include multiple conductor layers arranged in parallel between the external electrode 21A and the external electrode 22A. The conductor layers all extend linearly from the external electrode 21A to the external electrode 22A and are shaped in a similar or the same manner. Each of the conductor layers included in the internal conductor 25A has no parts facing each other in the base body 10. Since the conductor layers are shaped similarly to each other, there is no difference in potential between portions of the conductor layers facing each other in the base body 10. Therefore, even when the internal conductor 25A is formed of more than one conductor layer as described above, the insulation reliability (withstand voltage) required of the base body 10 can be the same as when the internal conductor 25A is formed of a single conductor layer. The conductor layers included in the internal conductor 25A may be electrically connected to each other in the base body 10. The conductor layers included in the internal conductor 25A may not be connected to each other in the base body 10 but coupled together through the external electrodes 21A and 22A.

The following further describes how the internal conductors 25A, 25B, 25C1 and 25C2 are arranged mainly with reference to FIG. 13. FIG. 13 is a sectional view schematically showing the inductor array 301 along the Iv-Iv line in FIG. 12. For brevity of explanation, FIGS. 13 and 14 do not show the external electrodes 21A, 21B, 21C1, 21C2, 22A, 22B, 22C1 and 22C2.

The base body 10 is oriented along the reference axis Ax1 and defined between the first and second end surfaces 10*c* and 10*d*. This means that, in the reference axis direction extending along the reference axis Ax1, the base body 10 terminates at the first end surface 10*c* on one side and at the second end surface 10*d* on the other side.

The internal conductor 25A is in the base body 10 and adjacent to the first end surface 10*c*. More specifically, the internal conductor 25A is positioned away from the first end surface 10*c* by a distance d11 in the first direction X1. The internal conductor 25B is in the base body 10 and adjacent to the second end surface 10*d*. More specifically, the internal conductor 25B is positioned away from the second end surface 10*d* by a distance d12 in the second direction X2. As adjacent to the first end surface 10*c*, where the base body 10 terminates on one side in the reference axis direction (a first end of the base body 10), the internal conductor 25A may be herein referred to as a first end internal conductor 25A. Similarly, as adjacent to the second end surface 10*d*, where the base body 10 terminates on the other side in the reference axis direction (a second end of the base body 10), the internal conductor 25B may be herein referred to as a second end internal conductor 25B. Since the distance d11 indicates the distance between the first end internal conductor 25A and the first end surface 10*c*, the distance d11 may be herein referred to as the first end distance d11. Similarly, since the distance d12 indicates the distance between the second end internal conductor 25B and the second end surface 10*d*, the distance d12 may be herein referred to as the second end distance d12.

Between the first and second end internal conductors 25A and 25B, which are arranged on the reference axis Ax1, an intermediate internal conductor unit 25C is arranged. As described above, the intermediate internal conductor unit 25C includes at least one internal conductor, shaped in the same manner as the first and second end internal conductors 25A and 25B. In the embodiment shown in FIGS. 13 and 14, the intermediate internal conductor unit 25C includes two internal conductors, specifically, the internal conductor 25C1 and 25C2.

The intermediate internal conductor unit 25C is positioned away from the first end internal conductor 25A by a distance d21 in the first direction X1 and positioned away from the second end internal conductor 25B by a distance d22 in the second direction X2. When the intermediate internal conductor unit 25C includes more than one internal conductor, the distance d21 between the first end internal conductor 25A and the intermediate internal conductor unit 25C indicates the distance between the first end internal conductor 25A and one of the internal conductors included in the intermediate internal conductor unit 25C that is adjacent to the first end internal conductor 25A. In the example shown, the intermediate internal conductor unit 25C has two internal conductors 25C1 and 25C2, and the internal conductor 25C1 is adjacent to the first end internal conductor 25A. Accordingly, the distance d21 means the distance between the internal conductor 25C1 and the first end internal conductor 25A along the reference axis Ax1. Likewise, when the intermediate internal conductor unit 25C includes more than one internal conductor, the distance d22 between the second end internal conductor 25B and the intermediate internal conductor unit 25C indicates the distance between the second end internal conductor 25B and one of the internal conductors included in the intermediate internal conductor unit 25C that is adjacent to the second end internal conductor 25B. In the example shown, the intermediate internal conductor unit 25C has two internal conductors 25C1 and 25C2, and the internal conductor 25C2 is adjacent to the second end internal conductor 25B. Accordingly, the distance d22 means the distance between the internal conductor 25C2 and the second end internal conductor 25B along the reference axis Ax1. While the distances d11 and d12 represent the distance between the internal conductor and the end surface of the base body, the distances d21 and d22 represent the distance between the internal conductors. For this reason, the distances d21 and d22 may be both referred to as inter-conductor distances and are respectively referred to as a first inter-conductor distance d21 and a second inter-conductor distance d22 if they need to be distinguished from each other.

When the intermediate internal conductor unit 25C has more than one internal conductor, adjacent ones of the internal conductors constituting the intermediate internal conductor unit 25C are spaced away from each other by a third inter-conductor distance in the direction extending along the reference axis. For example, in the example shown in FIG. 13, the internal conductors 25C1 and 25C2 included in the intermediate internal conductor unit 25C are separated from each other by a third inter-conductor distance d23. When the intermediate internal conductor unit 25C includes three or more internal conductors, each internal conductor may be separated from one or more adjacent internal conductors by the third inter-conductor distance d23. In other words, the three or more internal conductors constituting the intermediate internal conductor unit 25C may be arranged at even intervals such that each is spaced away from adjacent one or more of the internal conductors by the third inter-conductor distance d23. When the intermediate internal conductor unit 25C has three or more internal conductors, the internal conductors may be arranged at uneven intervals.

In one or more embodiments of the present invention, the internal conductors are arranged in the base body 10 such that the first end distance d11 is greater than the inter-conductor distance d21 and the second end distance d12 is greater than the inter-conductor distance d22. This is represented as d11>d12 and d12>d22. The first end distance d11 may be equal to the second end distance d12. In one or more embodiments of the present invention, the internal conductors are arranged in the base body 10 such that the first inter-conductor distance d21 is equal to the second inter-conductor distance d22. In one or more embodiments of the present invention, the internal conductors are arranged in the base body 10 such that the first inter-conductor distance d21 is equal to the second inter-conductor distance d22. In this way, the magnetic fluxes can be more evenly distributed in the base body 10. Since the magnetic fluxes are distributed evenly in the base body 10, the inductor array 301 can achieve improved DC superimposition characteristics.

In one or more embodiments of the present invention, the internal conductors are arranged in the base body 10 such that the third inter-conductor distance d23 is less than the first and second inter-conductor distances d21 and d22. This is represented as d11>d21>d23 and d12>d22>d23. In other words, inner ones of the internal conductors arranged in the base body 10 along the reference axis Ax1 are at a shorter distance from adjacent internal conductors or the surface of the base body 10 (the first or second end surface 10*c* or 10*d*) than are outer ones. Stated differently, the internal conductors are more densely arranged in the reference axis direction in a region closer to the center of the base body 10 in the direction extending along the reference axis Ax1.

In one or more embodiments of the present invention, the average of the distances between the internal conductors within the base body 10 is less than the first and second end distances d11 and d12. For example, in the embodiment shown in FIG. 13, the average of the first, second and third inter-conductor distances d21, d22 and d23 (i.e., (d21+d22+d23)/3) is less than the first and second end distances d11 and d12. In this case, the internal conductors are also more densely arranged in the reference axis direction in a region closer to the center of the base body 10 in the direction extending along the reference axis Ax1.

In one or more embodiments of the present invention, the internal conductors are arranged in the base body 10 such that the third inter-conductor distance d23 is equal to the first and second inter-conductor distances d21 and d22. This is represented as d11>d21=d23=d22<d12. In other words, the internal conductors are arranged at even intervals, but the distance d11 between the first end internal conductor 25A and the first end surface 10*c* and the distance between the second end internal conductor 25B and the second end surface 10*d* are greater than the distances between the internal conductors (d21, d22, d23), which are equal to each other. The first and second inter-conductor distances d21 and d22 may differ from each other due to the manufacturing- and/or measurement-induced errors, but this does not deny that the first and second inter-conductor distances d21 and d22 are equal to each other.

Figure 15:
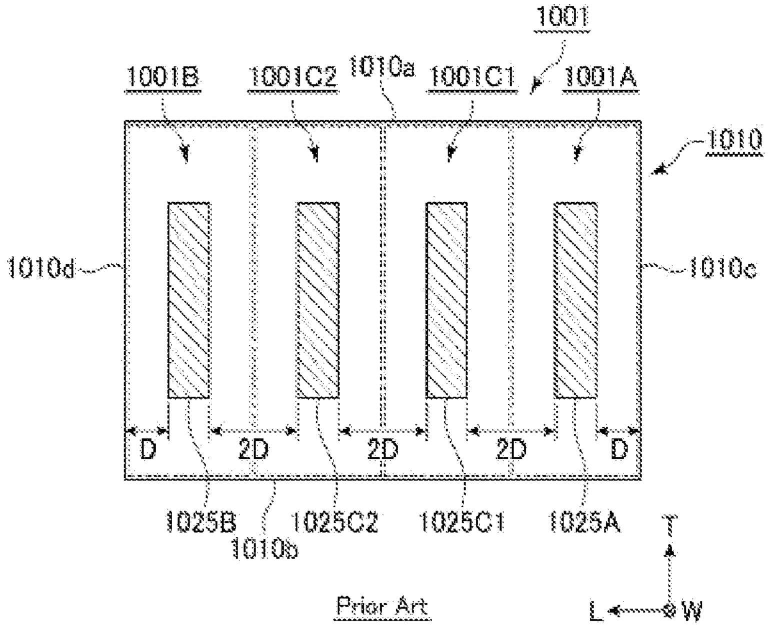
FIG. 15 schematically shows a section of a conventional inductor array.

The following further describes how the internal conductors are arranged in the base body 10 with reference to FIG. 15 in addition to FIG. 13. FIG. 15 schematically shows a section of a conventional inductor array 1001, corresponding to the section shown in FIG. 13, where a plurality of internal conductors are arranged next to each other in one direction. The conventional inductor array 1001 shown in FIG. 15 has a base body 1010, and internal conductors 1025A, 1025B, 102501, 102502 provided in the base body 1010 and having the same rectangular parallel piped shape. The base body 1010 has a top surface 1010*a* and a bottom surface 1010*b*, and also has a first end surface 1010*c* connecting the top and bottom surfaces 1010*a* and 1010*b*, and a second end surface 1010*d* facing the first end surface 1010*c*. Although not shown, the internal conductors 1025A, 1025B, 102501 and 102502 are connected at the respective ends to the corresponding external electrodes. The inductor array 1001 thus includes four inductors, like the inductor array 301. More specifically, the inductor array 1001 includes an inductor 1001A including the internal conductor 1025A, an inductor 1001B including the internal conductor 1025B, an inductor 1001C1 including the internal conductor 1025C1, and an inductor 1001C2 including an internal conductor 1025C2. As shown in FIG. 15, the conventional inductor array is made by packaging a plurality of inductors having the same shape. In each inductor, the internal conductor is arranged at the center of the inductor. For example, the internal conductor 1025A is arranged at the center of the inductor 1001A. With such arrangement, in the conventional inductor array 1001, the distance D between the internal conductor 1025A and the first end surface 1010*c* of the base body 1010 is half the distance 2D between the adjacent ones of the internal conductors in the base body 1010 (for example, the distance 2D between the internal conductors 1025A and 1025C1).

As described above, in the conventional inductor array 1001, where the inductors having the same shape (inductors 1001A to 1001C2) are packaged, the internal conductors 1025A to 1025C2 are arranged at the center of the inductors 1001A to 1001C2. Accordingly, the adjacent ones of the internal conductors have a distance 2D therebetween. On the other hand, the distance between one of the outermost internal conductors of the array or the internal conductor 1025A and the first end surface 1010*c* of the base body 1010 facing the internal conductor 1025A, and the distance between the other outermost internal conductor or the internal conductor 1025B and the second end surface 1010*d* of the base body 1010 facing the internal conductor 1025B are both half the distance 2D between the internal conductors and thus represented by the symbol "D."

When the base body 1010 has a uniform permeability (i.e., the permeability is constant among the regions of the base body 1010), the inductance of each of the inductors 1001A to 1001C2 increases proportionally to the volume of the base body 1010 within a certain distance from the internal conductor of the inductor. In the conventional inductor array 1001, the inductors 1001A to 1001C2 are shaped in the same manner. Accordingly, the volume of the base body 1010 surrounding the outermost internal conductors 1025A and 1025B of the array is smaller than the volume of the magnetic body surrounding the inner internal conductors 1025C1 and 1025C2 of the array. This means that the inductance of the inductor 1001A including the internal conductor 1025A and the inductance of the inductor 1001B including the internal conductor 1025B are smaller than the inductance of the inductor 1001C1 including the internal conductor 1025C1 and the inductance of the inductor 1001C2 including the internal conductor 1025C2. Since the inductors are shaped in the same manner and the internal conductors are evenly arranged within the base body 1010 in the conventional inductor array 1001, the inductance of the outermost inductors of the array is less than the inductance of the inner inductors of the array, resulting in the inductors having uneven inductances.

To address this issue, in the inductor array 301 according to one or more embodiments of the present invention, the outermost internal conductors 25A and 25B of the array are offset toward the center of the base body 10 in the reference axis direction as shown in FIG. 13, rather than evenly arranged. Thus, in the inductor array 301, the first end distance d11 between the first end internal conductor 25A and the first end surface 10*c* can be greater than the first inter-conductor distance d21 between the first end internal conductor 25A and the internal conductor 25C1. Since the first end distance d11 is greater than the inter-conductor distance d21, the first end internal conductor 25A can be surrounded by an increased volume of the base body 10, so that the inductor 301A including the first end internal conductor 25A can have an increased inductance. In this manner, the inductance of the outermost inductors of the array (inductor 301A) can be closer to the inductance of the inner inductors of the array (inductor 301C1), when compared with the conventional inductor array where the internal conductors are arranged at regular intervals within the base body. Likewise, since the second end distance d12 is greater than the second inter-conductor distance d22, the inductance of the inductor 301B can be closer to the inductance of the inductor 301C2. Since the first end distance d11 is greater than the first inter-conductor distance d21 and the second end distance d12 is greater than the second inter-conductor distance d22, the inductors constituting the inductor array 301 can achieve more uniform inductances than those constituting the conventional inductor array.

In addition, in the inductor array 301 according to one or more embodiments of the present invention, the internal conductors can be arranged such that the distance between the internal conductors in the reference axis Ax1 direction decreases toward the center of the base body 10. For example, as shown in FIG. 13, the internal conductors can be arranged such that the third inter-conductor distance d23 is less than the first and second inter-conductor distances d21 and d22. In this case, the internal conductors can be contained in a smaller region in the base body 10, so that the inductor array 301 can achieve a smaller size (in particular, in the direction extending along the reference axis Ax1).

The inventors of the present invention performed simulations, which have revealed that, in the conventional inductor array 1001 shown in FIG. 15 and having the internal conductors 1025A, 1025B, 1025C1 and 1025C2 arranged at even intervals within the base body, the inductance of the inductor 1001A was approximately 8% less than the inductance of the inductor 1001C1 and the inductance of the inductor 1001B was also approximately 8% less than the inductance of the inductor 1001C2. In contrast, in the inductor array 301 shown in FIG. 13, when the ratios d11/d21 and d12/d22 were both 1.5, the inductance of the inductor 301A was approximately 3.5% less than the inductance of the inductor 301C1 and the inductance of the inductor 1B was approximately 3.5% less than the inductance of the inductor 301C2. In the conventional inductor array 1001, the inductances of the outermost inductors 1001A and 1001B in the reference axis direction are approximately 8% less than the inductances of the inner inductors 1001C1 and 1001C2. In the inductor array 301 relating to the embodiment of the present invention, on the other hand, the inductances of the outermost inductors 301A and 301B in the reference axis Ax1 direction are different approximately 3.5% from the inductances of the inner inductors 301C1 and 301C2. This means that the embodiment of the present invention can reduce the difference in inductance between the outermost inductors in the reference axis Ax1 direction and the remaining inductors. When the ratios d11/d21 and d12/d22 were both 2, the inductance of the inductor 301A was approximately 2.5% less than the inductance of the inductor 301C1 and the inductance of the inductor 301B was approximately 2.5% less than the inductance of the inductor 301C2. The foregoing results have confirmed that, as the distance d11 increases relative to the distance d21, the difference in inductance between the inductors 301A and 301C1 decreases, and, as the distance d12 increases relative to the distance d22, the difference in inductance between the inductors 301B and 301C2 decreases.

In one or more embodiments of the present invention, the ratio of the first end distance d11 to the first inter-conductor distance d21 (d11/d21) is from 1.5 to 4. The ratio of the first end distance d11 to the first inter-conductor distance d21 (d11/d21) may be equal to or less than 3, or equal to or less than 2. As described above, as the ratio d11/d21 increases, the difference in inductance between the inductors 301A and 301C1 decreases. If the distance d11 is increased in order to increase the ratio d11/d21, however, the inductor array 301 inevitably has a large size in the reference axis Ax1 direction. If the distance d21 is decreased, on the other hand, the inductors 301A and 301C1 tend to be magnetically coupled. To avoid these, the ratio d11/d21 is four or less. This can reduce the increase in size of the inductor array 301 in the reference axis Ax1 direction and prevent undesired magnetic coupling between the inductors 301A and 301C1.

Likewise, in one or more embodiments of the invention, the ratio of the second end distance d12 to the second inter-conductor distance d22 (d12/d22) is from 1.5 to 4. The ratio of the second end distance d12 to the second inter-conductor distance d22 (d12/d22) may be equal to or less than 3, or equal to or less than 2. This can reduce the increase in size of the inductor array 301 in the reference axis Ax1 direction and prevent undesired magnetic coupling between the inductors 301A and 301C1, while reducing the difference in inductance between the inductors 301B and 301C2.

As described above, the internal conductors 25A and 25B may be arranged at the center of the base body 10 in the T-axis direction, which is perpendicular to the reference axis direction. In other words, the distance between the internal conductor 25A and the top surface 10*a* may be equal to the distance between the internal conductor 25A and the bottom surface 10*b*. The distance between the internal conductor 25B and the top surface 10*a* may be equal to the distance between the internal conductor 25B and the bottom surface 10*b*.

The internal conductors 25A, 25B, 25C1 and 25C2 may be at the same distance from the top surface 10*a*. Likewise, the internal conductors 25A, 25B, 25C1 and 25C2 may be at the same distance from the bottom surface 10*b*.

The internal conductors 25A, 25B, 25C1 and 25C2 may be symmetrically shaped with respect to the center thereof in the reference axis direction, in the direction extending along the reference axis Ax1. Since the internal conductors 25A, 25B, 25C1 and 25C2 are symmetrically shaped in the reference axis direction, the magnetic fluxes can be more uniformly distributed within the inductor array 301. This can contribute to improve the DC superimposition characteristics of the inductor array 301. In the embodiment shown in FIG. 12, the internal conductors 25A, 25B, 25C1 and 25C2 are shaped like a rectangular parallelepiped long in the direction orthogonal to the reference axis Ax1 (the W-axis direction). Accordingly, the internal conductors 25A, 25B, 25C1 and 25C2 are symmetrical in the reference axis direction. The symmetrical shape of the internal conductors 25A, 25B, 25C1 and 25C2 is not limited to the rectangular parallelepiped.

Figure 17:
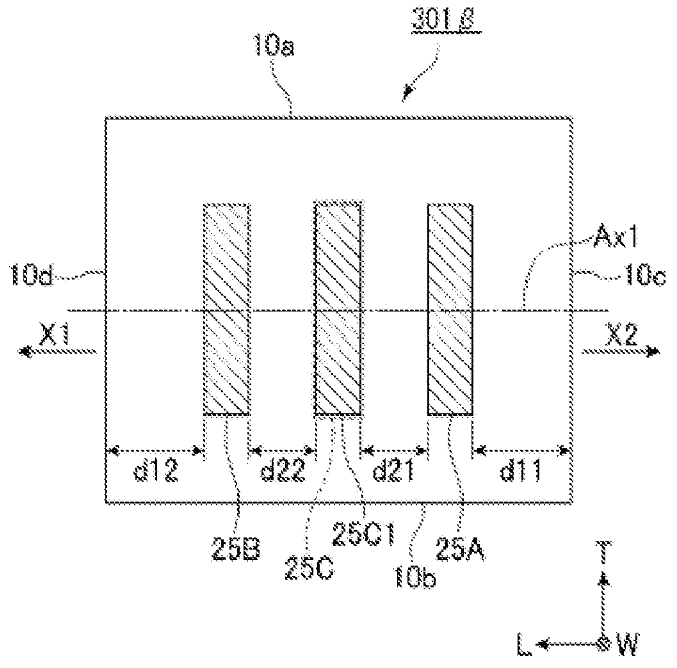
FIG. 17 is a sectional view schematically showing a section of an inductor array according to another embodiment of the present invention.
Figure 18:
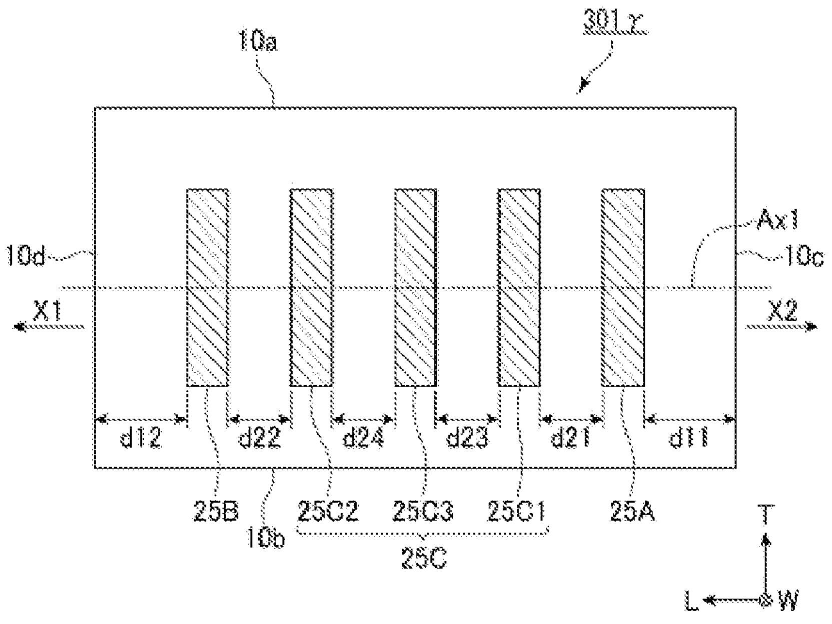
FIG. 18 is a sectional view schematically showing a section of an inductor array according to another embodiment of the present invention.

An inductor array according to another embodiment, to which the invention is applicable, will be now described with reference to FIGS. 16 to 18.

An inductor array 301*a* relating to another embodiment, to which the present invention is applicable, is first described with reference to FIG. 16. FIG. 16 is a sectional view of the inductor array 301*a* along a plane parallel to the LT plane. While the inductor array 301 includes the internal conductors 25A, 25B, 25C1 and 25C2, the inductor array 301*a* includes internal conductors 125A, 125B, 125C1 and 125C2. The following description does not mention the common features shared between the inductor arrays 301 and 301*a*.

Figure 16:
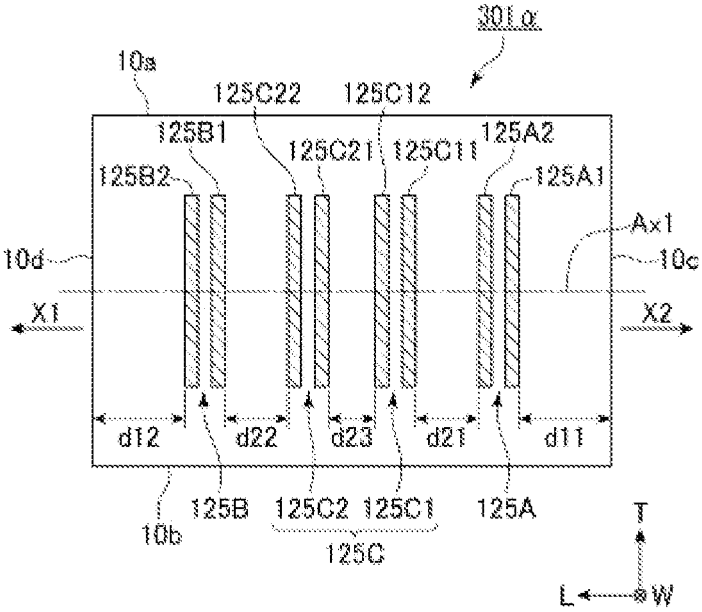
FIG. 16 is a sectional view schematically showing a section of an inductor array according to another embodiment of the present invention.

As shown in FIG. 16, the internal conductor 125A has conductor patterns 125A1 and 125A2 stacked in the L-axis direction. The conductor patterns 125A1 and 125A2 are connected at one end thereof to the external electrode 21A and at the other end thereof to the external electrode 22A. The conductor pattern 125A1 may be at least partially in contact with the conductor pattern 125A2 within the base body 10. The internal conductor 125A may be made up by stacking three or more conductor patterns in the L-axis direction.

Like the internal conductor 125A, the internal conductor 125B includes conductor patterns 125B1 and 125B2 stacked in the L-axis direction, the internal conductor 125C1 includes conductor patterns 125C11 and 125C12 stacked in the L-axis direction, and the internal conductor 125C2 includes conductor patterns 125C21 and 125C22 stacked in the L-axis direction. The description on the internal conductor 125A also applies to the internal conductors 125B, 125C1 and 125C2 to a maximum extent.

When the internal conductor 125A has a plurality of conductor patterns stacked on each other in the L-axis direction, the first end distance d11 denotes the distance between the first end surface 10*c* and one of the conductor patterns making up the internal conductor 125A that is the closest to the first end surface 10*c*. In the illustrated embodiment, the first end distance d11 indicates the distance in the reference axis direction between the conductor pattern 125A1 and the first end surface 10*c*. Similarly, when the internal conductor 125B has a plurality of conductor patterns stacked on each other in the L-axis direction, the second end distance d12 denotes the distance between the second end surface 10*d* and one of the conductor patterns making up the internal conductor 125B that is the closest to the second end surface 10*d*. In the illustrated embodiment, the second end distance d12 denotes the distance in the reference axis direction between the second end surface 10*d* and the conductor pattern 125B2. The same applies to the inter-conductor distances d21 to d23. For example, when the internal conductors 125A and 125C1 each have a plurality of conductor patterns stacked on each other in the L-axis direction, the inter-conductor distance d21 denotes the distance between (i) one of the conductor patterns making up the internal conductor 125A that is the closest to the internal conductor 125C1 and (ii) one of the conductor patterns making up the internal conductor 125C1 that is the closest to the internal conductor 125A. In the illustrated embodiment, the first inter-conductor distance d21 indicates the distance in the reference axis direction between the conductor patterns 125A2 and 125C11. The inductor array 301 has four lines made up by the internal conductor patterns, but the number of lines of internal conductors is not limited to such. FIG. 17 shows an inductor array 301β with three lines of internal conductor patterns. FIG. 18 shows an inductor array 301γ with five lines of internal conductor patterns. The inductor arrays 301β and 301γ are the same as the inductor array 301, except for the number of lines of internal conductor patterns, and thus not described.

Figure 19:
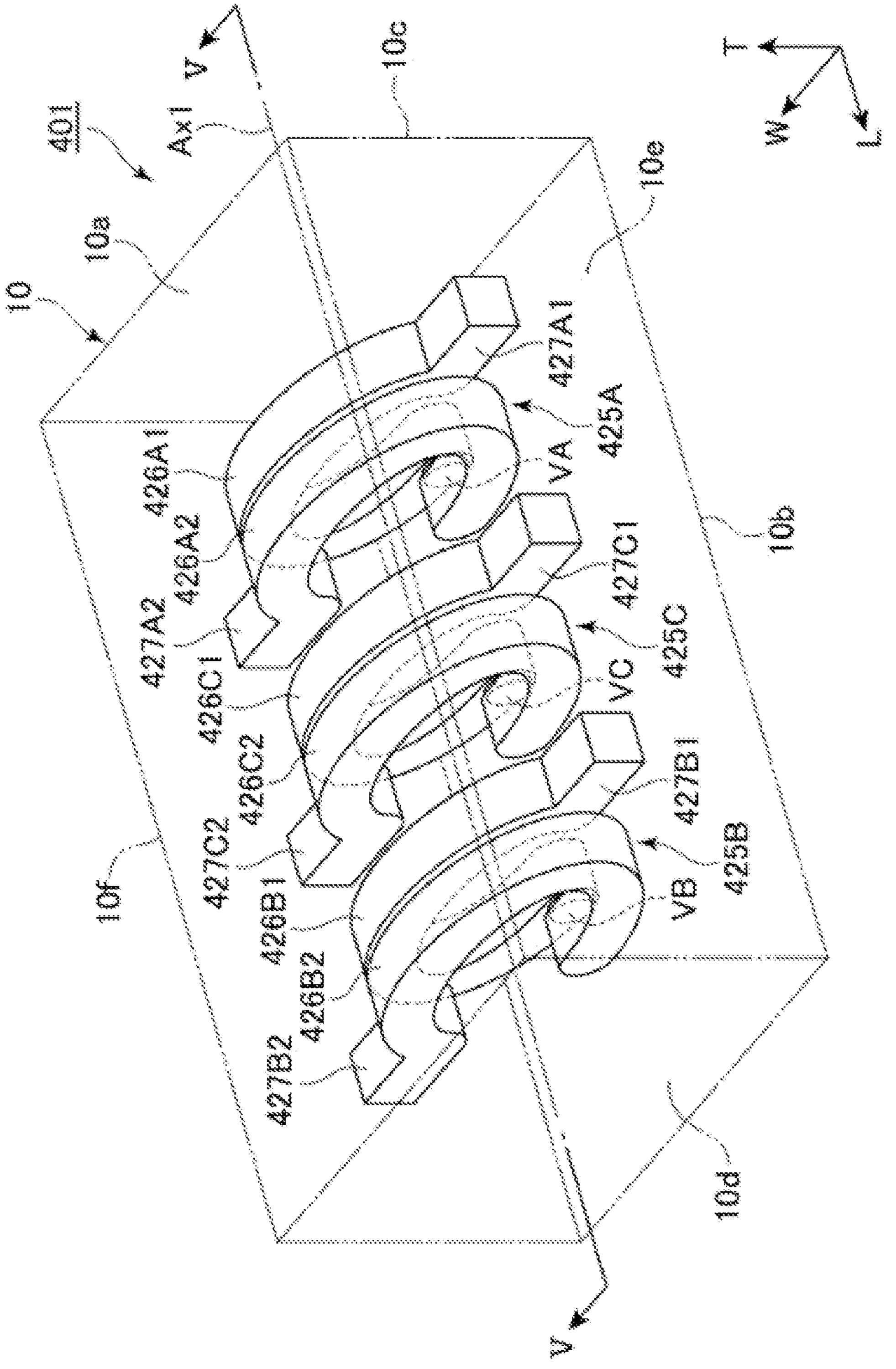
FIG. 19 is a perspective view of an inductor array according to another embodiment of the present invention.
Figure 20:
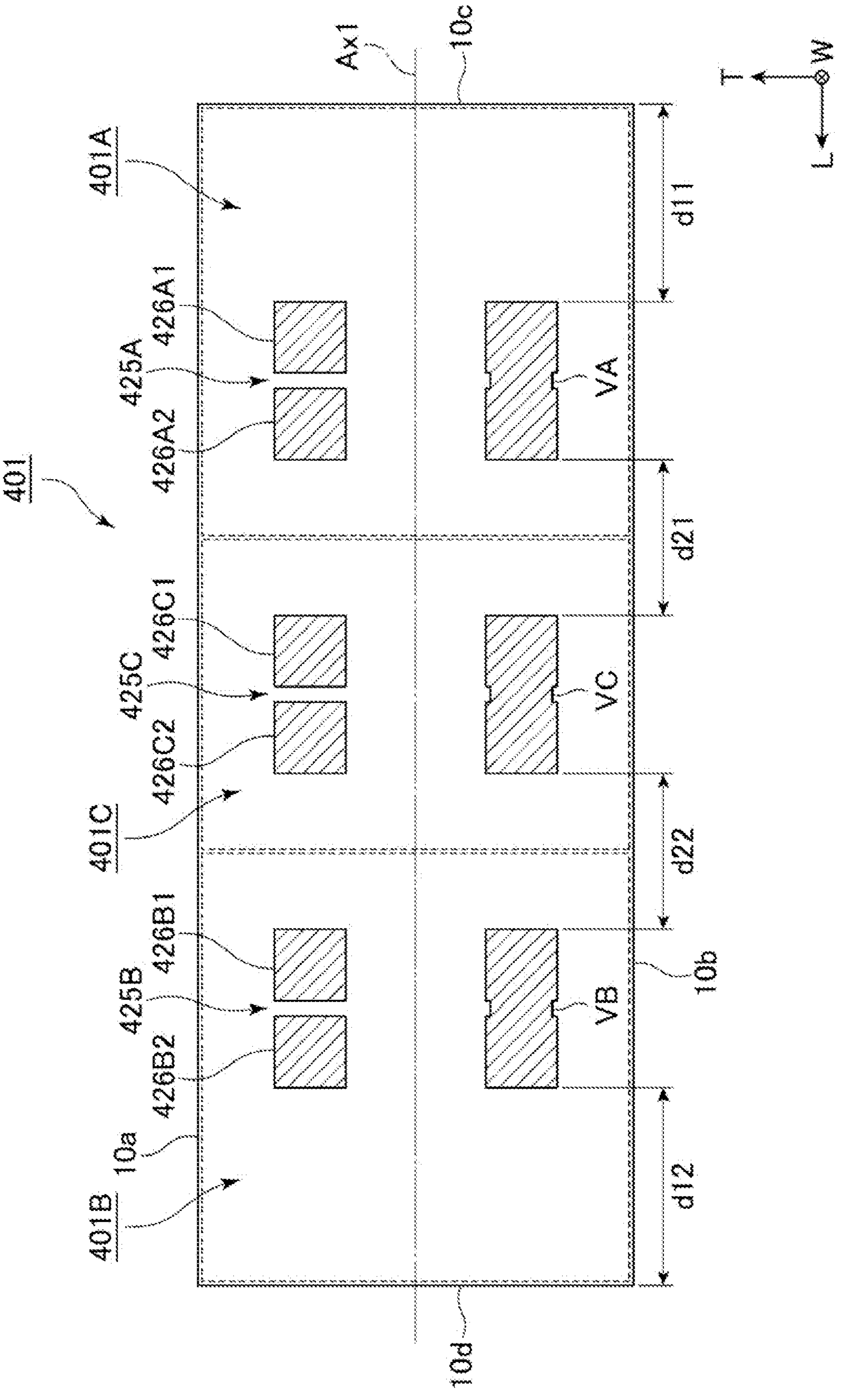
FIG. 20 is a sectional view schematically showing a section of the inductor array of FIG. 19 along the V-V line.

The following now describes an inductor array 401 according to another embodiment, to which the present invention is applicable, with reference to FIGS. 19 and 20. FIG. 19 is a perspective view of the inductor array 401, and FIG. 20 is a schematic sectional view of the inductor array 401 along the V-V line in FIG. 19. The inductor array 401 is a modification example of the inductor arrays 301, 301α, 301β and 301γ. While the inductor arrays 301, 301α, 301β and 301γ include the internal conductors 25A, 25B and 2501, the inductor array 401 includes internal conductors 425A, 425B and 425C. The following description does not mention the similarities between the inductor array 401 and the inductor arrays 301, 301α, 301β and 301γ.

In the illustrated embodiment, the internal conductors 425A, 425B and 425C are each wound around a coil axis extending along the L axis (i.e., along the reference axis Ax1). The internal conductor 425A includes a first winding portion 426A1 wound approximately 0.75 turns around a coil axis (not shown) extending along the reference axis Ax1, a first lead-out conductor 427A1 connected to one of the ends of the first winding portion 426A1, a second winding portion 426A2 connected to the other end of the first winding portion 426A1 via a via conductor VA and wound approximately 0.75 turns around the coil axis, and a second lead-out conductor 427A2 connected to an end of the second winding portion 426A2 opposite to the end thereof connected to the via conductor VA. In this manner, the internal conductor 425A is wound around the coil axis approximately 1.5 turns. The internal conductor 425A is connected to the external electrode 21A via the first lead-out conductor 427A1 and connected to the external electrode 22A at the second lead-out conductor 427A2.

The internal conductors 425B and 425C are configured in the same manner as the internal conductor 425A. More specifically, the internal conductor 425B includes a first winding portion 426B1 wound approximately 0.75 turns around the coil axis, a first lead-out conductor 427B1 connected to one of the ends of the first winding portion 426B1, a second winding portion 426B2 connected to the other end of the first winding portion 426B1 via a via conductor VB and wound approximately 0.75 turns around the coil axis, and a second lead-out conductor 427B2 connected to an end of the second winding portion 426B2 opposite to the end thereof connected to the via conductor VB. The internal conductor 425B is connected to the external electrode 21B at the first lead-out conductor 427B1 and connected to the external electrode 22B at the second lead-out conductor 427B2. The internal conductor 425C includes a first winding portion 426C1 wound approximately 0.75 turns around the coil axis, a first lead-out conductor 427C1 connected to one of the ends of the first winding portion 426C1, a second winding portion 426C2 connected to the other end of the first winding portion 426C1 via a via conductor VC and wound approximately 0.75 turns around the coil axis, and a second lead-out conductor 427C2 connected to an end of the second winding portion 426C2 that is opposite to the end thereof connected to the via conductor VC. The internal conductor 425C is connected to the external electrode 21C at the first lead-out conductor 427C1 and connected to the external electrode 22C at the second lead-out conductor 427C2.

The internal conductors 425A, 425B and 425C all have the same shape. The internal conductors 425A, 425B and 425C can be provided within the base body 10 and placed at the same level in the T-axis direction. Specifically, as shown in FIG. 20, the internal conductors 425A, 425B and 425C are at the same level in the T-axis direction such that their respective top surfaces are at the same level in the T-axis direction and their respective bottom surfaces are at the same level in the T-axis direction.

As shown in FIG. 20, the first end distance d11 between the internal conductor 425A and the first end surface 10*c* represents the distance between the first winding portion 426A1 and the first end surface 10*c*. Similarly, the second end distance d12 between the internal conductor 425B and the second end surface 10*d* represents the distance between the second winding portion 426B2 and the second end surface 10*d*.

As configured above, the inductor array 401 includes an inductor 401A including the internal conductor 425A and the external electrodes 21A and 22A (FIG. 1), an inductor 401B including the internal conductor 425B and the external electrodes 21B and 22B (FIG. 1), and an inductor 401C including the internal conductor 425C and the external electrodes 21C and 22C (FIG. 1). The inductor array 401 may further include an additional inductor arranged between the inductors 401B and 401C. The additional inductor is configured in the same manner as the inductor 401C and made up by an internal conductor and the external electrodes 21C2 and 22C2 (FIG. 12).

The inductor array 401 achieves the same effects as the inductor array 301. Specifically, since the first end distance d11 is greater than the first inter-conductor distance d21 and the second end distance d12 is greater than the second inter-conductor distance d22, the inductors constituting the inductor array 401 can achieve more uniform inductances than those constituting the conventional inductor array.

Figure 21:
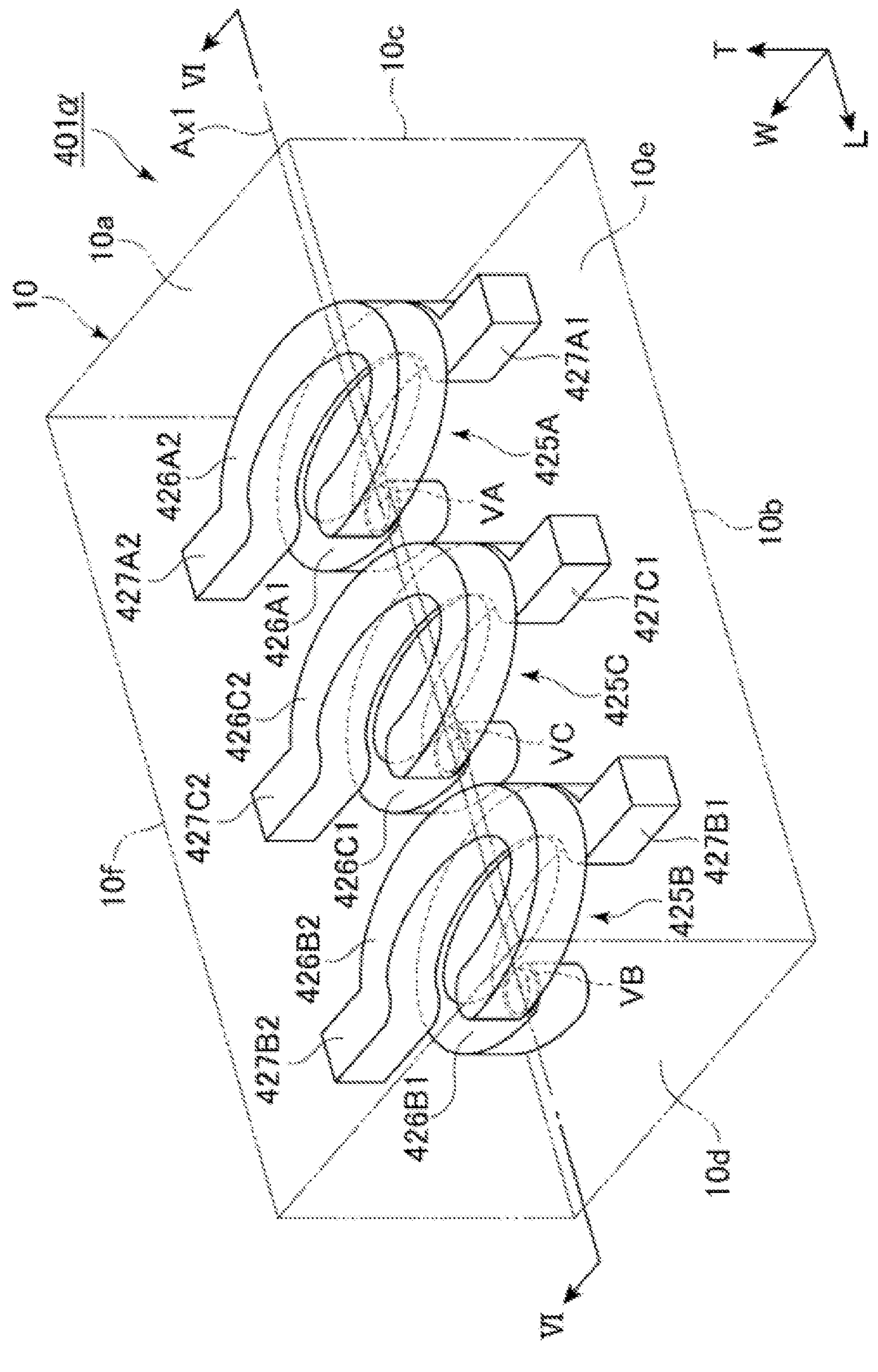
FIG. 21 is a perspective view of an inductor array according to another embodiment of the present invention.
Figure 22:
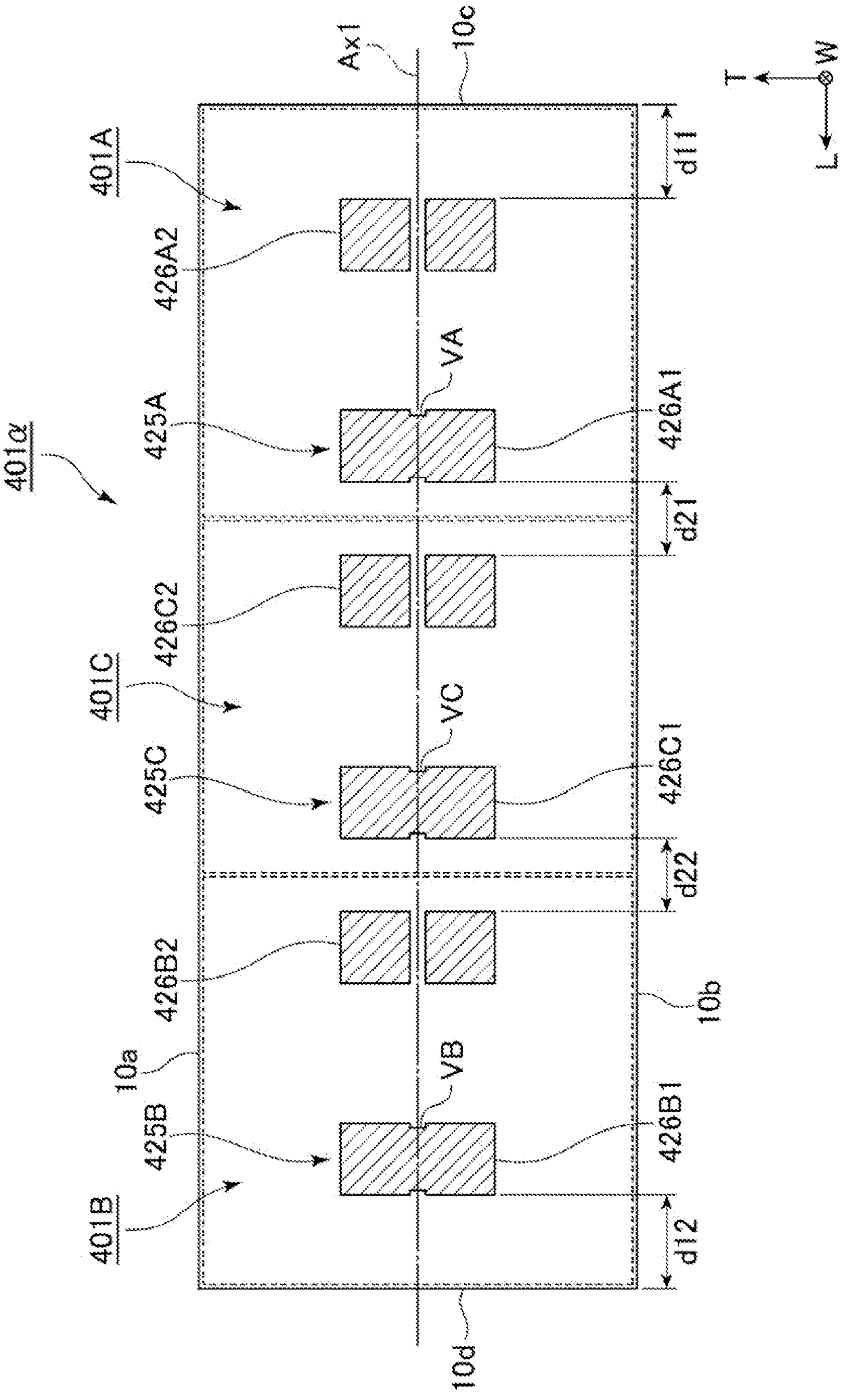
FIG. 22 is a sectional view schematically showing a section of the inductor array of FIG. 21 along the VI-VI line.

The following now describes an inductor array 401*a*, which is a modification example of the inductor array 401, with reference to FIGS. 21 and 22. As shown in FIGS. 21 and 22, the coil axes of the internal conductors 425A, 425B and 425C extend along the T axis (i.e., orthogonally to the reference axis Ax1). The internal conductors 425A, 425B and 425C can be positioned as shown in FIGS. 21 and 22 by rotating the internal conductors 425A, 425B and 425C shown in FIGS. 19 and 20 in the clockwise direction 90° around the W-axis.

As shown in FIG. 22, the first end distance d11 between the internal conductor 425A and the first end surface 10*c* represents the distance between (i) the first end surface 10*c* and (ii) a portion of the first and second winding portions 426A1 and 426A2 that is the closest to the first end surface 10*c*. Similarly, the second end distance d12 between the internal conductor 425B and the second end surface 10*d* represents the distance between (i) the second end surface 10*d* and (ii) a portion of the first and second winding portions 426B1 and 426B2 that is the closest to the second end surface 10*d*.

In the inductor array 401*a*, the magnetic fluxes may be less evenly distributed than in the inductor array 401. In one or more embodiments of the present invention, the magnetic fluxes can be less unevenly distributed if the internal conductors 425A, 425B and 425C are wound 1.5 turns or more.

The inductor array 401*a* achieves the same effects as the inductor array 301. Specifically, since the first end distance d11 is greater than the first inter-conductor distance d21 and the second end distance d12 is greater than the second inter-conductor distance d22, the inductors constituting the inductor array 401*a* can achieve more uniform inductances than those constituting the conventional inductor array.

Figure 23:
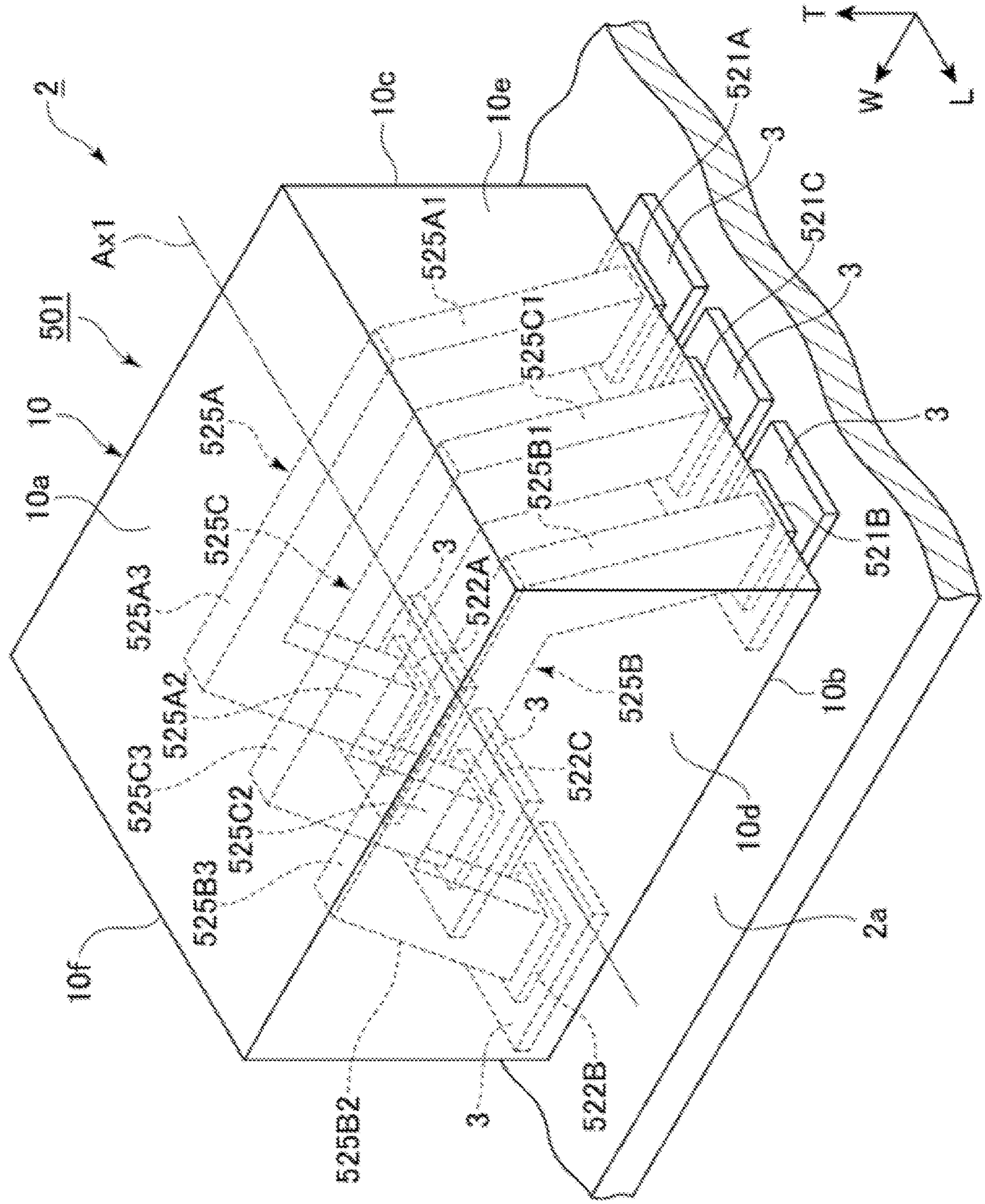
FIG. 23 is a perspective view of an inductor array according to another embodiment of the present invention.

The following now describes an inductor array 501 according to another embodiment, to which the present invention is applicable, with reference to FIG. 23. FIG. 23 is a perspective view of the inductor array 501. The inductor array 501 is a modification example of the inductor arrays 301 and 301β. While the inductor array 301β includes the internal conductors 25A, 25B and 25C1, the inductor array 501 includes internal conductors 525A, 525B and 525C. The following description does not mention the similarities between the inductor array 501 and the inductor arrays 301, 301α, 301β and 301γ.

As shown in FIG. 23, the inductor array 501 includes external electrodes 521A, 521B, 521C, 522A, 522B and 522C. The external electrodes 521A, 521B, 521C, 522A, 522B and 522C are all provided on the bottom surface 10*b* of the base body 10. The shapes of the external electrodes 521A, 521B, 521C, 522A, 522B and 522C are not limited to those shown. For example, the external electrodes 521A, 521B and 521C may be provided on the base body 10 such that they are in contact not only with the bottom surface 10*b* but with the first side surface 10*e*. The external electrodes 522A, 522B, and 522C may be provided on the base body 10 such that they are in contact not only with the bottom surface 10*b* but with the second side surface 10*f*.

The inductor array 501 achieves the same effects as the inductor array 301. Specifically, since the first end distance d11 is greater than the first inter-conductor distance d21 and the second end distance d12 is greater than the second inter-conductor distance d22, the inductors constituting the inductor array 501 can achieve more uniform inductances than those constituting the conventional inductor array.

Figure 24:
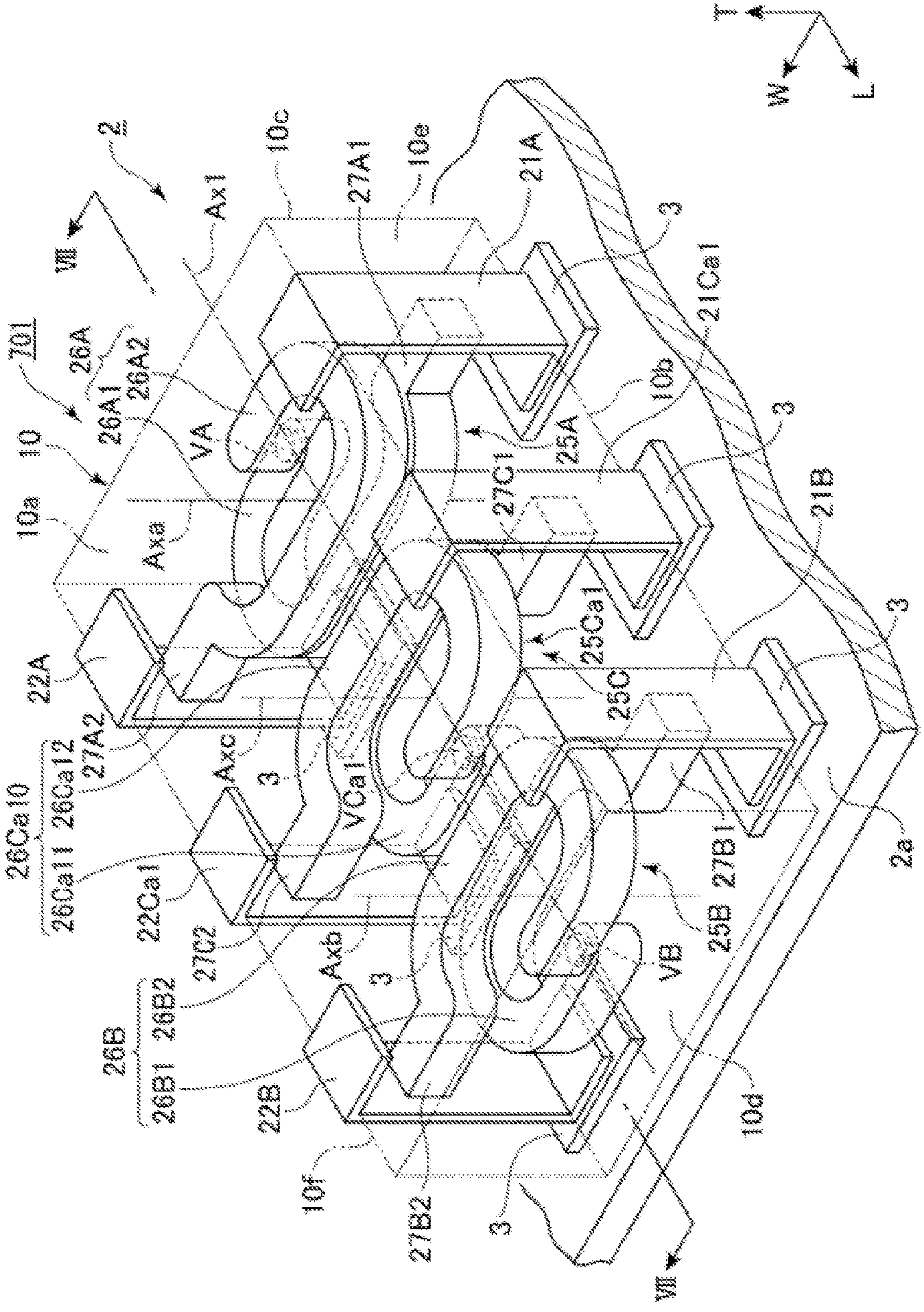
FIG. 24 is a perspective view of an inductor array according to another embodiment of the invention mounted on a mounting substrate.
Figure 25:
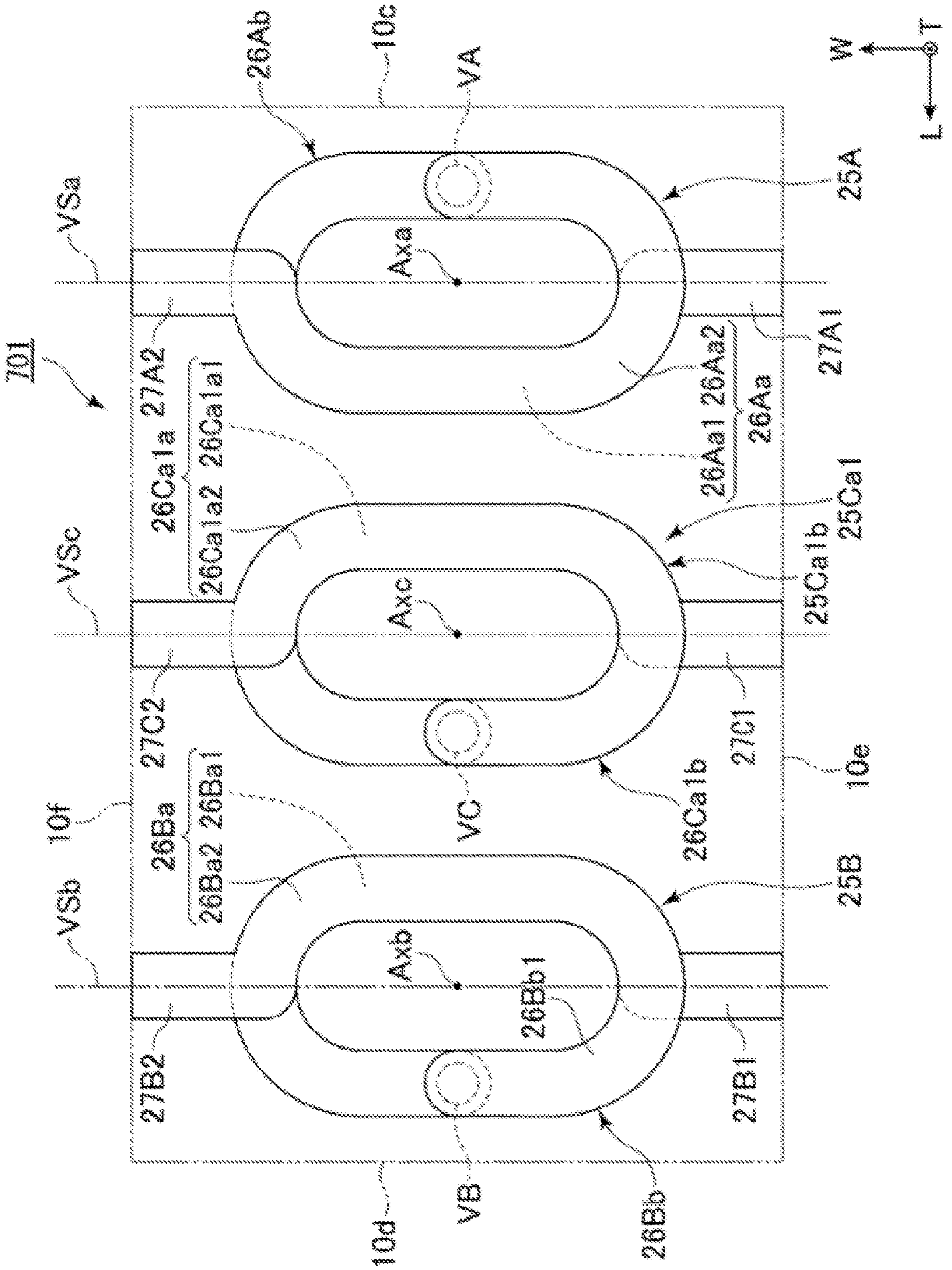
FIG. 25 is a plan view of the inductor array of FIG. 24.
Figure 26:
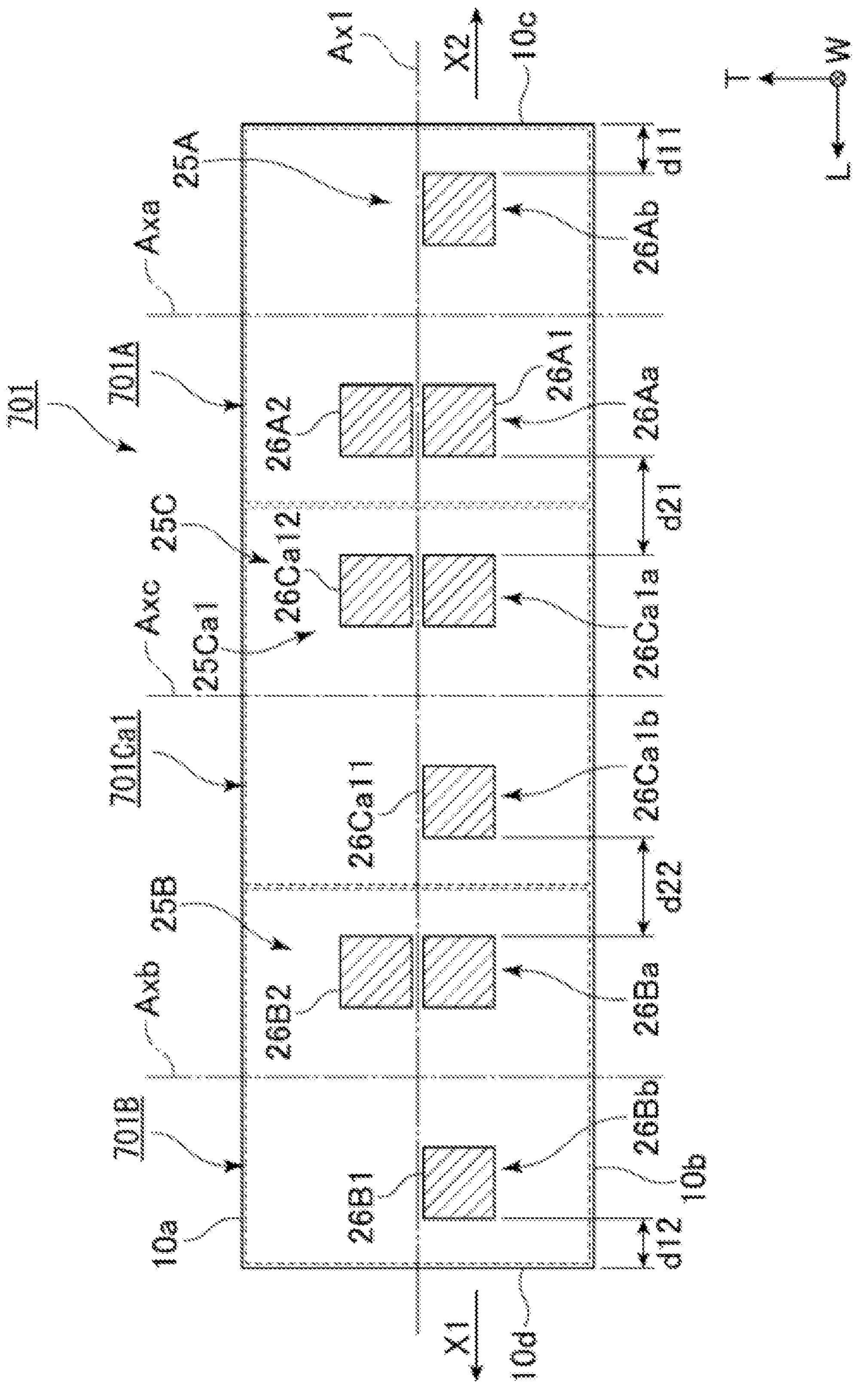
FIG. 26 is a sectional view schematically showing a section of the inductor array of FIG. 24 along the VII-VII line.

The following describes an inductor array 701 according to other one or more embodiments of the present invention with reference to FIGS. 24 to 26. FIG. 24 is a perspective view of the inductor array 701 according to one embodiment of the present invention, FIG. 25 is a plan view of the inductor array 701, and FIG. 26 is a schematic sectional view of the inductor array 701 along the VII-VII line. In FIGS. 24 and 25, the base body is transparent to show the internal conductors. In FIGS. 25 and 26, the external electrodes are not shown for convenience of description.

The internal conductors 25A, 25B and 25Ca1 are all provided within the base body 10. The internal conductors 25A, 25B and 25Ca1 are each wound around a coil axis extending perpendicularly to the reference axis Ax1. The reference axis Ax1 extends along the L-axis and is an imaginary axis extending through the first and second end surfaces 10*c* and 10*d*.

As shown in FIG. 25, the internal conductor 25A includes a winding portion 26A, a lead-out conductor portion 27A1, and a lead-out conductor portion 27A2. The winding portion 26A is spirally wound around a coil axis Axa extending along the T-axis direction, the lead-out conductor portion 27A1 extends outwardly from one end of the winding portion 26A in a direction along the W-axis direction to connect the winding portion 26A to the external electrode 21A, and the lead-out conductor portion 27A2 extends outwardly from the other end of the winding portion 26A in the direction along the W-axis direction to connect the winding portion 26 to the external electrode 22A. The internal conductor 25A is connected to the external electrode 21A at the lead-out conductor portion 27A1 and connected to the external electrode 22A at the lead-out conductor portion 27A2. In the embodiment shown, the coil axis Axa intersects the top and bottom surfaces 10*a* and 10*b*, but does not intersect the first and second end surfaces 10*c* and 10*d* and the first and second side surfaces 10*e* and 10*f*. In other words, the first end surface 10*c*, the second end surface 10*d*, the first side surface 10*e*, the second side surface 10*f* extend along the coil axis Axa.

In the winding portion 26A, a plurality of first conductor portions and one or more second conductor portions smaller in number than the first conductor portions alternate with and are connected to each other. In the illustrated embodiment, the winding portion 26A includes two first conductor portions 26Aa1 and 26Aa2 and one second conductor portion 26Ab. The first conductor portions 26Aa1 and 26Aa2 are an example of the first conductor portions included in the winding portion 26A, and the second conductor portion 26Ab is an example of the second conductor portions included in the winding portion 26A. More specifically, the winding portion 26A includes a first conductor portion 26Aa1, a second conductor portion 26Ab, and a first conductor portion 26Aa2. The first conductor portion 26Aa1 is connected to the lead-out conductor portion 27A1 and extends clockwise around the coil axis Axa from the connected portion to the lead-out conductor portion 27A1. The second conductor portion 26Ab extends clockwise around the coil axis Axa from the end of the first conductor portion 26Aa1 opposite to its end connected to the lead-out conductor portion 27A1. The first conductor portion 26Aa2 extends clockwise around the coil axis Axa from the end of the second conductor portion 26Ab opposite to its end connected to the first conductor portion 26Aa1. As described above, in the winding portion 26A, the first conductor portions 26Aa1 and 26Aa2 and the second conductor portion 26Ab alternate with and are connected to each other. Even if the numbers of first and second conductor portions increase, the first and second conductor portions alternate with each other. If it is required to draw a boundary between the first conductor portions 26Aa1 to 26Aa2 and the second conductor portion 26Ab, an imaginary plane VSa passing through the coil axis Axa and the external electrodes 21A and 22A and parallel to the WT plane can be used as the boundary plane lying between the first conductor portions (for example, the first conductor portions 26Aa1 to 26Aa2) and the second conductor portion (for example, the second conductor portion 26Ab). The first conductor portions 26Aa1 and 26Aa2 can be collectively referred to as the first conductor portions 26Aa.

The number of first conductor portions included in the winding portion 26A is not limited to two. In one embodiment, the number of first conductor portions included in the winding portion 26A ranges from two to four. In one embodiment, the number of second conductor portions included in the winding portion 26A is smaller by one than the number of first conductor portions. The number of second conductor portions included in the winding portion 26A ranges from one to three, for example. When the number of first conductor portions included in the winding portion 26A is two, three and four, the number of turns in the winding portion 26A is approximately 1.5, 2.5 and 3.5, respectively.

As described above, the winding portion 26A can be divided into the first and second conductor portions by the imaginary plane VSa that are next to each other in the L-axis direction. In addition, as shown in FIG. 24, the winding portion 26A is divided into the first and second winding portions 26A1 and 26A2 with respect to the via conductor VA that are next to each other in the T-axis direction. The first winding portion 26A1 extends around the coil axis Axa approximately 0.75 turns (270°) clockwise from the lead-out conductor portion 27A1 to the via conductor VA. The via conductor VA extends in the T axis direction. The first winding portion 26A1 is connected to the negative end of the via conductor VA in the T-axis direction, and the second winding portion 26A2 is connected to the positive end of the via conductor VA in the T-axis direction. The second winding portion 26A2 is shifted toward the positive side in the T-axis direction from the first winding portion 26A1 by a distance equal to the length of the via conductor VA and extends around the coil axis Axa approximately 0.75 turns (270°) from the via conductor VA to the lead-out conductor portion 27A2. The first conductor portion 26Aa1 indicates a portion of the first winding portion 26A1 that is closer to the second end surface 10*d* with respect to the imaginary plane VSa, and the first conductor portion 26Aa2 indicates a portion of the second winding portion 26A2 that is closer to the second end surface 10*d* with respect to the imaginary plane VSa. The second conductor portion 26Ab indicates a portion of the first winding portion 26A1 that is closer to the first end surface 10*c* with respect to the imaginary plane VSa and a portion of the second winding portion 26A2 that is closer to the first end surface 10*c* with respect to the imaginary plane VSa. The number of turns in the first winding portion 26A1 may be less or greater than 0.75, as long as it is less than one. Likewise, the number of turns in the second winding portion 26A2 may be less or greater than 0.75, as long as it is less than one. The via conductor VA connecting together the first and second winding portions 26A1 and 26A2 can be positioned depending on the number of turns in the first and second winding portions 26A1 and 26A2.

As shown in FIG. 25, the internal conductor 25A is arranged in the base body 10 such that the second conductor portion 26Ab faces the first end surface 10*c*. The number of first conductor portions constituting the winding portion 26A is greater than the number of second conductor portions constituting the winding portion 26A. Accordingly, as the current flowing through the internal conductor 25A changes, the first conductor portions generate more magnetic fluxes than the second conductor portion. In the illustrated embodiment, if the current flowing through the internal conductor 25A changes, the first conductor portions 26Aa generate more magnetic fluxes than the second conductor portion 26Ab. This means that the magnetic fluxes generated by the internal conductor 25A are not distributed in a uniform manner in the circumferential direction centered on the coil axis Axa. Since the internal conductor 25A is arranged such that the second conductor portion 26Ab faces the first end surface 10*c*, the magnetic fluxes generated by the internal conductor 25A are distributed in the base body 10 more in the region between the internal conductor 25A and the second end surface 10*d* than in the region between the internal conductor 25A and the first end surface 10*c*.

The following now describes the internal conductor 25B. In the illustrated embodiment, the shape of the internal conductor 25B is symmetrical to the shape of the internal conductor 25A in the L-axis direction. More specifically, the internal conductor 25B includes a winding portion 26B, a lead-out conductor portion 27B1, and a lead-out conductor portion 27B2. The winding portion 26B is spirally wound around a coil axis Axb parallel to the coil axis Axa in the opposite direction to the winding portion 26A of the internal conductor 25A, the lead-out conductor portion 27B1 extends outwardly from one end of the winding portion 26B in a direction along the W-axis direction to connect the winding portion 26B to the external electrode 21B, and the lead-out conductor portion 27B2 extends outwardly from the other end of the winding portion 26B in the W-axis direction to connect the winding portion 26B to the external electrode 22B. The internal conductor 25B is connected to the external electrode 21B at the lead-out conductor portion 27B1 and connected to the external electrode 22B at the lead-out conductor portion 27B2.

In the winding portion 26B, a plurality of first conductor portions and one or more second conductor portions smaller in number than the first conductor portions alternate with and are connected to each other. In the illustrated embodiment, the winding portion 26B includes two first conductor portions 26Ba (26Ba1 and 26Ba2) and one second conductor portion 26Bb. More specifically, the winding portion 26B includes a first conductor portion 26Ba1, a second conductor portion 26Bb, and a first conductor portion 26Ba2. The first conductor portion 26Ba1 is connected to the lead-out conductor portion 27B1 and extends counterclockwise around the coil axis Axb from the connected portion to the lead-out conductor portion 27B1. The second conductor portion 26Bb extends counterclockwise around the coil axis Axb from the end of the first conductor portion 26Ba1 opposite to its end connected to the lead-out conductor portion 27B1. The first conductor portion 26Ba2 extends counterclockwise around the coil axis Axb from the end of the second conductor portion 26Bb opposite to its end connected to the first conductor portion 26Ba1. As described above, in the winding portion 26B, the first conductor portions 26Ba1 and 26Ba2 and the second conductor portion 26Bb alternate with and are connected to each other. The first conductor portions 26Ba1 to 26Ba2 are an example of the first conductor portions included in the winding portion 26B, and the second conductor portion 26Bb is an example of the second conductor portion included in the winding portion 26B. The number of first conductor portions included in the winding portion 26B is not limited to two. Even if the numbers of first and second conductor portions increase, the first and second conductor portions alternate with each other. If it is required to draw a boundary between the first conductor portions 26Ba1 to 26Ba2 and the second conductor portion 26Bb, an imaginary plane VSb passing through the coil axis Axb and the external electrodes 21B and 22B and parallel to the WT plane can be used as the boundary plane lying between the first conductor portions and the second conductor portion.

As described above, the internal conductor 25B is symmetrically arranged to the internal conductor 25A in the direction extending along the reference axis Ax1. In one or more embodiments, the internal conductor 25B is plane-symmetrical to the internal conductor 25A with respect to a symmetry plane that is parallel to and equidistant from the imaginary planes VSa and VSb.

In addition, as shown in FIG. 24, the winding portion 26B is divided into the first and second winding portions 26B1 and 26B2 that are next to each other in the T-axis direction with respect to the via conductor VB. The first winding portion 26B1 extends around the coil axis Axb approximately 0.75 turns (270°) counterclockwise from the lead-out conductor portion 27B1 to the via conductor VB. The via conductor VB extends in the T-axis direction. The first winding portion 26B1 is connected to the negative end of the via conductor VB in the T-axis direction, and the second winding portion 26B2 is connected to the positive end of the via conductor VB in the T-axis direction. The second winding portion 26B2 is shifted toward the positive side in the T-axis direction from the first winding portion 26B1 by a distance equal to the length of the via conductor VB and extends counterclockwise around the coil axis Axb approximately 0.75 turns (270°) from the via conductor VB to the lead-out conductor portion 27B2. The number of turns in the first winding portion 26B1 may be less or greater than 0.75, as long as it is less than one. Likewise, the number of turns in the second winding portion 26B2 may be less or greater than 0.75, as long as it is less than one. The via conductor VB connecting together the first and second winding portions 26B1 and 26B2 can be positioned depending on the number of turns in the first and second winding portions 26B1 and 26B2.

The internal conductor 25B is arranged in the base body 10 such that the second conductor portion 26Bb faces the second end surface 10*d*. Since the internal conductor 25B is arranged such that the second conductor portion 26Bb faces the second end surface 10*d*, the magnetic fluxes generated by the internal conductor 25B are distributed in the base body 10 more in the region between the internal conductor 25B and the first end surface 10*c* than in the region between the internal conductor 25B and the second end surface 10*d*.

The following describes the internal conductor 25Ca1. The internal conductor 25Ca1 has the same shape as the internal conductor 25B and is positioned in the same orientation as the internal conductor 25B in the base body 10. More specifically, the internal conductor 25Ca1 includes a winding portion 26Ca10 (first and second winding portions 26Ca11 and 26Ca12), a lead-out conductor portion 27C1, and a lead-out conductor portion 27C2. The winding portion 26Ca10 is spirally wound around a coil axis Axc parallel to the coil axis Axb, the lead-out conductor portion 27C1 extends outwardly from one end of the winding portion 26Ca10 in the W-axis direction to connect the winding portion 26Ca10 to the external electrode 21Ca1, and the lead-out conductor portion 27C2 extends outwardly from the other end of the winding portion 26Ca10 in the W-axis direction to connect the winding portion 26Ca10 to the external electrode 22Ca1. The internal conductor 25Ca1 is connected to the external electrode 21Ca1 at the lead-out conductor portion 27C1 and connected to the external electrode 22Ca1 at the lead-out conductor portion 27C2. As shown in FIG. 25, the winding portion 26Ca10 of the internal conductor 25C includes two first conductor portions 26Ca1*a* (26Ca1*a*1 and 26Ca1*a*2) and one second conductor portion 26Ca1*b*, like the winding portion 26B of the internal conductor 25B.

The following describes how the internal conductors 25A, 25B and 25Ca1 are arranged relative to the base body 10 mainly with reference to FIG. 26. As shown in FIG. 26, the internal conductors 25A, 25B, 25Ca1 are arranged next to each other along the reference axis Ax1. As described above, the reference axis Ax1 is an imaginary axis extending along the L-axis and extending through the first and second end surfaces 10*c* and 10*d*. As used herein, a first direction X1 denotes the direction extending along the reference axis Ax1 from the first end surface 10*c* toward the second end surface 10*d*, and a second direction X2 denotes the reversed direction (i.e., the direction extending along the reference axis Ax1 from the second end surface 10*d* toward the first end surface 10*c*). The first and second directions X1 and X2 are referred to describe how the components of the inductor array 701 are arranged. The base body 10 is oriented along the reference axis Ax1 and defined between the first and second end surfaces 10*c* and 10*d*. This means that, in the reference axis direction extending along the reference axis Ax1, the base body 10 terminates at the first end surface 10*c* on one side and at the second end surface 10*d* on the other side.

The internal conductor 25A is in the base body 10 and adjacent to the first end surface 10*c*. More specifically, the internal conductor 25A is positioned away from the first end surface 10*c* by a distance d11 in the first direction X1.

The internal conductor 25B is in the base body 10 and adjacent to the second end surface 10*d*. More specifically, the internal conductor 25B is positioned away from the second end surface 10*d* by a distance d12 in the second direction X2.

As adjacent to the first end surface 10*c*, where the base body 10 terminates on one side in the reference axis direction (a first end of the base body 10), the internal conductor 25A may be herein referred to as a first end internal conductor 25A. Similarly, as adjacent to the second end surface 10*d*, where the base body 10 terminates on the other side in the reference axis direction (a second end of the base body 10), the internal conductor 25B may be herein referred to as a second end internal conductor 25B. Since the distance d11 indicates the distance between the first end internal conductor 25A and the first end surface 10*c*, the distance d11 may be herein referred to as the first end distance d11. Similarly, since the distance d12 indicates the distance between the second end internal conductor 25B and the second end surface 10*d*, the distance d12 may be herein referred to as the second end distance d12. In one or more embodiments of the present invention, the first and second end internal conductors 25A and 25B are arranged such that the first end distance d11 is equal to the second end distance d12. This is represented as d11=d12.

The internal conductor 25Ca1 is positioned away from the internal conductor 25A by a distance d21 in the first direction X1 and positioned away by the distance d22 in the second direction X2 from the second end internal conductor 25B. The internal conductors 25A, 25B and 25C1 may be arranged at even intervals in the direction along the reference axis Ax1 in the base body 10. In this case, the internal conductors 25A, 25B and 25C1 are arranged at the center of the inductors 701A, 701B and 701Ca1 in the direction extending along the reference axis Ax1, such that the relation d11=d12=d21/2=d22/2 is established.

As described above, the first end internal conductor 25A is arranged such that the second conductor portion 26Ab faces the first end surface 10*c*, and the second end internal conductor 25B is arranged such that the second conductor portion 26Bb faces the second end surface 10*d*. If the current flowing through the first end internal conductor 25A changes, the first conductor portions 26Aa generate more magnetic fluxes than the second conductor portion 26Ab. If the current flowing through the second end internal conductor 25B changes, the first conductor portions 26Ba generate more magnetic fluxes than the second conductor portion 26Bb. In other words, the first and second end internal conductors 25A and 25B are both arranged such that the first conductor portions 26Aa and 26Ba, which generate more magnetic fluxes, do not face any of the external surfaces of the base body 10 but face the center of the base body 10. If the first and second end internal conductors 25A and 25B and the internal conductor 25C1 are arranged at even intervals within the base body 10, the first and second end distances d11 and d12 are less than the inter-conductor distances d21 and d22. Accordingly, the magnetic resistance is greater in the region between the internal conductor 25A and the first end surface 10*c* of the base body 10 and in the region between the internal conductor 25B and the second end surface 10*d* of the base body 10, than in the region of the base body 10 that is closer to the center of the base body 10 than are the internal conductors 25A and 25B. Since the first end internal conductor 25A is arranged such that the second conductor portion 26Ab faces the first end surface 10*c*, the magnetic fluxes generated by the first end internal conductor 25A tend to pass through the region of the base body 10 that is closer to the center of the base body 10 than is the first end internal conductor 25A, where the magnetic resistance is relatively low. Similarly, since the second end internal conductor 25B is arranged such that the second conductor portion 26Bb faces the second end surface 10*d*, the magnetic fluxes generated by the second end internal conductor 25B tends to pass through the region of the base body 10 that is closer to the center of the base body 10 than is the second end internal conductor 25B, where the magnetic resistance is relatively low. This can reduce degradation of the inductance of the inductor 701A including the first end internal conductor 25A and degradation of the inductance of the inductor 701B including the second end internal conductor 25B.

In conventional inductor arrays, the internal conductors having the same shape are arranged at regular intervals next to each other in the reference axis direction within the base body. This means that one of the outermost internal conductors in the reference axis direction is arranged such that a portion of the outermost internal conductor that generates more magnetic fluxes faces any of the external surfaces of the base body. For example, if the internal conductor 25A is replaced with an internal conductor having the same shape as the internal conductor 25B and this internal conductor is positioned in the same orientation as the internal conductor 25B in the inductor array 701 shown in FIG. 24, this internal conductor is arranged such that a portion of this internal conductor that generates more magnetic fluxes (the portion corresponding to the first conductor portions 26Ba of the internal conductor 25B) faces the first end surface 10*c* of the base body 10. With such arrangement, more of the magnetic fluxes generated by the internal conductor are forced to circumvent the region between the internal conductor and the first end surface 10*c*, where the magnetic resistance is relatively high, and thus follow a longer magnetic path. This degrades the inductance of the inductor including the internal conductor (the inductor adjacent to the first end surface 10*c*). To address this issue, in one or more embodiments of the present invention, the internal conductor 25A, which is one of the outermost internal conductors in the reference axis Ax1 direction, is arranged such that the second conductor portion 26Ab faces the first end surface 10*c*. In this manner, the magnetic fluxes generated by the internal conductor 25A tend to pass through the region of the base body 10 that is closer to the center of the base body 10 than is the first end internal conductor 25A, where the magnetic resistance is relatively low. Accordingly, one or more embodiments of the present invention can reduce the degradation of the inductance of the inductor 1A including the internal conductor 25A. Since the degradation of the inductance of the inductor 1A is reduced, the inductors 701A, 701B and 701Ca1 can achieve more uniform inductances.

If the number of turns in the internal conductors included in the base body 10 is 4.5 or more, the magnetic fluxes are less unevenly distributed in the circumferential direction centered on the coil axis. Therefore, even if the internal conductors are arranged at even intervals within the base body, the inductance of one of the outermost inductors in the arrangement direction drops less significantly. In other words, the present invention is applicable to inductor arrays including internal conductors irrespective of the number of turns, but can significantly reduce the degradation in inductance of the outermost inductor 701A in the arranging direction when applied to inductor arrays including internal conductors of 3.5 turns or less.

In one or more embodiments of the present invention, the first and second end distances d11 and d12 may be less than the inter-conductor distances d21 and d22. With such arrangement, the inductance of the inductor 701A can be prevented from being degraded and the inductor array 701 can be saved from having a large size in the direction extending along the reference axis Ax1.

In one or more embodiments of the present invention, the first inter-conductor distance d21 may be equal to the second inter-conductor distance d22. If the first inter-conductor distance d21 is equal to the second inter-conductor distance d22, the magnetic fluxes can be uniformly distributed within the base body 10. This can contribute to improve the DC superimposition characteristics of the inductor array 701. The first and second inter-conductor distances d21 and d22 may differ from each other due to the manufacturing- and/or measurement-induced errors, this does not deny that the first and second inter-conductor distances d21 and d22 are equal to each other.

In one or more embodiments of the present invention, the average of the distances between the internal conductors within the base body 10 (i.e., the average of the inter-conductor distances) is less than the first and second end distances d11 and d12. For example, in the embodiment shown in FIG. 26, the average of the first and second inter-conductor distances d21 and d22 (i.e., (d21+d22)/2) may be less than the first and second end distances d11 and d12. In this case, the internal conductors can be more densely arranged in the reference axis direction in a region closer to the center of the base body 10 in the direction extending along the reference axis Ax1.

As described above, the internal conductors 25A and 25B may be arranged at the center of the base body 10 in the T-axis direction, which is perpendicular to the reference axis direction. In other words, the distance between the internal conductor 25A and the top surface 10*a* may be equal to the distance between the internal conductor 25A and the bottom surface 10*b*. The distance between the internal conductor 25B and the top surface 10*a* may be equal to the distance between the internal conductor 25B and the bottom surface 10*b*.

Figure 27:
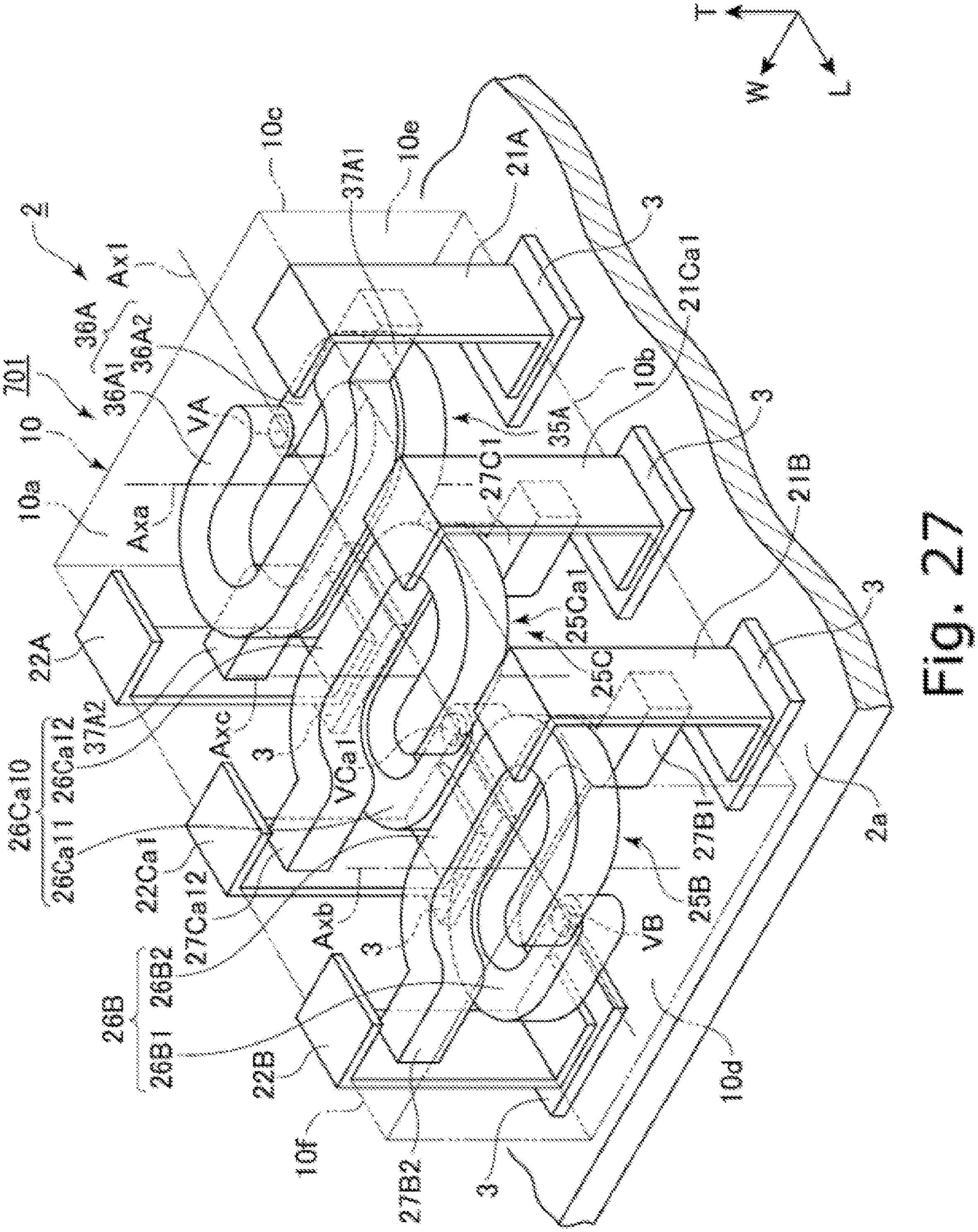
FIG. 27 is a perspective view of an inductor array according to another embodiment of the present invention.

The following now describes a modification example of the inductor array 701 with reference to FIG. 27. While the inductor array 701 shown in FIG. 24 includes the internal conductor 25A, the inductor array 701 shown in FIG. 27 includes an internal conductor 35A. The internal conductor 35A has the same shape as the internal conductor 25B but is positioned in a different orientation than the internal conductor 25B in the base body 10. For example, the position of the internal conductor 35A can be accomplished by rotating the internal conductor 25B around the coil axis Axb 180°. More specifically, the internal conductor 35A includes a winding portion 36A, a lead-out conductor portion 37A1, and a lead-out conductor portion 37A2. The winding portion 36A is spirally wound around a coil axis parallel to the coil axis Axb, the lead-out conductor portion 37A1 extends outwardly from one end of the winding portion 36A in the W-axis direction to connect the winding portion 36A to the external electrode 21A, and the lead-out conductor portion 37A2 extends outwardly from the other end of the winding portion 36A in the W-axis direction to connect the winding portion 36A to the external electrode 22A. The winding portion 36A is divided into first and second winding portions 36A1 and 36A2 that are next to each other in the T-axis direction with respect to the via conductor VA. The first winding portion 36A1 extends around the coil axis approximately 0.75 turns (270°) clockwise from the lead-out conductor portion 37A1 to the via conductor VA. The first winding portion 36A1 is connected to the positive end of the via conductor VA in the T-axis direction, and the second winding portion 36A2 is connected to the negative end of the via conductor VA in the T-axis direction. The second winding portion 36A2 is shifted toward the negative side in the T-axis direction from the first winding portion 36A1 by a distance equal to the length of the via conductor VA and extends clockwise around the coil axis approximately 0.75 turns (270°) from the via conductor VA to the lead-out conductor portion 37A2. The number of turns in the first winding portion 36A1 may be less or greater than 0.75, as long as it is less than one. Likewise, the number of turns in the second winding portion 36A2 may be less or greater than 0.75, as long as it is less than one. The via conductor VA connecting together the first and second winding portions 36A1 and 36A2 can be positioned depending on the number of turns in the first and second winding portions 36A1 and 36A2.

In the winding portion 36A, a plurality of first conductor portions and one or more second conductor portions smaller in number than the first conductor portions alternate with and are connected to each other, as in the winding portion 26A. Like the internal conductor 25A, the winding portion 36A is divided into first and second conductor portions by an imaginary plane passing through the coil axis and the external electrodes 21A and 22A and extending parallel to the WT-plane. The internal conductor 35A is arranged in the base body 10 such that the second conductor portion faces the first end surface 10*c*. Since the internal conductor 35A is also arranged such that the second conductor portion faces the first end surface 10*c* like the internal conductor 25A, the magnetic fluxes generated by the internal conductor 35A tend to pass through the region of the base body 10 that is closer to the center of the base body 10 than is the internal conductor 35A, where the magnetic resistance is relatively low. This can result in reducing the degradation of the inductance of the inductor 701A including the internal conductor 35A, so that the inductors 701A, 701B and 701Ca1 can achieve more uniform inductances.

As described above, the negative-side outermost internal conductor in the inductor array 701 in the L-axis direction may be the internal conductor 25A that is symmetrically shaped to the internal conductor 25B in the L-axis direction or the internal conductor 35A having the same shape as the internal conductor 25B. As described above, the position of the internal conductor 35A can be accomplished by rotating the internal conductor 25B around the coil axis Axb 180°, and the internal conductor 35A is interposed between the external electrodes 21A and 22A. The winding portion 26A of the internal conductor 25A and the winding portion 36A of the internal conductor 35A both extend in the circumferential direction around the coil axis the same length as the winding portion 26B of the internal conductor 25B. According to the embodiments shown in FIGS. 24 and 27, the winding portions 26A, 26B and 36A all extend 1.5 turns in the circumferential direction around the respective coil axes. The winding portions 26A, 26B and 36A may extend a different number of turns than 1.5 turns (for example, 2.5 or 3.5 turns) in the circumferential direction around the respective coil axes. Since the internal conductors 25A (35A), 25B and 25Ca1 have the same length in the circumferential direction, the inductor array 701 can easily achieve uniform electrical characteristics among the lines (i.e., the inductors 701A, 701B, 701Ca1) formed therein.

In the inductor array 701, the internal conductor facing the first end surface 10*c* may be shaped differently than the internal conductors 25A and 35A. The internal conductor facing the first end surface 10*c* in the inductor array 701 may be configured in any manner as long as it includes a winding portion extending in the circumferential direction around the coil axis and extending the same length as the winding portion 26B of the internal conductor 25B, the winding portion includes first conductor portions and fewer second conductor portions, which alternate with and are connected to each other, and the second conductor portions face the first end surface 10*c*. In the embodiment shown in FIG. 24, the first and second winding portions 26A1 and 26A2 of the internal conductor 25A are wound 0.75 turns like the first and second winding portions 26B1 and 26B2 of the internal conductor 25B, but the first and second winding portions 26A1 and 26A2 of the internal conductor 25A may be wound a different number of turns than the first and second winding portions 26B1 and 26B2 of the internal conductor 25B. For example, when the first and second winding portions 26B1 and 26B2 of the internal conductor 25B are wound 0.75 turns, the first and second winding portions 26A1 and 26A2 of the internal conductor 25A may be wound 0.6 and 0.9 turns, respectively. In this case, the numbers of turns in the first and second winding portions 26A1 and 26A2 (respectively, 0.6 and 0.9) are different from the numbers of turns in the first and second winding portions 26B1 and 26B2 (0.75), but the number of turns in the winding portion 26A in the internal conductor 25A (1.5 (=0.6+0.9) is equal to the number of turns in the winding portion 26B in the internal conductor 25B.

Figure 28:
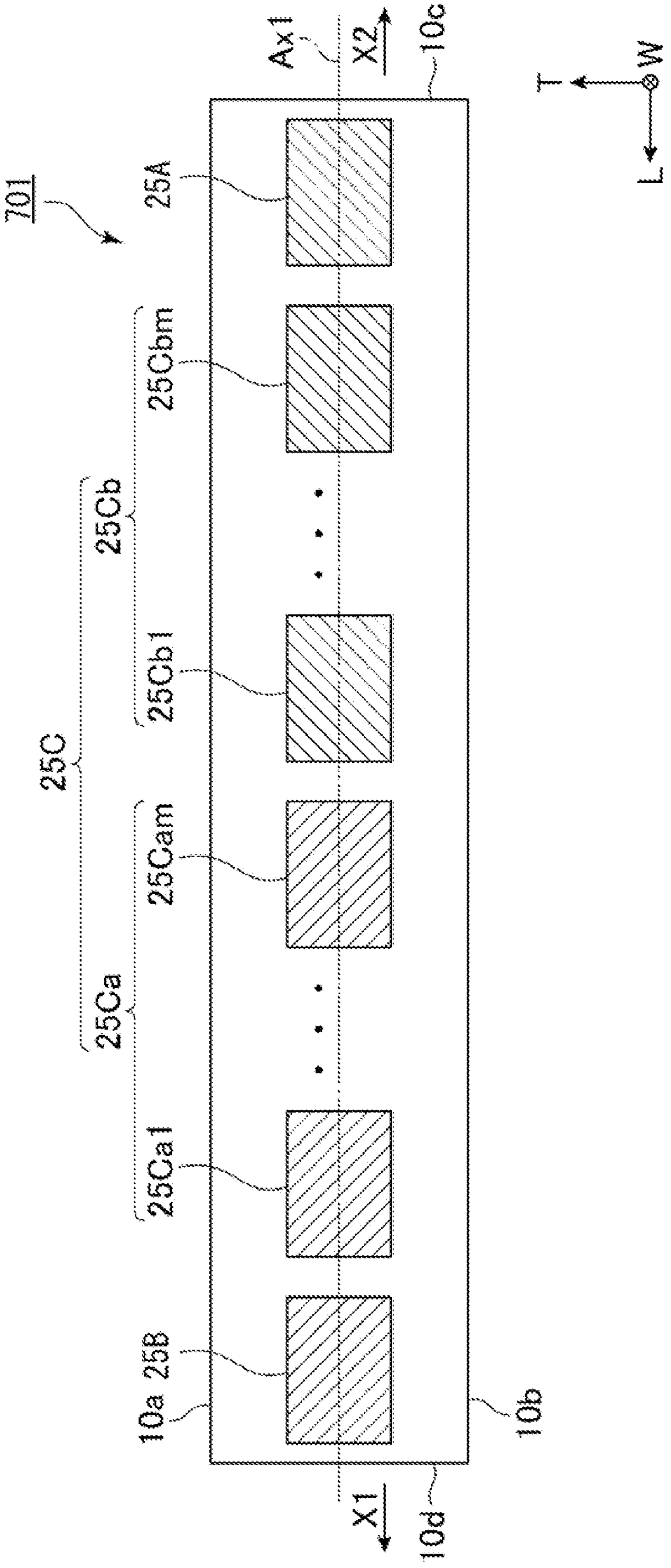
FIG. 28 schematically shows how internal conductors are arranged in an inductor array relating to one or more embodiments of the present invention.

An inductor array according to another embodiment, to which the present invention is applicable, will be now described with reference to FIGS. 28 to 34. In the following embodiment, the internal conductor 25A may be replaced with the internal conductor 35A. As has been described above, the intermediate internal conductor unit 25C can include one or more intermediate internal conductors. In the embodiment shown in FIGS. 24 to 27, the intermediate internal conductor unit 25C includes one intermediate internal conductor, (i.e., the internal conductor 25Ca1). As shown in FIG. 28, the intermediate internal conductor unit 25C can include m first intermediate internal conductors 25Ca and n second intermediate internal conductors 25Cb. Here, both m and n are 0 or natural numbers and satisfy the relationship m n. FIGS. 24 and 27 show an example case where m=1 and n=0.

The first intermediate internal conductors 25Ca have the same shape as the internal conductor 25B and are positioned in the same orientation as the internal conductor 25B in the base body 10. The internal conductor 25Ca1 shown in FIG. 24 is an example of the first intermediate internal conductors 25Ca. As previously described, the internal conductor 25Ca1 has, as well as the internal conductor 25B, the winding portion 26Ca10 extending anticlockwise 1.5 turns from the lead-out conductor portion 27C1 around the coil axis to the lead-out conductor portion 27C2.

The second intermediate internal conductors 25Cb have the same shape as the internal conductor 25A and are positioned in the same orientation as the internal conductor 25A in the base body 10. The inductor array 701 shown in FIG. 24 has no second intermediate internal conductors 25Cb. The second intermediate internal conductors 25Cb are interposed between the internal conductor 25A and the first intermediate internal conductors 25Ca in the direction extending along the reference axis Ax1. When the internal conductor 25A is replaced with the internal conductor 35A, the second intermediate internal conductors 25Cb have the same shape as the internal conductor 35A and are positioned in the same orientation as the internal conductor 35A in the base body 10. The second intermediate internal conductors 25Cb are interposed between the internal conductor 35A and the first intermediate internal conductors 25Ca in the direction extending along the reference axis Ax1.

The first and second intermediate internal conductors 25Ca and 25Cb are both interposed between the internal conductors 25A and 25B in the direction extending along the reference axis Ax1. The first intermediate internal conductors 25Ca (the first intermediate internal conductors 25Ca1 to 25Cam) are each adjacent to different ones of the first intermediate internal conductors 25Ca. The outermost ones of the first intermediate internal conductors 25Ca in the reference axis Ax1 direction, or the first intermediate internal conductors 25Ca1 and 25Cam are each adjacent to another one of the first intermediate internal conductors. More specifically, one of the outermost first intermediate internal conductors or the first intermediate internal conductor 25Ca1 in the reference axis Ax1 direction is adjacent to the first intermediate internal conductor 25Ca2, and the other outermost first intermediate internal conductor 25Cam is adjacent to the first intermediate internal conductor 25Ca (m−1). The first intermediate internal conductor 25Ca1 is also adjacent to the second end internal conductor 25B, and the first intermediate internal conductor 25Cam is also adjacent to the second intermediate internal conductor 25Cb1. Likewise, the second intermediate internal conductors 25Cb (the second intermediate internal conductors 25Cb1 to 25Cbm) are each adjacent to different ones of the second intermediate internal conductors 25Cb. In addition, the first and second intermediate internal conductors 25Ca and 25Cb may be each equidistant from an adjacent internal conductor. With such arrangement, the first intermediate internal conductors 25Ca can be collectively arranged within a different region in the base body 10 than the second intermediate internal conductors 25Cb, which have a different shape or a different orientation. Accordingly, the magnetic fluxes can be more uniformly distributed than in inductor arrays where the first and second intermediate internal conductors 25Ca and 25Cb are arranged in a mixed manner (for example, the first and second intermediate internal conductors 25Ca and 25Cb alternate with each other in the reference axis Ax1 direction). This can prevent the magnetic fluxes from saturating locally in the base body 10. In this way, the inductor array can achieve improved superimposition characteristics.

In the above-mentioned case where the intermediate internal conductor unit 25C includes m first intermediate internal conductors 25Ca and n second intermediate internal conductors 25Cb, the degradation of the inductance of the inductor 701A including the internal conductor 25A can be also reduced since the outermost internal conductor 25A in the reference axis Ax1 direction is arranged such that the second conductor portion 26Ab (see FIGS. 25 and 26) faces the first end surface 10*c*.

Figure 29:
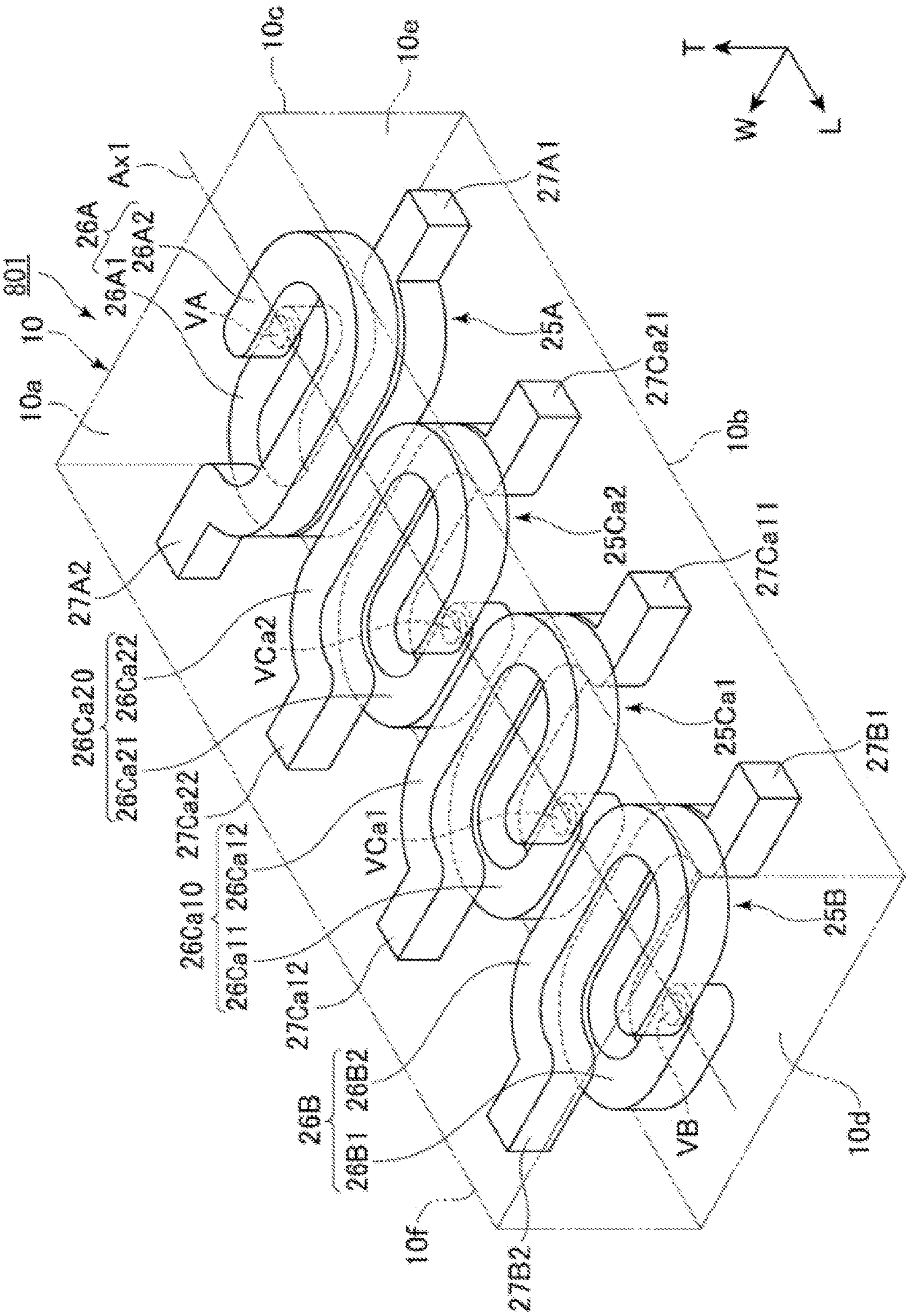
FIG. 29 is a perspective view of an inductor array according to another embodiment of the present invention.

The following now describes an inductor array 801 according to another embodiment, to which the present invention is applicable, with reference to FIG. 29. FIG. 29 is a perspective view of the inductor array 801. The inductor array 801 is an embodiment with the numbers m and n being set to 2 and 0 respectively. The inductor array 801 includes two first intermediate internal conductors disposed in the base body 10 between the internal conductors 25A and 25B in the direction extending along the reference axis Ax1, i.e., internal conductors 25Ca1 and 25Ca2. The internal conductors 25Ca1 and 25Ca2 both have the same shape as the internal conductor 25B and are positioned in the same orientation as the internal conductor 25B in the base body 10. Like the internal conductor 25C shown in FIG. 24, the internal conductors 25Ca1 and 25Ca2 respectively include a winding portion 26Ca10 (first and second winding portions 26Ca11 and 26Ca12) and a winding portion 26Ca20 (first and second winding portions 26Ca21 and 26Ca22).

The inductor array 801 produces the same effects as the inductor array 701. The degradation of the inductance of the inductor 701A including the internal conductor 25A can be also reduced since the outermost internal conductor 25A in the reference axis Ax1 direction is arranged such that the second conductor portion 26Ab (see FIGS. 25 and 26) faces the first end surface 10*c*.

Figure 30:
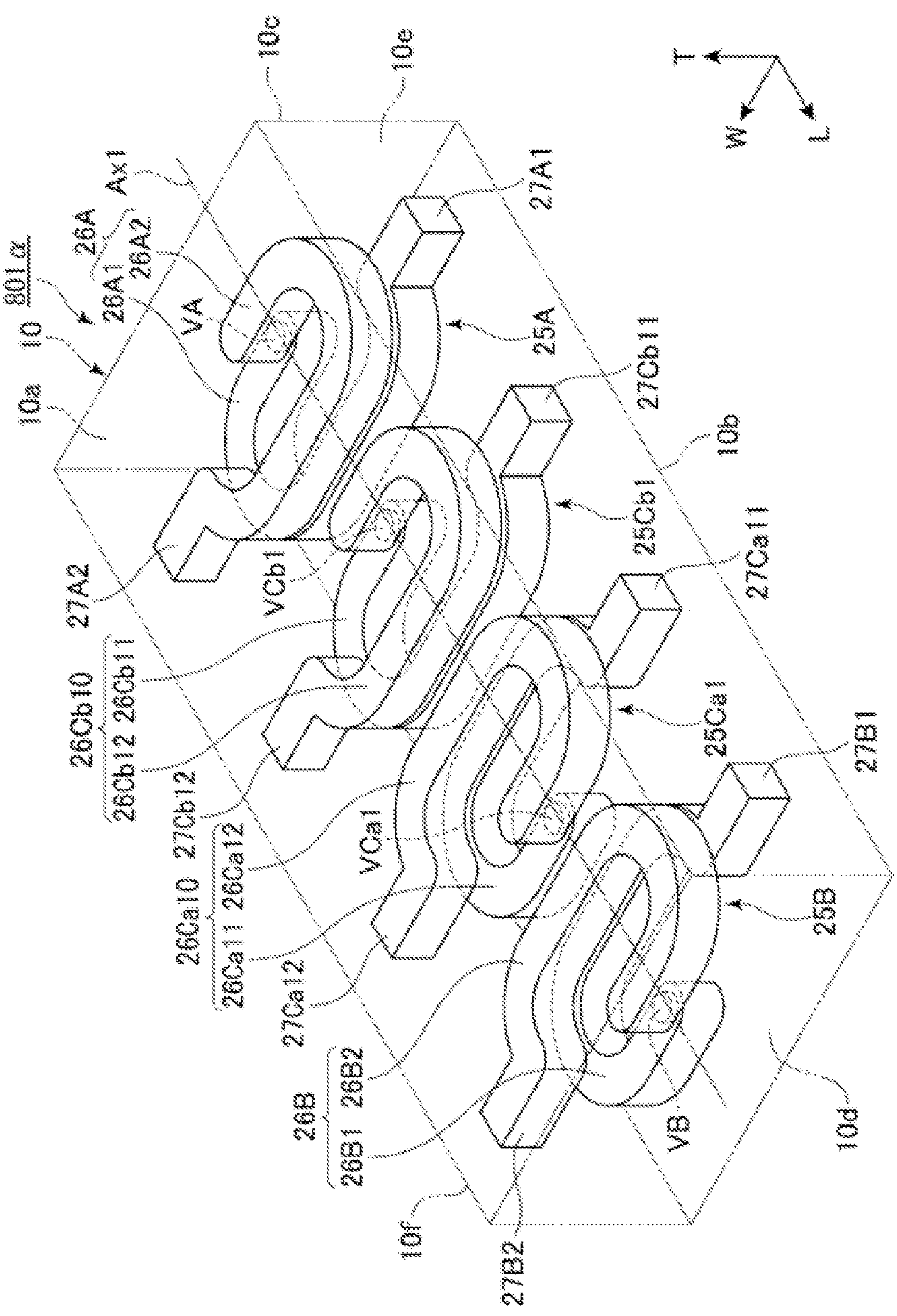
FIG. 30 is a perspective view of an inductor array according to another embodiment of the present invention.

The following now describes an inductor array 801α according to another embodiment, to which the present invention is applicable, with reference to FIG. 30. FIG. 30 is a perspective view of the inductor array 801α. The inductor array 801α is an embodiment with the numbers m and n being set to 1 and 1 respectively. The inductor array 801α includes one first intermediate internal conductor, i.e., an internal conductor 25Ca1, and one second intermediate internal conductor, i.e., an internal conductor 25Cb1, in the base body 10 between the internal conductors 25A and 25B in the direction extending along the reference axis Ax1. As has been described above, the internal conductor 25Ca1 has the same shape as the internal conductor 25B and is positioned in the same orientation as the internal conductor 25B in the base body 10. The internal conductor 25Cb1 has the same shape as the internal conductor 25A and is positioned in the same orientation as the internal conductor 25A in the base body 10. In FIG. 30, the reference sign "26Cb10" denotes the winding portion of the internal conductor 25Cb1, and the winding portion 26Cb10 is made up by a first winding portion 26Cb11 and a second winding portion 26Cb12.

The inductor array 801α also produces the same effects as the inductor array 701. The degradation of the inductance of the inductor 701A including the internal conductor 25A can be also reduced since the outermost internal conductor 25A in the reference axis Ax1 direction is arranged such that the second conductor portion 26Ab (see FIGS. 25 and 26) faces the first end surface 10*c*.

Figure 31:
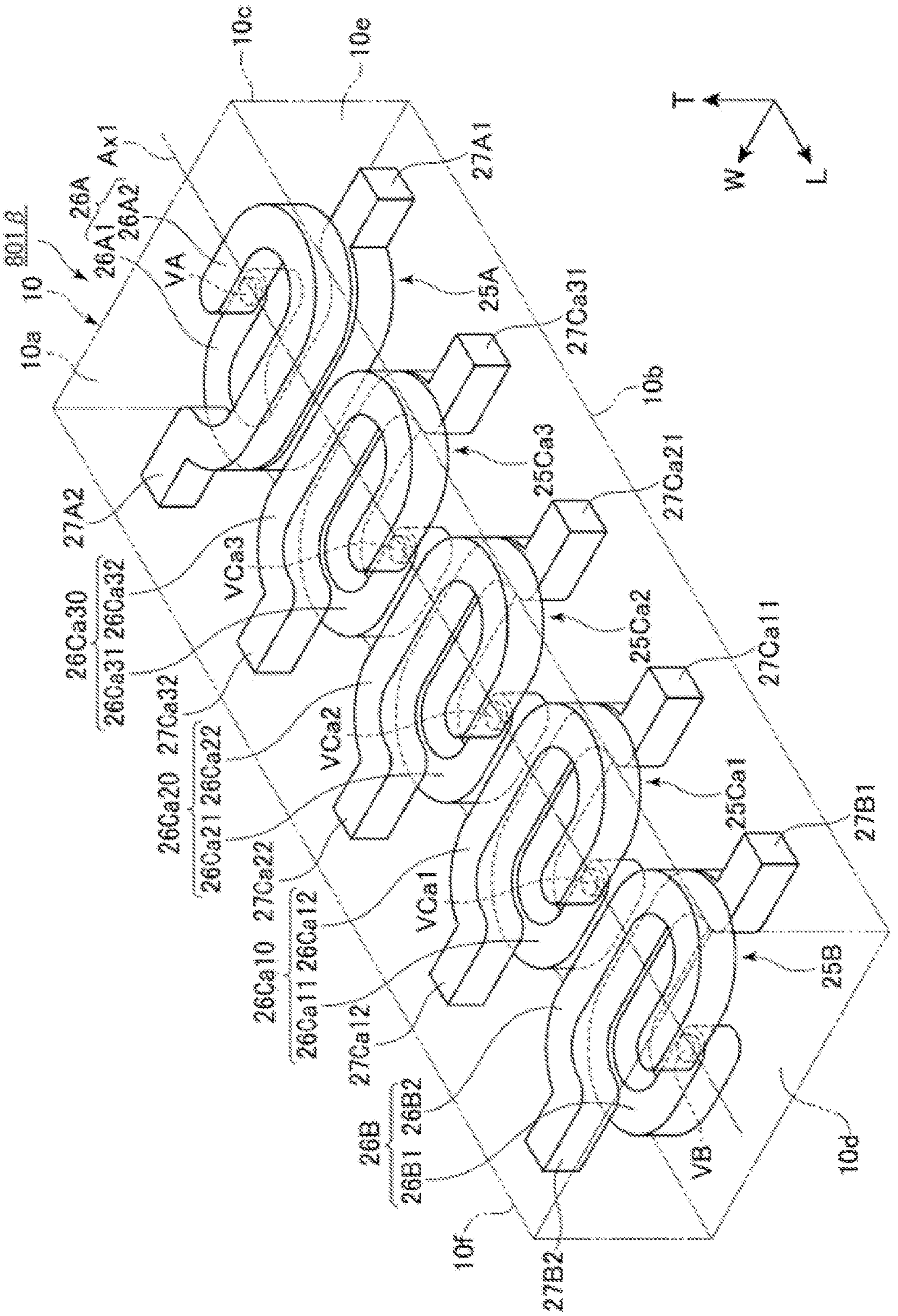
FIG. 31 is a perspective view of an inductor array according to another embodiment of the present invention.

The following now describes an inductor array 801β according to another embodiment, to which the present invention is applicable, with reference to FIG. 31. FIG. 31 is a perspective view of the inductor array 801β. The inductor array 801β is an embodiment with the numbers m and n being set to 3 and 0 respectively. In FIG. 31, the reference sign "26Ca30" denotes the winding portion of the internal conductor 25Ca3, and the winding portion 26Ca30 is made up by a first winding portion 26Ca31 and a second winding portion 26Ca32.

The inductor array 801β also produces the same effects as the inductor array 701. The degradation of the inductance of the inductor 701A including the internal conductor 25A can be also reduced since the outermost internal conductor 25A in the reference axis Ax1 direction is arranged such that the second conductor portion 26Ab (see FIGS. 25 and 26) faces the first end surface 10*c*.

Figure 32:
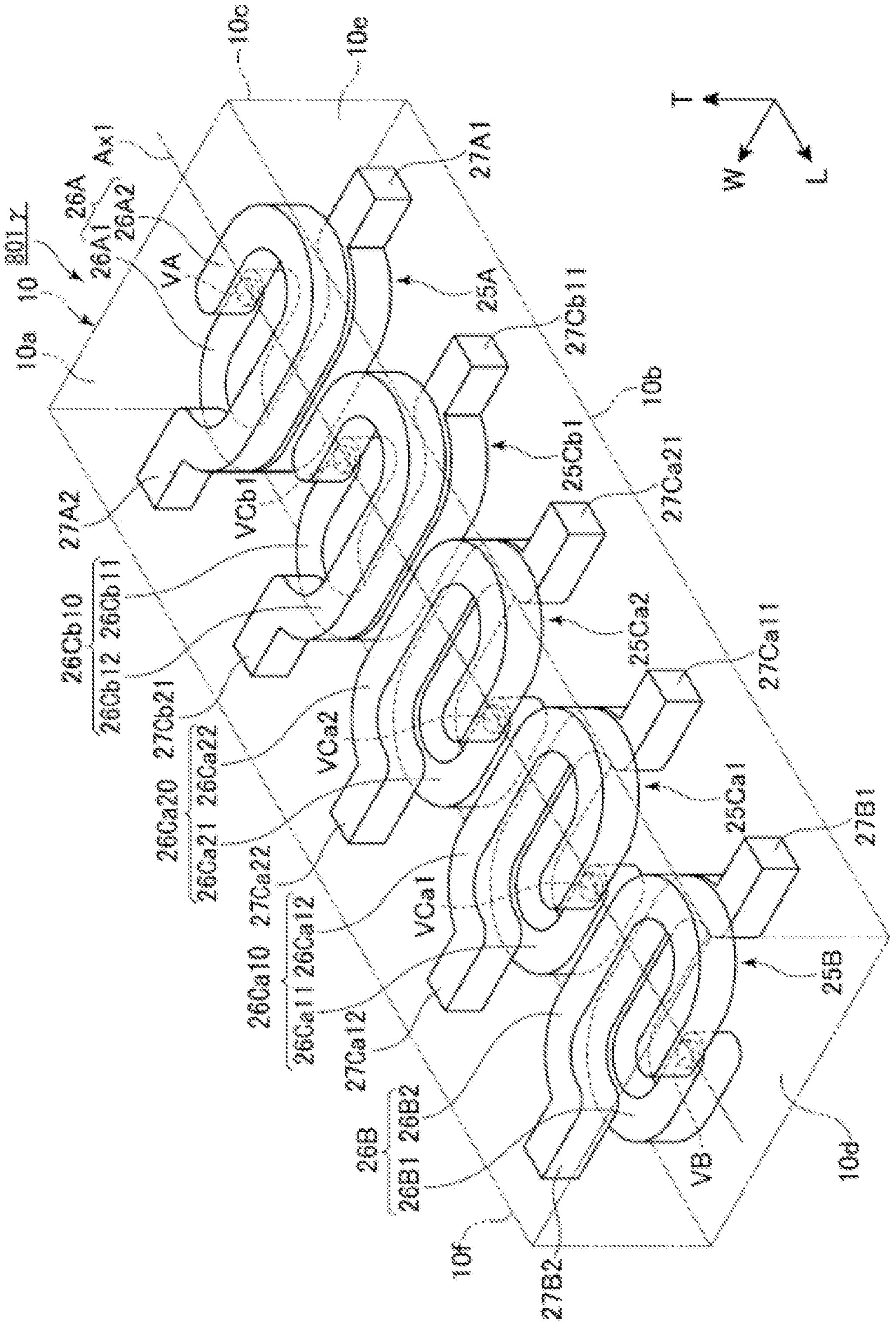
FIG. 32 is a perspective view of an inductor array according to another embodiment of the present invention.

The following now describes an inductor array 801γ according to another embodiment, to which the present invention is applicable, with reference to FIG. 32. FIG. 32 is a perspective view of the inductor array 801γ. The inductor array 801γ is an embodiment with the numbers m and n being set to 2 and 1 respectively.

The inductor array 801γ also produces the same effects as the inductor array 701. The degradation of the inductance of the inductor 701A including the internal conductor 25A can be also reduced since the outermost internal conductor 25A in the reference axis Ax1 direction is arranged such that the second conductor portion 26Ab (see FIGS. 25 and 26) faces the first end surface 10*c*.

Figure 33:
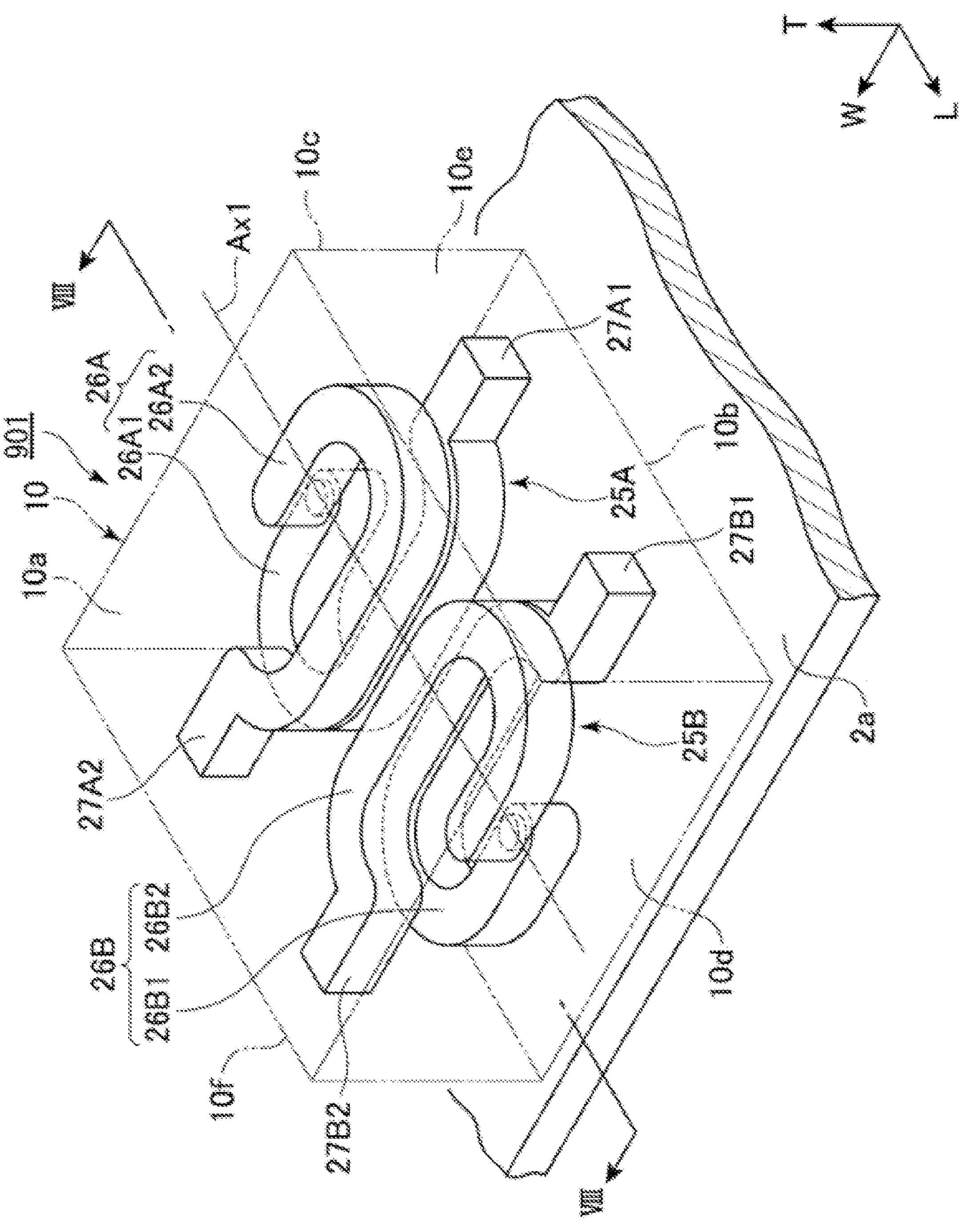
FIG. 33 is a perspective view of an inductor array according to another embodiment of the present invention.
Figure 34:
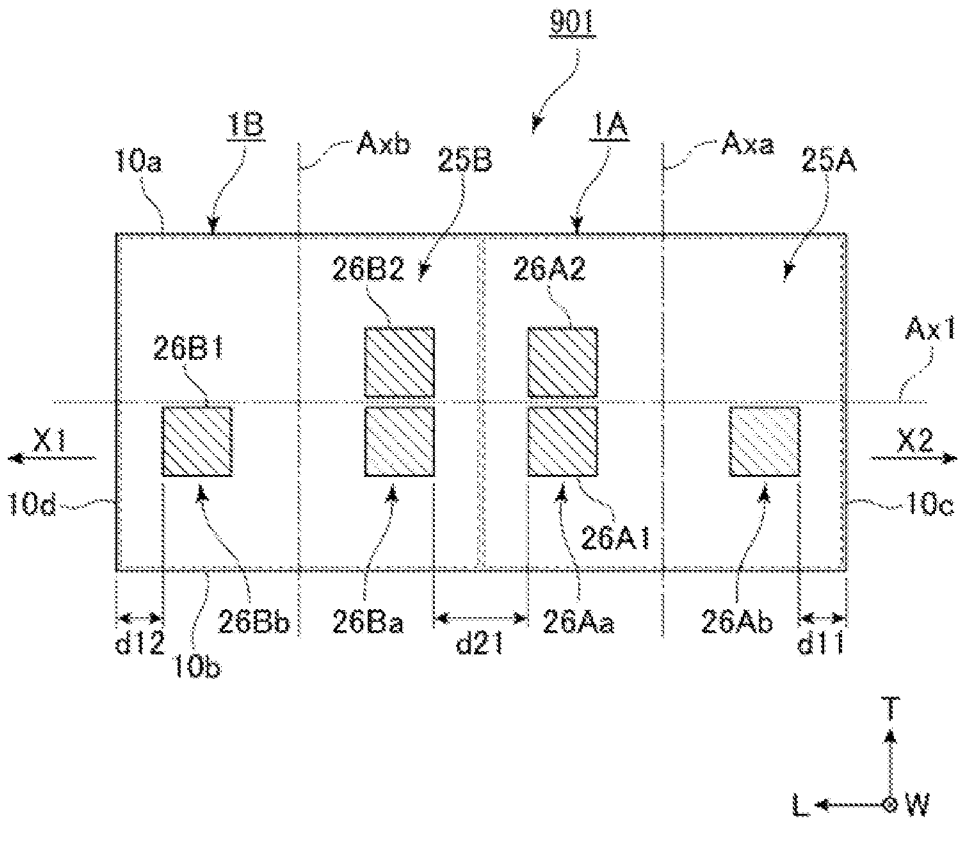
FIG. 34 is a schematic sectional view of the inductor array of FIG. 33 along the line VIII-VIII.

The following now describes an inductor array 901 according to another embodiment, to which the present invention is applicable, with reference to FIGS. 33 and 34. FIG. 33 is a perspective view of the inductor array 901, and FIG. 34 is a schematic sectional view of the inductor array 901 along the VIII-VIII line. The inductor array 901 is an embodiment with the numbers m and n being set to 0 and 0 respectively.

In the inductor array 901, the internal conductor 25A is adjacent to the internal conductor 25B. The internal conductors 25A and 25B are spaced away from each other by a distance d21 in the reference axis Ax1 direction. In one or more embodiments of the present invention, the inter-conductor distance d21 between the internal conductors 25A and 25B may be greater than the first and second end distances d11 and d12. In this manner, the inductor array 901 can prevent an increase in size in the direction extending along the reference axis Ax1.

The inductor array 901 also produces the same effects as the inductor array 701. The degradation of the inductance of the inductor 701A including the internal conductor 25A can be also reduced since the outermost internal conductor 25A in the reference axis Ax1 direction is arranged such that the second conductor portion 26Ab (see FIGS. 25 and 26) faces the first end surface 10*c*.

The following now describes an example method of manufacturing the inductor array 1 (see FIG. 1) according to one embodiment of the present invention. The following description refers to an example case where a compression molding process is employed as the manufacturing method of the inductor array 1, which is a coil component. First, the internal conductors 25A to 25C are made. The internal conductors 25A, 25B and 25C can be made by winding a ribbon-like member made of a conductive material around a core. Subsequently, metal magnetic particles are prepared to make the base body 10. An insulating film is provided on the surfaces of the metal magnetic particles as necessary. The metal magnetic particles may be a particle mixture obtained by mixing together a plurality of types of particles having different average particle sizes. The prepared metal magnetic particles, a resin material, and a diluting solvent are then mixed to prepare a composite magnetic material. Next, the composite magnetic material is placed in a mold having the already prepared internal conductors 25A to 25C placed therein, which is then exposed to molding pressure applied at a warm temperature of, for example, 50° C. to 150° C., and further heated to 150° C. to 400° C. for curing. In this way, the base body 10 having the internal conductors 25A to 25C therein is obtained. The internal conductors 25A to 25C are placed in the mold such that, when seen in the direction of the coil axes, the distance d11 between the first conductor portions of the internal conductor 25A and the first end surface 10*c* of the base body 10 is greater than the distance d12 between the second conductor portion of the internal conductor 25B and the second end surface 10*d* of the base body 10.

The heat treatment for obtaining the base body 10 may be performed in two steps as described above or in one step. When the heat treatment is performed in one step, molding and curing are performed during the heat treatment. The base body 10 may be warm molded at a temperature of, for example, around 80° C. The molding pressure is, for example, 50 to 200 Mpa. The molding pressure can be appropriately adjusted to obtain a desired filling factor. The molding pressure is, for example, 100 Mpa.

Next, a conductor paste is applied to the surfaces of the base body 10, obtained in the above-described manner, to form the external electrodes 21A to 21C and the external electrodes 22A to 22C. The external electrodes 21A to 21C are electrically connected to one end of the internal conductors 25A to 25C provided within the base body 10, and the external electrodes 22A to 22C are electrically connected to the other end of the internal conductors 25A to 25C. Through the above-described process, the inductor array 1 is obtained.

The manufactured inductor array 1 is mounted on the mounting substrate 2*a* by a reflow process. In this process, the mounting substrate 2*a* having the inductor array 1 provided thereon passes at a high speed through a reflow furnace heated to, for example, a peak temperature of 260° C., and then the external electrodes 21 and 22 are soldered to the corresponding land portions 3 of the mounting substrate 2*a*. In this way, the inductor array 1 is mounted on the mounting substrate 2*a*, and thus the circuit board 2 is manufactured.

The inductor array 1 can be made in different manners than the method described above. The inductor array 1 may be produced by a variety of lamination methods including the sheet lamination method and the printing lamination method, by the thin film process, or by other known methods.

For example, the inductor array 301 relating to one embodiment of the present invention may be made according to the following example manufacturing method. In one or more embodiments of the present invention, the inductor array 301 is produced by the sheet lamination method, in which magnetic sheets are stacked together. The first step of the sheet lamination method for producing the inductor array 301 is to prepare the magnetic sheets. The magnetic sheets are, for example, made from a slurry obtained by mixing and kneading a resin and metal magnetic particles of a soft magnetic material. The slurry is molded into the magnetic sheets using a sheet molding machine such as a doctor blade sheet molding machine. The resin mixed and kneaded together with the metal magnetic particles may be, for example, a polyvinyl butyral (PVB) resin, an epoxy resin, or any other resin materials having an excellent insulation property.

The magnetic sheets are cut into a predetermined shape. Next, a conductive paste is applied by a known method such as screen printing to the magnetic sheets cut into a predetermined shape, thereby forming a plurality of unfired conductor patterns that will later form the internal conductors 25A, 25B, 25C1 and 25C2 after firing. The conductive paste is made by mixing and kneading, for example, Ag, Cu, or alloys thereof and a resin.

In the way described above, the magnetic sheets having the unfired conductor patterns formed thereon and the unfired vias formed therein are prepared, and a mother laminate is prepared by stacking together these magnetic sheets and magnetic sheets having no conductors therein or thereon. The first end distance d11 between the internal conductor 25A and the first end surface 10*c* of the base body 10, the second end distance d12 between the internal conductor 25B and the second end surface 10*d* of the base body 10, and the distance between each of the internal conductors 25A, 25B, 25C1 and 25C2 and an adjacent internal conductor (for example, the inter-conductor distances d21, d22 and d23) can be adjusted by appropriately selecting the thickness and number of the magnetic sheets having no conductors formed thereon.

Next, the mother laminate is diced using a cutter such as a dicing machine or a laser processing machine to obtain a chip laminate.

Next, the chip laminate is subjected to heat treatment at a temperature of 600° C. to 850° C. for a duration of 20 to 120 minutes. This heat treatment degreases the chip laminate, and the magnetic sheets and the conductor paste are fired to obtain the base body 10 that includes the internal conductors 25A, 25B, 25C1, 25C2 thereinside. If the magnetic sheets contain a thermosetting resin, the thermosetting resin may be cured by performing a heat treatment at a lower temperature onto the chip laminate. This cured resin serves as the binder that binds together the metal magnetic particles contained in the magnetic sheets. The heat treatment at a lower temperature is performed at a temperature of 100° C. to 200° C. for a duration of approximately 20 to 120 minutes, for example.

Following the heat treatment, a conductive paste is applied to the surface of the chip laminate (that is, the base body 10) to form the external electrodes 21A, 21B, 21C1, 21C2, 22A, 22B, 22C1 and 22C2. In the above-described manner, the inductor array 301 is obtained.

The other inductor arrays (for example, the inductor arrays 101, 201, 401, 501, 701, 801, 901 and the modification examples thereof) can be also made in any of the above-described manufacturing methods. The above-described manufacturing method can be modified by omitting some of the steps, adding steps not explicitly described, and/or reordering the steps. Such omission, addition, or reordering is also included in the scope of the present invention unless diverged from the purport of the present invention.

The dimensions, materials, and arrangements of the constituent elements described for the above various embodiments are not limited to those explicitly described for the embodiments, and these constituent elements can be modified to have any dimensions, materials, and arrangements within the scope of the present invention. For example, an inductor array according to one or more embodiments of the invention may include five or more inductors.

Furthermore, constituent elements not explicitly described herein can also be added to the above-described embodiments, and it is also possible to omit some of the constituent elements described for the embodiments.

The words "first," "second," and "third" used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituent elements from performing the functions of the constituent elements identified by other numbers.

What is claimed is:

1. An inductor array comprising:

a magnetic base body having a first surface, a second surface opposed to the first surface, and a third surface connecting between the first surface and the second surface;

a first end internal conductor including a first winding portion extending around a first coil axis extending perpendicularly to a reference axis extending through the first surface and the second surface, the first winding portion including (i) a plurality of first-end first conductor portions and (ii) one or more first-end second conductor portions smaller in number than the plurality of first-end first conductor portions, the plurality of first-end first conductor portions and the one or more first-end second conductor portions alternating with and being connected to each other, the plurality of first-end first conductor portions being positioned away from the first surface by a first end distance in a first direction extending from the first surface toward the second surface along the reference axis, the plurality of first-end first conductor portions facing the first surface;

a second end internal conductor including a second winding portion extending around a second coil axis extending parallel to the first coil axis, the second winding portion including (i) a plurality of second-end first conductor portions and (ii) one or more second-end second conductor portions smaller in number than the plurality of second-end first conductor portions, the plurality of second-end first conductor portions and the one or more second-end second conductor portions alternating with and being connected to each other, the second end internal conductor being shaped in a same manner as the first end internal conductor, the one or more second-end second conductor portions being positioned away from the second surface by a second end distance less than the first end distance in a second direction extending from the second surface toward the first surface along the reference axis, the one or more second-end second conductor portions facing the second surface;

a first external electrode provided on the magnetic base body such that the first external electrode is in contact at least with the third surface, the first external electrode being connected to one end of the first end internal conductor;

a second external electrode provided on the magnetic base body such that the second external electrode is in contact at least with the third surface, the second external electrode being connected to the other end of the first end internal conductor;

a third external electrode provided on the magnetic base body such that the third external electrode is in contact at least with the third surface, the third external electrode being connected to one end of the second end internal conductor; and a fourth external electrode provided on the magnetic base body such that the fourth external electrode is in contact at least with the third surface, the fourth external electrode being connected to the other end of the second end internal conductor.

2. The inductor array of claim 1, wherein the first end internal conductor is adjacent to the second end internal conductor, and wherein a distance between the first end internal conductor and the second end internal conductor in a direction along the reference axis is less than twice the first end distance.

3. The inductor array of claim 1, wherein the first end internal conductor is adjacent to the second end internal conductor, and wherein a distance between the first end internal conductor and the second end internal conductor in a direction along the reference axis is less than the first end distance.

4. The inductor array of claim 1, comprising:

an intermediate internal conductor unit including one or more intermediate internal conductors, each intermediate internal conductor being shaped in a same manner as the first end internal conductor;

a fifth external electrode provided on the magnetic base body such that the fifth external electrode is in contact at least with the third surface, the fifth external electrode being connected to one end of a given one of the one or more intermediate internal conductors; and a sixth external electrode provided on the magnetic base body such that the sixth external electrode is in contact at least with the third surface, the sixth external electrode being connected to the other end of the given one of the one or more intermediate internal conductors that is connected to the fifth external electrode.

5. The inductor array of claim 4, wherein the intermediate internal conductor unit includes a single intermediate internal conductor, and wherein the single intermediate internal conductor is provided in the magnetic base body such that the single intermediate internal conductor is positioned away from the first end internal conductor by a first inter-conductor distance in the first direction and positioned away from the second end internal conductor by a second inter-conductor distance in the second direction.

6. The inductor array of claim 4, wherein a first one of the intermediate internal conductors is provided in the magnetic base body such that the first intermediate internal conductor is positioned away from the first end internal conductor by a first inter-conductor distance in the first direction, and a second one of the intermediate internal conductors is positioned away from the second end internal conductor by a second inter-conductor distance in the second direction.

7. The inductor array of claim 5, wherein the first inter-conductor distance and the second inter-conductor distance are both greater than the first end distance.

8. The inductor array of claim 6, wherein the first inter-conductor distance and the second inter-conductor distance are both less than twice the first end distance.

9. The inductor array of claim 6, wherein the first inter-conductor distance and the second inter-conductor distance are both less than the first end distance.

10. The inductor array of claim 6, wherein the first inter-conductor distance and the second inter-conductor distance are equal.

11. The inductor array of claim 4, wherein the magnetic base body has (i) a first margin region between the first end internal conductor and the first surface, (ii) a second margin region between the second end internal conductor and the second surface, (iii) a first inter-conductor region between the first end internal conductor and the intermediate internal conductor unit, and (iv) a second inter-conductor region between the second end internal conductor and the intermediate internal conductor unit, and wherein the first margin region, the second margin region, the first inter-conductor region and the second inter-conductor region have same magnetic permeability.

12. The inductor array of claim 1, wherein the number of turns in the first end internal conductor is from 1.5 to 3.5.

13. A circuit board comprising the inductor array of claim 1.

14. An electronic device comprising the circuit board of claim 13.

* * * * *